US009842455B2

(12) United States Patent
MacKay et al.

(10) Patent No.: US 9,842,455 B2
(45) Date of Patent: *Dec. 12, 2017

(54) SINGLE SPACE PARKING METER AND REMOVABLE SINGLE SPACE PARKING METER MECHANISM

(71) Applicant: J.J. MACKAY CANADA LIMITED, New Glasgow (CA)

(72) Inventors: George Allan MacKay, New Glasgow (CA); Gregory Emile Chauvin, Brookside (CA); Shamus John Angus McLarty, Halifax (CA); Ben Garvey, Halifax (CA)

(73) Assignee: J.J. MACKAY CANADA LIMITED (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,228

(22) Filed: Jul. 26, 2016

(65) Prior Publication Data

US 2016/0335834 A1 Nov. 17, 2016

Related U.S. Application Data

(63) Continuation of application No. 14/325,134, filed on Jul. 7, 2014, now Pat. No. 9,443,236, which is a (Continued)

(30) Foreign Application Priority Data

Mar. 3, 2011 (CA) ...................................... 2733110
Oct. 28, 2011 (CA) ...................................... 2756489

(51) Int. Cl.
*G07F 7/10* (2006.01)
*G07F 17/24* (2006.01)
(Continued)

(52) U.S. Cl.
CPC ......... *G07F 17/248* (2013.01); *G06K 7/0004* (2013.01); *G06K 7/10316* (2013.01);
(Continued)

(58) Field of Classification Search
CPC .. G07F 17/248; G06K 19/0704; G06Q 20/28; G06Q 20/3278; G06Q 30/0284; G07D 11/0081
See application file for complete search history.

(56) References Cited

U.S. PATENT DOCUMENTS

| 480,108 A | 8/1892 | Loch ............................... 232/62 |
| 1,189,991 A | 7/1916 | Mugler ........................... 70/120 |

(Continued)

FOREIGN PATENT DOCUMENTS

| AU | 4035701 | 9/2001 | ............. G07F 17/24 |
| AU | 200227724 | 1/2003 | ............... G07C 1/30 |

(Continued)

OTHER PUBLICATIONS

US 8,636,133, 01/2014, MacKay et al. (withdrawn)
(Continued)

*Primary Examiner* — Mark Beauchaine
(74) *Attorney, Agent, or Firm* — Hayes Soloway P.C.

(57) ABSTRACT

A parking meter mechanism is described that may include a front housing, having a display opening for viewing a display through, connected to an internal structure. Additionally or alternatively the parking meter mechanism may include a contactless payment reader located behind the display. The parking meter mechanism may be secured to a lower housing. A back housing may be secured to the lower housing as well. The front or back housing may include a solar panel compartment and solar panel mounted therein.

29 Claims, 21 Drawing Sheets

Related U.S. Application Data continuation of application No. 13/410,831, filed on Mar. 2, 2012, now Pat. No. 8,770,371.

(51) Int. Cl.
| | |
|---|---|
| *G06Q 20/32* | (2012.01) |
| *G06Q 20/34* | (2012.01) |
| *G06Q 20/18* | (2012.01) |
| *G06K 7/00* | (2006.01) |
| *G06K 7/10* | (2006.01) |
| *G07B 15/00* | (2011.01) |
| *G06K 19/07* | (2006.01) |

(52) U.S. Cl.
CPC ......... *G06K 19/0704* (2013.01); *G06Q 20/18* (2013.01); *G06Q 20/3278* (2013.01); *G06Q 20/352* (2013.01); *G07B 15/00* (2013.01); *Y04S 50/12* (2013.01); *Y10T 29/49826* (2015.01)

(56) References Cited

U.S. PATENT DOCUMENTS

| | | | |
|---|---|---|---|
| 1,445,771 A | 2/1923 | Keplinger | |
| 1,818,568 A | 8/1931 | Melick | 194/203 |
| D98,810 S | 3/1936 | Magee | |
| D100,875 S | 8/1936 | Michaels | |
| D101,237 S | 9/1936 | Miller | |
| D107,577 S | 12/1937 | McGay | D10/42 |
| 2,118,318 A | 5/1938 | Magee | 194/84 |
| D112,677 S | 12/1938 | Broussard et al. | |
| 2,161,046 A | 6/1939 | Hitzeman | 194/205 |
| D116,805 S | 9/1939 | Reznek | |
| 2,229,183 A | 1/1941 | Mitchell | 194/277 |
| 2,261,353 A | 11/1941 | Gaetano | 70/120 |
| 2,289,838 A | 7/1942 | Herschede et al. | 194/226 |
| D152,294 S | 1/1949 | Siegel et al. | D20/10 |
| D152,587 S | 2/1949 | Brundage | D52/3 |
| D154,716 S | 8/1949 | Simpson | D10/42 |
| 2,483,805 A | 10/1949 | Broussard et al. | 232/1 |
| 2,495,784 A | 1/1950 | Starts | |
| D161,888 S | 2/1951 | Wilkin | D52/3 |
| D162,698 S | 3/1951 | Teague | D52/3 |
| 2,546,433 A | 3/1951 | Dick | 368/6 |
| 2,547,272 A | 4/1951 | Lawson et al. | 116/282 |
| 2,550,433 A | 4/1951 | Tichenor | 224/1 |
| 2,570,920 A | 10/1951 | Clough et al. | 232/16 |
| D166,059 S | 2/1952 | Yoss | D10/42 |
| 2,594,388 A | 4/1952 | Broussard | 194/1 |
| 2,595,124 A | 4/1952 | Campbell | 250/27 |
| D166,753 S | 5/1952 | Jones | D10/42 |
| 2,596,122 A | 5/1952 | Broussard | 194/101 |
| 2,596,123 A | 5/1952 | Broussard | 194/1 |
| 2,596,124 A | 5/1952 | Broussard | 368/90 |
| 2,599,881 A | 6/1952 | Woodruff | 368/92 |
| 2,613,792 A | 10/1952 | Broussard | 194/72 |
| 2,613,871 A | 10/1952 | Broussard et al. | 232/16 |
| 2,618,371 A | 11/1952 | Broussard | 194/84 |
| 2,633,960 A | 4/1953 | Broussard | 194/72 |
| D181,359 S | 11/1957 | Jones | D10/42 |
| 2,818,371 A | 12/1957 | Wessinger | 167/93 |
| 2,822,682 A | 2/1958 | Sollenberger | 70/158 |
| 2,832,506 A | 4/1958 | Hatcher | 221/103 |
| D189,106 S | 10/1960 | Leiderman | D52/3 |
| 2,956,525 A | 10/1960 | Blauvelt | 109/59 |
| 2,985,978 A | 5/1961 | Breen et al. | 40/333 |
| 2,988,191 A | 6/1961 | Grant | 194/1 |
| 2,995,230 A | 8/1961 | Moody et al. | 194/9 |
| 3,018,615 A | 1/1962 | Minton et al. | 368/7 |
| 3,056,544 A | 10/1962 | Sollenberger et al. | 232/16 |
| D199,270 S | 9/1964 | Michaels | D52/3 |
| D200,216 S | 2/1965 | Broussard | D52/3 |
| 3,183,411 A | 5/1965 | Palfi | 317/123 |
| 3,199,321 A | 8/1965 | Sollenberger | 70/1.5 |
| 3,204,438 A | 9/1965 | Sollenberger | 70/417 |
| 3,208,061 A | 9/1965 | Gervasi et al. | 340/539.31 |
| 3,262,540 A | 7/1966 | Sollenberger et al. | 194/72 |
| 3,272,299 A | 9/1966 | Sollenberger | 194/2 |
| 3,324,647 A | 6/1967 | Jedynak | 368/6 |
| 3,373,856 A | 3/1968 | Kusters et al. | 194/100 |
| 3,438,031 A | 4/1969 | Fathauer | 343/8 |
| 3,486,324 A | 12/1969 | Andersson | 368/90 |
| 3,519,113 A | 7/1970 | Arzig et al. | 194/2 |
| 3,535,870 A | 10/1970 | Mitchell | 58/142 |
| 3,565,283 A | 2/1971 | Sciacero et al. | 221/197 |
| 3,637,277 A | 1/1972 | Krug et al. | 312/217 |
| 3,666,067 A | 5/1972 | Kaiser | 194/225 |
| 3,721,463 A | 3/1973 | Attwood et al. | 287/20.3 |
| 3,770,090 A | 11/1973 | Fayling et al. | 194/1 B |
| D234,606 S | 3/1975 | Gamble | D23/150 |
| 3,941,989 A | 3/1976 | McLaughlin et al. | 235/156 |
| 3,975,934 A | 8/1976 | Babai et al. | 70/120 |
| 3,982,620 A | 9/1976 | Kortenhaus | 194/1 N |
| 3,991,595 A | 11/1976 | Bahry et al. | 70/120 |
| 3,999,372 A | 12/1976 | Welch et al. | 58/142 |
| 4,031,991 A | 6/1977 | Malott | 194/1 R |
| 4,043,117 A | 8/1977 | Maresca et al. | 58/142 |
| 4,147,707 A | 4/1979 | Alewelt et al. | 260/37 SB |
| 4,237,710 A | 12/1980 | Cardozo | 70/108 |
| 4,248,336 A | 2/1981 | Fiedler | 194/97 |
| 4,249,648 A | 2/1981 | Meyer | 194/102 |
| 4,264,963 A | 4/1981 | Leach | 364/707 |
| 4,306,219 A | 12/1981 | Main et al. | 340/825.54 |
| 4,317,180 A | 2/1982 | Lies | 364/707 |
| 4,317,181 A | 2/1982 | Teza et al. | 364/707 |
| 4,323,847 A | 4/1982 | Karbowski | 324/327 |
| 4,379,334 A | 4/1983 | Feagins, Jr. et al. | 364/467 |
| 4,409,665 A | 10/1983 | Tubbs | 364/707 |
| 4,432,447 A | 2/1984 | Tanaka | 194/100 |
| 4,460,080 A | 7/1984 | Howard | 194/100 A |
| 4,474,281 A | 10/1984 | Roberts et al. | 194/1 N |
| 4,479,191 A | 10/1984 | Nojima et al. | 364/707 |
| 4,483,431 A | 11/1984 | Pratt | 194/97 |
| D278,689 S | 5/1985 | Jupe | D10/42 |
| 4,574,936 A | 3/1986 | Klinger | 194/318 |
| 4,639,021 A | 1/1987 | Hope | 292/7 |
| D288,441 S | 2/1987 | Lalonde | D14/55 |
| D289,914 S | 5/1987 | Willinger et al. | D23/4 |
| 4,678,994 A | 7/1987 | Davies | 324/236 |
| 4,742,903 A | 5/1988 | Trummer | 194/317 |
| 4,749,074 A | 6/1988 | Ueki et al. | 194/317 |
| D296,795 S | 7/1988 | Bouve | D20/10 |
| 4,763,769 A | 8/1988 | Levasseur | 194/217 |
| 4,809,838 A | 3/1989 | Houserman | 194/317 |
| 4,812,805 A | 3/1989 | Lachat et al. | 340/825.05 |
| 4,823,928 A | 4/1989 | Speas | |
| 4,825,425 A | 4/1989 | Turner | 368/7 |
| 4,827,206 A | 5/1989 | Speas | 323/299 |
| 4,845,484 A | 7/1989 | Ellsberg | 340/825.35 |
| 4,848,556 A | 7/1989 | Shah et al. | 194/212 |
| 4,851,987 A | 7/1989 | Day | 364/200 |
| 4,872,149 A | 10/1989 | Speas | 368/90 |
| 4,875,598 A | 10/1989 | Dahl | 221/4 |
| 4,880,097 A | 11/1989 | Speas | 194/239 |
| 4,880,406 A | 11/1989 | Van Horn et al. | 464/38 |
| 4,895,238 A | 1/1990 | Speas | 194/319 |
| 4,951,799 A | 8/1990 | Kai | 194/317 |
| 4,967,895 A | 11/1990 | Speas | 194/200 |
| 4,976,630 A | 12/1990 | Schuder et al. | 439/260 |
| 4,989,714 A | 2/1991 | Abe | 194/317 |
| 5,027,935 A | 7/1991 | Berg et al. | 194/318 |
| 5,029,094 A | 7/1991 | Wong | 364/467 |
| D319,077 S | 8/1991 | Arato et al. | D20/6 |
| 5,060,777 A | 10/1991 | Van Horn et al. | 194/317 |
| 5,065,156 A | 11/1991 | Bernier | 340/932.2 |
| 5,076,414 A | 12/1991 | Kimoto | 194/317 |
| 5,088,073 A | 2/1992 | Speas | 368/90 |
| 5,109,972 A | 5/1992 | Van Horn et al. | 194/217 |
| 5,119,916 A | 6/1992 | Carmen et al. | 194/210 |
| 5,155,614 A | 10/1992 | Carmen et al. | 398/202 |
| 5,158,166 A | 10/1992 | Barson | 194/319 |
| 5,184,707 A | 2/1993 | Van Horn et al. | 194/204 |
| 5,192,855 A | 3/1993 | Insulander et al. | 235/381 |

(56) References Cited

U.S. PATENT DOCUMENTS

| | | | |
|---|---|---|---|
| D336,860 S | 6/1993 | Clough | D10/42 |
| 5,222,076 A | 6/1993 | Ng et al. | 375/9 |
| 5,244,070 A | 9/1993 | Carmen et al. | 194/319 |
| D340,038 S | 10/1993 | Venne et al. | D14/420 |
| 5,259,491 A | 11/1993 | Ward, II | 194/350 |
| 5,266,947 A | 11/1993 | Fujiwara et al. | 340/932.2 |
| D342,209 S | 12/1993 | Clough | D10/42 |
| 5,273,151 A | 12/1993 | Carmen et al. | 194/319 |
| 5,287,384 A | 2/1994 | Avery et al. | 375/1 |
| 5,293,979 A | 3/1994 | Levasseur | 194/317 |
| 5,298,894 A | 3/1994 | Cerny et al. | 340/870.02 |
| 5,343,237 A | 8/1994 | Morimoto | 348/143 |
| D351,193 S | 10/1994 | Abe | D20/9 |
| 5,351,798 A | 10/1994 | Hayes | 194/318 |
| 5,360,095 A | 11/1994 | Speas | 194/217 |
| D354,835 S | 1/1995 | Brendel | D99/43 |
| 5,382,780 A | 1/1995 | Carmen | 235/384 |
| 5,402,475 A | 3/1995 | Lesner, Jr. et al. | 379/106 |
| 5,407,049 A | 4/1995 | Jacobs | 194/200 |
| D360,734 S | 7/1995 | Hall | D99/28 |
| D360,737 S | 7/1995 | Helbig, Jr. | D99/28 |
| 5,439,089 A | 8/1995 | Parker | 194/317 |
| 5,442,348 A | 8/1995 | Mushell | 340/932.2 |
| 5,454,461 A | 10/1995 | Jacobs | 194/200 |
| D364,165 S | 11/1995 | Esslinger | D14/213 |
| 5,471,139 A | 11/1995 | Zadoff | 324/244.1 |
| 5,475,373 A | 12/1995 | Speas | 340/815.58 |
| 5,489,014 A | 2/1996 | Menoud | 194/211 |
| 5,500,517 A | 3/1996 | Cagliostro | 235/486 |
| 5,526,662 A | 6/1996 | Diekhoff et al. | 70/278 |
| 5,563,491 A | 10/1996 | Tseng | 320/2 |
| 5,568,441 A | 10/1996 | Sanemitsu | 365/229 |
| D375,607 S | 11/1996 | Hall | D99/28 |
| 5,570,771 A | 11/1996 | Jacobs | 194/200 |
| 5,573,099 A | 11/1996 | Church et al. | 194/317 |
| 5,614,892 A | 3/1997 | Ward, II et al. | 340/870.02 |
| 5,617,942 A | 4/1997 | Ward, II et al. | 194/217 |
| 5,619,932 A | 4/1997 | Efland et al. | 109/24.1 |
| 5,640,002 A | 6/1997 | Ruppert et al. | 235/472 |
| 5,642,119 A | 6/1997 | Jacobs | 342/69 |
| 5,648,906 A | 7/1997 | Amirpanahi | 705/418 |
| D381,976 S | 8/1997 | Sandor et al. | D14/420 |
| 5,659,306 A | 8/1997 | Bahar | 340/932.2 |
| 5,687,129 A | 11/1997 | Kim | 365/229 |
| D388,231 S | 12/1997 | Magee et al. | D99/28 |
| 5,710,743 A | 1/1998 | Dee et al. | 368/90 |
| D391,238 S | 2/1998 | Sakata | D14/420 |
| 5,732,812 A | 3/1998 | Grainger et al. | 194/217 |
| D393,212 S | 4/1998 | Lucas | D10/42 |
| 5,737,710 A | 4/1998 | Anthonyson | 701/1 |
| 5,740,050 A | 4/1998 | Ward, II | 364/464.28 |
| 5,748,103 A | 5/1998 | Flach et al. | 340/870.07 |
| D395,133 S | 6/1998 | Mikami et al. | D99/43 |
| 5,761,061 A | 6/1998 | Amano | 364/187 |
| 5,777,302 A | 7/1998 | Nakagawa et al. | 235/7 A |
| 5,777,951 A | 7/1998 | Mitschele et al. | 368/90 |
| 5,777,957 A | 7/1998 | Lyman | 369/37 |
| 5,778,067 A | 7/1998 | Jones et al. | 380/24 |
| D396,655 S | 8/1998 | Anderson | D10/42 |
| 5,803,228 A | 9/1998 | Lucas | 194/350 |
| 5,805,083 A | 9/1998 | Sutton et al. | 340/932.2 |
| 5,806,651 A | 9/1998 | Carmen et al. | 194/319 |
| D400,115 S | 10/1998 | Yaron et al. | D10/104 |
| 5,833,042 A | 11/1998 | Baitch et al. | 194/317 |
| 5,841,369 A | 11/1998 | Sutton et al. | 340/932.2 |
| 5,842,411 A | 12/1998 | Johnson | 101/36 |
| 5,845,268 A | 12/1998 | Moore | 705/418 |
| 5,852,411 A | 12/1998 | Jacobs et al. | 340/932.2 |
| D404,025 S | 1/1999 | Van Horne et al. | D14/331 |
| 5,903,520 A | 5/1999 | Dee et al. | 368/90 |
| 5,906,260 A | 5/1999 | Goodrich | 194/203 |
| 5,911,763 A | 6/1999 | Quesada | 70/120 |
| D411,848 S | 7/1999 | Maruska et al. | D16/202 |
| D412,289 S | 7/1999 | Winwood | D10/42 |
| D413,311 S | 8/1999 | Blalock | D14/420 |
| 5,936,527 A | 8/1999 | Isaacman et al. | 340/572.1 |
| 5,940,481 A | 8/1999 | Zeitman | 379/114 |
| 5,954,182 A | 9/1999 | Wei | 194/345 |
| 5,966,345 A | 10/1999 | Dee et al. | 368/90 |
| 6,026,946 A | 2/2000 | McCarty, Jr. | 194/317 |
| 6,037,880 A | 3/2000 | Manion | 340/932.2 |
| 6,052,453 A | 4/2000 | Sagady et al. | 379/146 |
| 6,078,272 A | 6/2000 | Jacobs et al. | 340/932.2 |
| 6,081,205 A | 6/2000 | Williams | 340/932.2 |
| 6,081,206 A | 6/2000 | Keilland | 340/937 |
| 6,082,153 A | 7/2000 | Schoell et al. | 70/1.5 |
| 6,098,361 A | 8/2000 | Roten et al. | 52/298 |
| 6,107,942 A | 8/2000 | Yoo et al. | 340/932.2 |
| 6,109,418 A | 8/2000 | Yost | 194/350 |
| 6,111,522 A | 8/2000 | Hiltz et al. | 340/932.2 |
| 6,116,403 A | 9/2000 | Kiehl | 194/217 |
| D431,788 S | 10/2000 | Tuxen et al. | D10/42 |
| 6,132,152 A | 10/2000 | Kaibach et al. | 411/54.1 |
| 6,147,624 A | 11/2000 | Clapper | 340/932.2 |
| 6,188,328 B1 | 2/2001 | Ho | 340/932.2 |
| 6,193,045 B1 | 2/2001 | Ishida et al. | 194/203 |
| 6,195,015 B1 | 2/2001 | Jacobs et al. | 340/693.9 |
| D439,591 S | 3/2001 | Reidt et al. | D16/208 |
| RE37,193 E | 5/2001 | Ward et al. | 194/217 |
| 6,227,343 B1 | 5/2001 | Neathway et al. | 194/319 |
| 6,229,455 B1 | 5/2001 | Yost et al. | 340/943 |
| 6,230,868 B1 | 5/2001 | Tuxen et al. | 194/217 |
| 6,243,028 B1 | 6/2001 | Krygler et al. | 340/932.2 |
| 6,243,029 B1 | 6/2001 | Tomer | 340/932.2 |
| 6,275,169 B1 | 8/2001 | Krygler et al. | 340/932.2 |
| 6,275,170 B1 | 8/2001 | Jacobs et al. | 340/932.2 |
| D447,714 S | 9/2001 | Cappiello | D10/104 |
| D448,910 S | 10/2001 | Kit et al. | D99/28 |
| D449,010 S | 10/2001 | Petrucelli | D10/109 |
| 6,309,098 B1 | 10/2001 | Wong | 368/94 |
| D450,253 S | 11/2001 | Marguet | D10/42 |
| 6,312,152 B2 | 11/2001 | Dee et al. | 368/90 |
| 6,321,201 B1 | 11/2001 | Dahl | 705/1 |
| RE37,531 E | 1/2002 | Chaco et al. | 379/38 |
| 6,340,935 B1 | 1/2002 | Hall | 340/932.2 |
| 6,344,806 B1 | 2/2002 | Katz | 340/932.2 |
| D454,421 S | 3/2002 | Jeon et al. | D99/28 |
| D454,807 S | 3/2002 | Cappiello | D10/109 |
| 6,354,425 B1 | 3/2002 | Tuxen et al. | 194/350 |
| 6,366,220 B1 | 4/2002 | Elliott | 340/928 |
| 6,373,401 B2 | 4/2002 | Ho | 340/932.2 |
| 6,373,422 B1 | 4/2002 | Mostafa | 341/155 |
| 6,373,442 B1 | 4/2002 | Thomas et al. | 343/767 |
| 6,380,851 B1 | 4/2002 | Gilbert et al. | 340/517 |
| D460,005 S | 7/2002 | Jacquet | D10/42 |
| D461,728 S | 8/2002 | Tuxen et al. | D10/42 |
| 6,456,491 B1 | 9/2002 | Flannery et al. | 361/685 |
| D463,749 S | 10/2002 | Petrucelli | D10/109 |
| 6,457,586 B2 | 10/2002 | Yasuda et al. | 209/534 |
| 6,467,602 B2 | 10/2002 | Bench et al. | 194/217 |
| 6,477,875 B2 | 11/2002 | Field et al. | 70/491 |
| D467,954 S | 12/2002 | Suzuki et al. | D16/208 |
| 6,493,676 B1 | 12/2002 | Levy | 705/13 |
| 6,505,774 B1 | 1/2003 | Fulcher et al. | |
| D471,238 S | 3/2003 | Showers et al. | 20/8 |
| D472,362 S | 3/2003 | Zerman et al. | D99/28 |
| 6,559,776 B2 | 5/2003 | Katz | 340/932.2 |
| 6,575,281 B2 | 6/2003 | Lee | 192/49 |
| D477,030 S | 7/2003 | Kolls et al. | D20/8 |
| D481,516 S | 10/2003 | Magee et al. | D99/28 |
| D485,417 S | 1/2004 | Magee et al. | D99/28 |
| 6,697,730 B2 | 2/2004 | Dickerson | 701/200 |
| D488,280 S | 4/2004 | Zerman et al. | D99/28 |
| D492,080 S | 6/2004 | Magee et al. | D99/28 |
| D492,081 S | 6/2004 | Magee et al. | 99/28 |
| 6,747,575 B2 | 6/2004 | Chauvin et al. | 340/932.2 |
| 6,763,094 B2 | 7/2004 | Conn et al. | 379/91.01 |
| D494,730 S | 8/2004 | Magee et al. | D99/28 |
| 6,791,473 B2 | 9/2004 | Kibria et al. | 340/932.2 |
| RE38,626 E | 10/2004 | Kielland | 340/937 |
| D497,393 S | 10/2004 | Herbst | D20/99 |
| 6,799,387 B2 | 10/2004 | Pippins | 37/456 |
| D497,814 S | 11/2004 | Odinotski et al. | D10/42 |
| D498,795 S | 11/2004 | Nunn | D20/8 |

(56) References Cited

U.S. PATENT DOCUMENTS

| | | | |
|---|---|---|---|
| 6,823,317 B1 | 11/2004 | Ouimet et al. | 705/13 |
| 6,856,922 B1 | 2/2005 | Austin et al. | 702/63 |
| 6,874,340 B1 | 4/2005 | Berman | 7/161 |
| D505,240 S | 5/2005 | Swaine et al. | D99/28 |
| 6,889,899 B2 | 5/2005 | Silberberg | 235/384 |
| D506,509 S | 6/2005 | Nunn | D20/9 |
| D506,769 S | 6/2005 | Asai | D16/203 |
| 6,914,411 B2 | 7/2005 | Couch et al. | 320/101 |
| D508,064 S | 8/2005 | Ramirez | D16/200 |
| 6,929,179 B2 | 8/2005 | Fulcher et al. | 235/381 |
| D510,751 S | 10/2005 | Magee et al. | D20/3 |
| 7,004,385 B1 | 2/2006 | Douglass | 235/379 |
| 7,014,355 B2 | 3/2006 | Potter, Sr. et al. | 368/90 |
| 7,019,420 B2 | 3/2006 | Kogan et al. | 307/150 |
| 7,019,670 B2 | 3/2006 | Bahar | 340/932.2 |
| 7,027,773 B1 | 4/2006 | McMillin | 455/41.2 |
| 7,027,808 B2 | 4/2006 | Wesby | 455/419 |
| 7,028,888 B2 | 4/2006 | Laskowski | 235/379 |
| 7,029,167 B1 | 4/2006 | Mitschele | 368/90 |
| 7,040,534 B2 | 5/2006 | Turocy et al. | 235/379 |
| D524,834 S | 7/2006 | Dozier et al. | D16/200 |
| 7,071,839 B2 | 7/2006 | Patel et al. | 340/933 |
| 7,104,447 B1 | 9/2006 | Lopez et al. | 235/384 |
| 7,114,651 B2 | 10/2006 | Hjelmvik | 235/384 |
| 7,181,426 B2 | 2/2007 | Dutta | 705/37 |
| 7,183,999 B2 | 2/2007 | Matthews et al. | 345/1.1 |
| D538,505 S | 3/2007 | Kang et al. | D99/28 |
| D543,588 S | 5/2007 | Herbert et al. | D20/8 |
| 7,222,031 B2 | 5/2007 | Heatley | |
| 7,222,782 B2 | 5/2007 | Lute, Jr. et al. | 235/379 |
| 7,237,176 B2 | 6/2007 | Briggs et al. | 714/67 |
| D546,365 S | 7/2007 | Jost et al. | D16/221 |
| 7,237,716 B2 | 7/2007 | Silberberg | 235/384 |
| 7,253,747 B2 | 8/2007 | Noguchi | 340/932.2 |
| 7,284,692 B1 | 10/2007 | Douglass | 235/379 |
| 7,319,974 B1 | 1/2008 | Brusseaux | 705/37 |
| 7,330,131 B2 | 2/2008 | Zanotti et al. | 340/932.2 |
| D570,920 S | 6/2008 | Choi | D20/2 |
| 7,382,238 B2 | 6/2008 | Kavaler | 340/438 |
| 7,382,281 B2 | 6/2008 | Kavaler | 340/941 |
| 7,382,282 B2 | 6/2008 | Kavaler | 340/941 |
| 7,388,349 B2 | 6/2008 | Elder et al. | 320/104 |
| 7,388,517 B2 | 6/2008 | Kavaler | 340/941 |
| 7,393,134 B2 | 7/2008 | Mitschele | 368/90 |
| D575,168 S | 8/2008 | King et al. | D10/42 |
| 7,419,091 B1 | 9/2008 | Scanlon | 235/379 |
| 7,427,931 B1 | 9/2008 | Kavaler et al. | 340/941 |
| D579,795 S | 11/2008 | Martinez et al. | D10/42 |
| 7,445,144 B2 | 11/2008 | Schlabach et al. | 235/379 |
| D582,125 S | 12/2008 | Kang et al. | D99/28 |
| D587,141 S | 2/2009 | King et al. | D10/42 |
| D588,916 S | 3/2009 | DeMarco | D9/504 |
| 7,533,802 B1 | 5/2009 | McGinley et al. | 235/379 |
| D596,374 S | 7/2009 | Kang et al. | D99/28 |
| 7,558,564 B2 | 7/2009 | Wesby | 455/419 |
| 7,594,235 B2 | 9/2009 | Moreau | 719/310 |
| D602,225 S | 10/2009 | Lute et al. | D99/28 |
| 7,617,120 B2 | 11/2009 | Derasmo et al. | 705/13 |
| D605,145 S | 12/2009 | Kellar | D14/125 |
| 7,624,919 B2 | 12/2009 | Meek et al. | 235/379 |
| 7,699,224 B2 | 4/2010 | Molé | 235/439 |
| D615,274 S | 5/2010 | Kim et al. | D99/28 |
| D617,799 S | 6/2010 | Odhe et al. | D14/420 |
| 7,739,000 B2 | 6/2010 | Kevaler | 701/1 |
| 7,748,620 B2 | 7/2010 | Gomez et al. | 235/383 |
| 7,772,720 B2 | 8/2010 | McGee et al. | 307/66 |
| 7,780,072 B1 | 8/2010 | Lute et al. | 235/379 |
| D625,305 S | 10/2010 | Bleck et al. | D14/307 |
| 7,806,248 B2 | 10/2010 | Hunter et al. | 194/317 |
| D627,814 S | 11/2010 | Tzeng et al. | D16/202 |
| 7,825,826 B2 | 11/2010 | Welch | 340/932.2 |
| 7,854,310 B2 | 12/2010 | King et al. | 194/350 |
| 7,855,661 B2 | 12/2010 | Ponert | 340/932.2 |
| 7,874,482 B2 | 1/2011 | Mitschele | 235/384 |
| D632,740 S | 2/2011 | Adeline | D20/2 |
| D634,417 S | 3/2011 | Abbondanzio et al. | D23/366 |
| 7,933,841 B2 | 4/2011 | Schmeyer et al. | 705/64 |
| D645,223 S | 9/2011 | Bleck et al. | D99/28 |
| 8,035,533 B2 | 10/2011 | Kavaler | 340/933 |
| 8,044,139 B2 | 10/2011 | Youn et al. | 524/606 |
| D652,329 S | 1/2012 | MacKay et al. | D10/42 |
| D652,872 S | 1/2012 | Mougin et al. | D20/1 |
| D653,014 S | 1/2012 | Rohan et al. | D99/28 |
| D653,420 S | 1/2012 | Rohan et al. | D99/28 |
| D653,421 S | 1/2012 | Rohan et al. | D99/28 |
| D653,424 S | 1/2012 | Rohan et al. | D99/28 |
| D654,816 S | 2/2012 | MacKay et al. | D10/42 |
| RE43,245 E | 3/2012 | Ouimet et al. | 705/13 |
| D655,263 S | 3/2012 | Tsai | D14/125 |
| D656,046 S | 3/2012 | MacKay et al. | D10/42 |
| 8,138,950 B1 | 3/2012 | Leung | 340/932.2 |
| 8,144,034 B2 | 3/2012 | Kavaler | 340/941 |
| D659,557 S | 5/2012 | Jones et al. | D10/42 |
| 8,184,019 B2 | 5/2012 | Chauvin et al. | 340/932.2 |
| D661,603 S | 6/2012 | MacKay et al. | D10/42 |
| 8,193,540 B2 | 6/2012 | Huang et al. | 257/81 |
| 8,232,894 B2 | 7/2012 | Weiss et al. | 340/932.2 |
| 8,264,401 B1 | 9/2012 | Kavaler | 342/128 |
| 8,279,107 B2 | 10/2012 | Krstanovic et al. | 342/27 |
| D672,525 S | 12/2012 | Lee et al. | D99/28 |
| D674,985 S | 1/2013 | Lee | D99/28 |
| D677,035 S | 2/2013 | Lee et al. | D99/28 |
| 8,395,532 B2 | 3/2013 | Chauvin et al. | 340/932.2 |
| 8,402,281 B2 | 3/2013 | Dahl | 718/189 |
| D680,156 S | 4/2013 | Hernandez et al. | D18/4.4 |
| D681,717 S | 5/2013 | Helgesson et al. | D18/4.6 |
| 8,450,627 B2 | 5/2013 | Mittleman et al. | 200/600 |
| D683,779 S | 6/2013 | Uemachi et al. | D16/202 |
| D683,794 S | 6/2013 | Randall | D20/8 |
| D683,795 S | 6/2013 | Randall | D20/8 |
| D684,745 S | 6/2013 | Reuter et al. | D99/28 |
| D684,870 S | 6/2013 | Jones et al. | D10/42 |
| 8,479,909 B2 | 7/2013 | King et al. | 194/302 |
| 8,487,754 B2 | 7/2013 | Mitschele | 340/539.1 |
| D687,809 S | 8/2013 | Bergmann et al. | D14/209.1 |
| 8,513,832 B2 | 8/2013 | Hunter et al. | 307/66 |
| D690,771 S | 10/2013 | Randall | D20/9 |
| D691,165 S | 10/2013 | Attoma | D14/486 |
| 8,566,159 B2 | 10/2013 | King et al. | 705/14.53 |
| D692,784 S | 11/2013 | Anderssen et al. | D10/70 |
| D693,983 S | 11/2013 | Budde et al. | D99/28 |
| 8,589,216 B2 | 11/2013 | Yu et al. | 705/13 |
| 8,590,687 B2 | 11/2013 | King et al. | 194/350 |
| 8,595,054 B2 | 11/2013 | King et al. | 705/13 |
| D696,484 S | 12/2013 | Lee et al. | D99/28 |
| D696,485 S | 12/2013 | Lee et al. | D99/28 |
| 8,621,245 B2 | 12/2013 | Shearer et al. | 713/300 |
| 8,631,921 B2 | 1/2014 | Jones et al. | 194/350 |
| 8,662,279 B2 | 3/2014 | Jones et al. | 194/350 |
| 8,666,801 B2 | 3/2014 | Cho | 705/13 |
| D702,913 S | 4/2014 | Budde et al. | D99/28 |
| D702,914 S | 4/2014 | Budde et al. | D99/28 |
| 8,684,158 B2 | 4/2014 | Jones et al. | 194/215 |
| D705,090 S | 5/2014 | MacKay et al. | D10/42 |
| 8,727,207 B1 | 5/2014 | Church et al. | 235/33 |
| D707,140 S | 6/2014 | King et al. | D10/42 |
| D707,141 S | 6/2014 | King et al. | D10/42 |
| D707,142 S | 6/2014 | King et al. | D10/42 |
| 8,749,403 B2 | 6/2014 | King et al. | 340/932.2 |
| 8,770,371 B2 | 7/2014 | MacKay et al. | 194/350 |
| 8,807,317 B2 | 8/2014 | MacKay et al. | 194/350 |
| D714,165 S | 9/2014 | Salama | D10/42 |
| D716,156 S | 10/2014 | Jones et al. | D10/42 |
| D716,515 S | 10/2014 | Cha et al. | D99/28 |
| 8,862,494 B2 | 10/2014 | King et al. | 705/13 |
| D716,671 S | 11/2014 | Jones et al. | D10/42 |
| D722,740 S | 2/2015 | Budde et al. | D99/28 |
| D724,290 S | 3/2015 | Cha et al. | D99/28 |
| D724,811 S | 3/2015 | Reitinger | D99/28 |
| D724,812 S | 3/2015 | Cha et al. | D99/28 |
| D728,190 S | 4/2015 | Sheley | D99/28 |
| 9,002,723 B2 | 4/2015 | King et al. | 340/932.2 |
| 9,047,712 B2 | 6/2015 | King et al. | 705/1.1 |
| D733,585 S | 7/2015 | Jones et al. | D10/42 |

(56) References Cited

U.S. PATENT DOCUMENTS

| | | |
|---|---|---|
| D735,437 S | 7/2015 | Randall ............... D99/28 |
| D735,438 S | 7/2015 | Randall ............... D99/28 |
| D735,439 S | 7/2015 | Randall ............... D99/28 |
| D735,440 S | 7/2015 | Randall ............... D99/28 |
| D735,963 S | 8/2015 | Randall ............... D99/28 |
| D735,964 S | 8/2015 | Randall ............... D99/28 |
| D735,965 S | 8/2015 | Randall ............... D99/28 |
| D739,637 S | 9/2015 | Randall ............... D99/28 |
| D739,638 S | 9/2015 | Randall ............... D99/28 |
| D739,639 S | 9/2015 | Randall ............... D99/28 |
| 9,127,964 B2 | 9/2015 | Schwarz et al. ........ 340/943 |
| D742,090 S | 10/2015 | Randall ............... D99/28 |
| 9,196,097 B2 | 11/2015 | Jones et al. ......... 340/870.02 |
| D746,015 S | 12/2015 | King et al. ........... D99/28 |
| D748,364 S | 1/2016 | King et al. ........... D99/28 |
| D748,888 S | 2/2016 | King et al. ........... D99/28 |
| D749,000 S | 2/2016 | King et al. ........... D10/42 |
| D750,513 S | 3/2016 | King et al. ........... D10/70 |
| D752,552 S | 3/2016 | D'Ascanio et al. ..... D14/216 |
| D755,649 S | 5/2016 | King et al. ........... D10/42 |
| D755,650 S | 5/2016 | King et al. ........... D10/42 |
| D756,807 S | 5/2016 | King et al. ........... D10/42 |
| D756,808 S | 5/2016 | King et al. ........... D10/42 |
| D762,040 S | 7/2016 | King et al. ........... D99/28 |
| 9,391,474 B2 | 7/2016 | Hunter et al. ......... H02J 9/06 |
| 9,424,691 B2 | 8/2016 | King et al. .......... G07B 15/02 |
| 9,443,236 B2 * | 9/2016 | MacKay ............ G07F 17/248 |
| 9,508,198 B1 | 11/2016 | King et al. .......... G07B 15/02 |
| D779,771 S | 2/2017 | King et al. ........... D99/28 |
| D779,772 S | 2/2017 | King et al. ........... D99/28 |
| D779,773 S | 2/2017 | King et al. ........... D99/28 |
| D779,774 S | 2/2017 | King et al. ........... D99/28 |
| D781,024 S | 3/2017 | King et al. ........... D99/28 |
| 9,661,403 B2 | 5/2017 | King et al. .......... H04Q 9/00 |
| 2001/0012241 A1 | 8/2001 | Dee et al. ............... 368/90 |
| 2001/0047278 A1 | 11/2001 | Brookner et al. ............ 705/1 |
| 2001/0051531 A1 | 12/2001 | Singhal et al. ........... 455/556 |
| 2002/0008639 A1 | 1/2002 | Dee ................... 340/932.2 |
| 2002/0030606 A1 | 3/2002 | Chauvin et al. ........ 340/932.2 |
| 2002/0062172 A1 | 5/2002 | Bench et al. ............. 700/232 |
| 2002/0074344 A1 | 6/2002 | Long et al. ................ 222/71 |
| 2002/0080013 A1 | 6/2002 | Anderson, III et al. ... 340/425.5 |
| 2002/0111768 A1 | 8/2002 | Ghorayeb et al. .......... 702/178 |
| 2002/0134645 A1 | 9/2002 | Alexander et al. ......... 194/351 |
| 2003/0017904 A1 | 1/2003 | Lee ..................... 475/232 |
| 2003/0092387 A1 | 5/2003 | Hjelmvik ................. 455/41 |
| 2003/0112151 A1 | 6/2003 | Chauvin et al. ........ 340/870.02 |
| 2003/0112597 A1 | 6/2003 | Smith .................... 361/685 |
| 2003/0117904 A1 | 6/2003 | Lank et al. |
| 2003/0121754 A1 | 7/2003 | King .................... 194/302 |
| 2003/0128010 A1 | 7/2003 | Hsu ..................... 320/101 |
| 2003/0128136 A1 | 7/2003 | Spier et al. ............ 340/932.2 |
| 2003/0132840 A1 | 7/2003 | Bahar .................... 340/541 |
| 2003/0135407 A1 | 7/2003 | Reinhardt et al. ........... 705/13 |
| 2003/0140531 A1 | 7/2003 | Pippins .................. 37/456 |
| 2003/0144905 A1 | 7/2003 | Smith .................... 705/14 |
| 2003/0144972 A1 | 7/2003 | Cordery et al. ........... 705/401 |
| 2003/0169183 A1 | 9/2003 | Korepanov et al. ....... 340/932.2 |
| 2003/0179107 A1 | 9/2003 | Kibria et al. .......... 340/932.2 |
| 2003/0220835 A1 | 11/2003 | Barnes, Jr. ............... 705/14 |
| 2003/0222792 A1 | 12/2003 | Berman et al. .......... 340/932.2 |
| 2003/0234888 A1 | 12/2003 | Hong et al. ............... 348/375 |
| 2004/0011099 A1 | 1/2004 | Andersson ................ 70/371 |
| 2004/0016796 A1 | 1/2004 | Hanna et al. ............. 235/375 |
| 2004/0039632 A1 | 2/2004 | Han et al. ................ 705/13 |
| 2004/0040028 A1 | 2/2004 | Moreau .................. 719/310 |
| 2004/0068434 A1 | 4/2004 | Kanekon |
| 2004/0084278 A1 | 5/2004 | Harris et al. ............. 194/302 |
| 2004/0094619 A1 | 5/2004 | Silberberg ............... 235/382 |
| 2004/0160905 A1 | 8/2004 | Bernier et al. ............ 370/310 |
| 2004/0181496 A1 | 9/2004 | Odinotski et al. .......... 705/418 |
| 2004/0232878 A1 | 11/2004 | Couch et al. ............. 320/101 |
| 2004/0243526 A1 | 12/2004 | Krygler et al. ............ 705/418 |
| 2004/0254900 A1 | 12/2004 | Reinhard ................. 705/418 |
| 2004/0262379 A1 | 12/2004 | Gomes .................. 235/379 |
| 2004/0263117 A1 | 12/2004 | Kogan et al. ............. 320/114 |
| 2004/0264302 A1 | 12/2004 | Ward, II ................. 368/90 |
| 2005/0029340 A1 | 2/2005 | Ferraro .................. 235/379 |
| 2005/0035740 A1 | 2/2005 | Elder et al. .............. 320/116 |
| 2005/0040951 A1 | 2/2005 | Zalewski et al. .......... 340/572.1 |
| 2005/0068201 A1 | 3/2005 | Wulff et al. ............... 341/20 |
| 2005/0155839 A1 | 7/2005 | Banks et al. ............. 194/302 |
| 2005/0168352 A1 | 8/2005 | Tomer ................. 340/932.2 |
| 2005/0178639 A1 | 8/2005 | Brumfield et al. .......... 194/350 |
| 2005/0192911 A1 | 9/2005 | Mattern ................. 705/401 |
| 2006/0020487 A1 | 1/2006 | Spittel et al. .............. 705/1 |
| 2006/0021848 A1 | 2/2006 | Smith ................... 194/350 |
| 2006/0114159 A1 | 6/2006 | Yoshikawa et al. |
| 2006/0116972 A1 | 6/2006 | Wong .................... 705/418 |
| 2006/0136131 A1 | 6/2006 | Dugan et al. ............. 701/300 |
| 2006/0149684 A1 | 7/2006 | Matsuura et al. ........... 705/65 |
| 2006/0152349 A1 | 7/2006 | Ratnakar ............... 340/426.1 |
| 2006/0152385 A1 | 7/2006 | Mandy .................. 340/932.2 |
| 2006/0173733 A1 | 8/2006 | Fancher .................. 705/13 |
| 2006/0255119 A1 | 11/2006 | Marchasin et al. ......... 235/375 |
| 2006/0259354 A1 | 11/2006 | Yan ..................... 705/13 |
| 2006/0267799 A1 | 11/2006 | Mendelson ............. 340/932.2 |
| 2007/0011700 A1 | 1/2007 | Johnson .................. 725/34 |
| 2007/0016539 A1 | 1/2007 | Groft et al. .............. 705/418 |
| 2007/0017265 A1 | 1/2007 | Andersson ................ 70/379 |
| 2007/0029825 A1 | 2/2007 | Franklin et al. ........... 293/128 |
| 2007/0044523 A1 | 3/2007 | Davis .................... 70/34 |
| 2007/0046651 A1 | 3/2007 | Sinclair et al. ........... 345/173 |
| 2007/0061155 A1 | 3/2007 | Ji et al. ................... 705/1 |
| 2007/0094153 A1 | 4/2007 | Ferraro .................. 705/67 |
| 2007/0114849 A1 | 5/2007 | Falik et al. ................ 307/64 |
| 2007/0119682 A1 | 5/2007 | Banks et al. ............. 194/239 |
| 2007/0129974 A1 | 6/2007 | Chen et al. ............... 705/5 |
| 2007/0136128 A1 | 6/2007 | Janacek et al. ............ 705/13 |
| 2007/0171069 A1 | 7/2007 | Allen .................. 340/572.1 |
| 2007/0184852 A1 | 8/2007 | Johnson et al. .......... 455/456.1 |
| 2007/0208499 A1 | 9/2007 | Kwong .................. 701/117 |
| 2007/0210935 A1 | 9/2007 | Yost et al. ............. 340/932.2 |
| 2007/0276724 A1 | 11/2007 | Catt ..................... 705/13 |
| 2007/0285281 A1 | 12/2007 | Welch ................. 340/932.2 |
| 2008/0071611 A1 | 3/2008 | Lovett ................... 705/13 |
| 2008/0093454 A1 | 4/2008 | Yamazaki et al. |
| 2008/0147268 A1 | 6/2008 | Fuller .................... 701/35 |
| 2008/0158010 A1 | 7/2008 | Nath et al. ............. 340/932.2 |
| 2008/0165030 A1 | 7/2008 | Kuo et al. .............. 340/932.2 |
| 2008/0208680 A1 | 8/2008 | Cho ..................... 705/13 |
| 2008/0218383 A1 | 9/2008 | Franklin et al. ............ 340/937 |
| 2008/0238715 A1 | 10/2008 | Cheng et al. .......... 340/870.03 |
| 2008/0245638 A1 | 10/2008 | King et al. .............. 194/350 |
| 2008/0257965 A1 | 10/2008 | Klein et al. ............. 235/483 |
| 2008/0265019 A1 | 10/2008 | Artino et al. ............. 235/379 |
| 2008/0266138 A1 | 10/2008 | Ponert ................. 340/932.2 |
| 2008/0270227 A1 | 10/2008 | Al Amri .................. 705/13 |
| 2008/0277468 A1 | 11/2008 | Mitschele ............... 235/384 |
| 2008/0289030 A1 | 11/2008 | Poplett ................... 726/15 |
| 2008/0291054 A1 | 11/2008 | Groft .................. 340/932.2 |
| 2008/0296365 A1 | 12/2008 | Schliebe ................ 235/379 |
| 2008/0319837 A1 | 12/2008 | Mitschele ................ 705/13 |
| 2009/0026842 A1 | 1/2009 | Hunter et al. .............. 307/66 |
| 2009/0032368 A1 | 2/2009 | Hunter et al. ............ 194/318 |
| 2009/0049875 A1 | 2/2009 | Buhl et al. ................ 70/52 |
| 2009/0057398 A1 | 3/2009 | Douglass et al. .......... 235/379 |
| 2009/0083149 A1 | 3/2009 | Maekawa et al. .......... 705/14 |
| 2009/0095593 A1 | 4/2009 | King et al. .............. 194/302 |
| 2009/0099761 A1 | 4/2009 | Davis et al. .............. 701/120 |
| 2009/0102726 A1 | 4/2009 | Imano et al. |
| 2009/0109062 A1 | 4/2009 | An ................... 340/932.2 |
| 2009/0137204 A1 | 5/2009 | Chang ................... 455/41.1 |
| 2009/0159674 A1 | 6/2009 | King et al. .............. 235/382 |
| 2009/0183966 A1 | 7/2009 | King et al. .............. 194/217 |
| 2009/0192950 A1 | 7/2009 | King et al. .............. 705/418 |
| 2009/0199966 A1 | 8/2009 | Coleman et al. |
| 2009/0254438 A1 | 10/2009 | Johnson, Jr. et al. ........ 705/17 |
| 2009/0267732 A1 | 10/2009 | Chauvin et al. ........... 340/5.53 |
| 2009/0284907 A1 | 11/2009 | Regimbal et al. ........ 361/679.02 |
| 2009/0287578 A1 | 11/2009 | Paluszek et al. ........... 705/17 |
| 2009/0315720 A1 | 12/2009 | Clement et al. .......... 340/573.5 |
| 2010/0019936 A1 | 1/2010 | Kaveler ................. 340/933 |
| 2010/0025459 A1 | 2/2010 | Yamada ................ 235/375 |

(56) References Cited

U.S. PATENT DOCUMENTS

| | | | |
|---|---|---|---|
| 2010/0026522 A1 | 2/2010 | Ward, II | 340/932.2 |
| 2010/0030629 A1 | 2/2010 | Ward, II | 705/13 |
| 2010/0106517 A1 | 4/2010 | Kociubinski et al. | 705/2 |
| 2010/0153193 A1 | 6/2010 | Ashby et al. | 705/13 |
| 2010/0161489 A1 | 6/2010 | Goodall et al. | 705/45 |
| 2010/0187300 A1 | 7/2010 | Ramachandran et al. | 235/379 |
| 2010/0188932 A1 | 7/2010 | Hanks et al. | 367/140 |
| 2010/0241564 A1 | 9/2010 | Miller et al. | 705/43 |
| 2010/0243729 A1 | 9/2010 | Russell et al. | 235/379 |
| 2010/0328104 A1 | 12/2010 | Groft | 340/932.2 |
| 2010/0332394 A1 | 12/2010 | Ioli | 705/44 |
| 2011/0022427 A1 | 1/2011 | Dayan | 705/5 |
| 2011/0037562 A1 | 2/2011 | Braukmann et al. | |
| 2011/0057815 A1 | 3/2011 | King et al. | 340/932.2 |
| 2011/0060653 A1 | 3/2011 | King et al. | 705/14.58 |
| 2011/0062230 A1 | 3/2011 | Ward, II et al. | 235/379 |
| 2011/0063133 A1 | 3/2011 | Keller et al. | 340/932.2 |
| 2011/0066297 A1 | 3/2011 | Saberi et al. | 700/287 |
| 2011/0093314 A1 | 4/2011 | Redmann et al. | |
| 2011/0122036 A1 | 5/2011 | Leung et al. | |
| 2011/0133613 A1 | 6/2011 | Descamps et al. | 312/223.1 |
| 2011/0158331 A1 | 6/2011 | Kavaler et al. | 375/259 |
| 2011/0203901 A1 | 8/2011 | King et al. | 194/211 |
| 2011/0205087 A1 | 8/2011 | Kell et al. | 340/932.2 |
| 2011/0221624 A1 | 9/2011 | Kavaler | 342/22 |
| 2011/0261548 A1 | 10/2011 | Gandhi | |
| 2011/0276519 A1 | 11/2011 | MacKay et al. | 705/418 |
| 2011/0313822 A1 | 12/2011 | Burdick | 705/13 |
| 2011/0320243 A1 | 12/2011 | Khan | 705/13 |
| 2012/0026015 A1 | 2/2012 | Kavaler | 340/933 |
| 2012/0158466 A1 | 6/2012 | John | 705/13 |
| 2012/0173171 A1 | 7/2012 | Bajwa et al. | 702/56 |
| 2012/0208521 A1 | 8/2012 | Hager et al. | 455/422.1 |
| 2012/0222935 A1 | 9/2012 | MacKay et al. | 194/210 |
| 2012/0273322 A1 | 11/2012 | MacKay et al. | 194/210 |
| 2012/0285790 A1 | 11/2012 | Jones et al. | 194/217 |
| 2012/0285791 A1 | 11/2012 | Jones et al. | 194/217 |
| 2012/0285792 A1 | 11/2012 | Jones et al. | 194/217 |
| 2012/0285793 A1 | 11/2012 | Jones et al. | 194/217 |
| 2012/0286036 A1 | 11/2012 | Jones et al. | 235/380 |
| 2012/0286968 A1 | 11/2012 | Jones et al. | 340/870.02 |
| 2012/0292385 A1 | 11/2012 | MacKay et al. | 235/375 |
| 2013/0005445 A1 | 1/2013 | Walker et al. | 463/25 |
| 2013/0027218 A1 | 1/2013 | Schwarz et al. | 340/870.02 |
| 2013/0085928 A1 | 4/2013 | McKinney | 705/39 |
| 2013/0099943 A1 | 4/2013 | Subramanya | 340/943 |
| 2013/0124270 A1 | 5/2013 | Tziperman et al. | 705/13 |
| 2013/0238406 A1 | 9/2013 | King et al. | 705/13 |
| 2013/0285455 A1 | 10/2013 | Hunter et al. | 307/66 |
| 2014/0040028 A1 | 2/2014 | King et al. | 705/14.53 |
| 2014/0058805 A1 | 2/2014 | Paesler et al. | 705/13 |
| 2014/0108107 A1 | 4/2014 | Jones et al. | 705/13 |
| 2014/0129158 A1 | 5/2014 | Shea | 702/57 |
| 2014/0172518 A1 | 6/2014 | King et al. | 705/13 |
| 2014/0174881 A1 | 6/2014 | King et al. | 194/350 |
| 2014/0210646 A1 | 7/2014 | Subramanya | 340/928 |
| 2014/0213176 A1 | 7/2014 | Mendelson | 455/39 |
| 2014/0214499 A1 | 7/2014 | Hudson et al. | 705/13 |
| 2014/0231505 A1 | 8/2014 | King et al. | 235/375 |
| 2014/0279565 A1 | 9/2014 | Trump et al. | 705/72 |
| 2014/0289025 A1 | 9/2014 | King et al. | 705/13 |
| 2014/0319211 A1 | 10/2014 | MacKay et al. | 235/380 |
| 2015/0084786 A1 | 3/2015 | King et al. | 340/870.02 |
| 2015/0106172 A1 | 4/2015 | Salama | G07F 17/246 |
| 2015/0235503 A1 | 8/2015 | King et al. | G07F 17/248 |
| 2015/0332587 A1 | 11/2015 | Schwarz et al. | G08G 1/017 |
| 2016/0012418 A1 | 1/2016 | MacKay et al. | G06Q 20/352 |
| 2016/0268838 A1 | 9/2016 | Hunter et al. | H02J 9/061 |
| 2016/0321714 A1 | 11/2016 | King et al. | G06Q 30/0284 |
| 2016/0371915 A1 | 12/2016 | MacKay et al. | G07F 1/042 |
| 2017/0034600 A1 | 2/2017 | King et al. | H04Q 9/00 |

FOREIGN PATENT DOCUMENTS

| | | | |
|---|---|---|---|
| AU | 2006203554 | 9/2006 | G07C 1/30 |
| AU | 314132 | 5/2007 | |
| AU | 315845 | 8/2007 | |
| AU | 315846 | 8/2007 | |
| AU | 315847 | 8/2007 | |
| CA | 2233931 | 4/1997 | G08G 1/14 |
| CA | 2260925 | 1/1998 | G07B 15/00 |
| CA | 2227833 | 7/1998 | G07F 17/24 |
| CA | 2346908 | 4/2000 | G07C 1/30 |
| CA | 2352968 | 1/2001 | G07F 17/24 |
| CA | 2373400 | 8/2001 | G07D 5/04 |
| CA | 2401429 | 9/2001 | G07C 1/30 |
| CA | 2377010 | 12/2001 | G06F 19/00 |
| CA | 2357179 | 3/2002 | G08C 17/00 |
| CA | 2437722 | 8/2002 | G08G 1/14 |
| CA | 2453369 | 1/2003 | G07C 1/30 |
| CA | 2363915 | 5/2003 | G07F 17/24 |
| CA | 2413198 | 5/2003 | G07F 17/24 |
| CA | 2414132 | 6/2003 | G07F 17/24 |
| CA | 2302922 | 1/2004 | G07D 5/08 |
| CA | 2443677 | 10/2004 | G08G 1/00 |
| CA | 2248347 | 10/2005 | G07C 1/30 |
| CA | 2595309 | 7/2006 | G08G 1/14 |
| CA | 2511461 | 2/2007 | G07C 1/30 |
| CA | 2631699 | 6/2007 | G06Q 10/00 |
| CA | 2622164 | 8/2008 | G07F 17/24 |
| CA | 122930 | 9/2008 | |
| CA | 126745 | 9/2008 | |
| CA | 2693911 | 1/2009 | G06Q 50/00 |
| CA | 2650192 | 7/2009 | G08C 17/02 |
| CA | 2650195 | 7/2009 | G01D 4/02 |
| CA | 2933066 | 7/2009 | G07F 17/24 |
| CA | 2387540 | 4/2010 | G07F 17/24 |
| CA | 134041 | 9/2010 | |
| CA | 134042 | 9/2010 | |
| CA | 2773132 | 3/2011 | G06Q 30/00 |
| CA | 2773135 | 3/2011 | G06Q 20/00 |
| CA | 2770093 | 5/2012 | G07C 1/30 |
| CA | 2870544 | 5/2012 | G07C 1/30 |
| CA | 2870592 | 5/2012 | G07F 17/24 |
| CA | 2874155 | 5/2012 | G07F 17/24 |
| CA | 2773250 | 9/2012 | G07C 1/30 |
| CA | 155382 | 5/2015 | |
| CA | 155383 | 5/2015 | |
| CA | 155391 | 5/2015 | |
| CA | 156990 | 5/2015 | |
| CA | 156991 | 5/2015 | |
| CA | 156992 | 5/2015 | |
| CA | 156993 | 5/2015 | |
| CA | 156994 | 5/2015 | |
| CA | 156995 | 5/2015 | |
| CA | 157067 | 5/2015 | |
| CA | 157068 | 5/2015 | |
| CA | 157069 | 5/2015 | |
| CA | 151049 | 10/2015 | |
| CA | 160598 | 2/2016 | |
| CA | 163369 | 2/2016 | |
| CA | 163370 | 2/2016 | |
| CA | 168171 | 3/2017 | |
| CA | 168172 | 3/2017 | |
| CA | 168173 | 3/2017 | |
| CA | 168198 | 3/2017 | |
| CA | 168199 | 3/2017 | |
| CA | 168200 | 3/2017 | |
| CN | 2395344 | 9/2000 | G07F 17/24 |
| CN | 2470887 | 1/2002 | G07B 15/02 |
| CN | 2544352 | 4/2003 | G06F 19/00 |
| CN | 1549990 | 11/2004 | G07B 15/02 |
| DE | 28 04 085 A1 | 2/1977 | |
| DE | 27 50 193 C2 | 11/1977 | |
| DE | 102005041290 | 3/2007 | G07B 15/02 |
| EP | 0329129 | 8/1989 | G07F 17/24 |
| EP | 980055 | 2/2000 | G07F 17/24 |
| EP | 1327962 | 7/2003 | G07B 15/02 |
| EP | 1376491 | 1/2004 | G07F 7/00 |
| EP | 1748393 | 1/2007 | G07C 1/30 |
| EP | 1128350 | 10/2007 | G07B 15/02 |

(56) References Cited

FOREIGN PATENT DOCUMENTS

| | | | |
|---|---|---|---|
| EP | 1898360 | 3/2008 | ............ G07B 15/02 |
| EP | 2215605 | 8/2012 | ............ G07B 15/02 |
| EP | 002416206-0001 | 3/2014 | |
| EP | 002416206-0002 | 3/2014 | |
| EP | 002416206-0003 | 3/2014 | |
| EP | 003076702-0001 | 4/2014 | |
| EP | 003076702-0002 | 4/2014 | |
| EP | 003076702-0003 | 4/2014 | |
| EP | 003076702-0004 | 4/2014 | |
| EP | 003076702-0005 | 4/2014 | |
| EP | 003076702-0006 | 4/2014 | |
| EP | 002479352-0001 | 6/2014 | |
| EP | 002479352-0002 | 6/2014 | |
| EP | 002479352-0003 | 6/2014 | |
| EP | 002479360-0001 | 6/2014 | |
| EP | 002479360-0002 | 6/2014 | |
| EP | 002479360-0003 | 6/2014 | |
| EP | 002479428-0001 | 6/2014 | |
| EP | 002479428-0002 | 6/2014 | |
| EP | 002479428-0003 | 6/2014 | |
| EP | 003462183-0001 | 11/2014 | |
| EP | 003462183-0002 | 11/2014 | |
| EP | 003462183-0003 | 11/2014 | |
| EP | 003462183-0004 | 11/2014 | |
| EP | 003462183-0005 | 11/2014 | |
| EP | 003462183-0006 | 11/2014 | |
| FR | 2600448 | 6/1986 | ............... G07C 1/30 |
| FR | 2837583 | 9/2003 | .......... G06K 19/077 |
| GB | 1 237 579 | 12/1968 | |
| GB | 1 283 555 | 10/1969 | |
| GB | 1431862 | 4/1976 | ............ G08B 25/00 |
| GB | 2077475 | 12/1981 | ............ G07F 17/24 |
| GB | 2155228 | 9/1985 | ............ G09F 23/00 |
| GB | 2298510 | 9/1996 | ............... G07F 7/10 |
| IL | 11149880 | 6/2007 | ............ G07B 15/00 |
| JP | S58121494 | 7/1983 | ............... G07C 1/30 |
| JP | S6437661 | 2/1989 | ............... E04H 6/00 |
| JP | 01165494 | 6/1989 | ............ B42D 15/10 |
| JP | 01303026 | 12/1989 | ............... G11C 5/00 |
| JP | H028692 | 1/1990 | ............... F28F 1/32 |
| JP | 0261711 | 3/1990 | ............ G06F 1/26 |
| JP | H02180623 | 7/1990 | ............ B01D 63/02 |
| JP | 0487533 | 3/1992 | ............... H02J 9/00 |
| JP | H08305998 | 11/1996 | ............... E04H 6/00 |
| JP | S5259000 | 5/1997 | ............... G07C 1/30 |
| JP | 2002074430 | 3/2002 | ............ G06Q 50/00 |
| JP | 2002099640 | 4/2002 | ............ G06Q 10/00 |
| JP | 2002528799 | 9/2002 | ............ G06Q 50/00 |
| JP | 2003527701 | 9/2003 | ............ G06Q 40/00 |
| JP | 2005242888 | 9/2005 | ............ G06Q 10/00 |
| JP | 2005267430 | 9/2005 | ............ G06Q 10/00 |
| JP | 2007052773 | 3/2007 | ............ G07F 17/24 |
| JP | 2011060206 | 3/2011 | ............ G07B 15/00 |
| KR | 20000016671 | 3/2000 | ............ G07F 17/24 |
| KR | 20010028481 | 4/2001 | ............ G07B 1/00 |
| KR | 20050038077 | 4/2005 | ............ G07B 5/12 |
| KR | 1020080026282 | 3/2008 | ............ G06F 19/00 |
| KR | 20080041730 | 5/2008 | ............ G06T 7/20 |
| MX | 2008007047 | 8/2008 | ............ G06Q 10/00 |
| NZ | 530606 | 11/2006 | ............... G07C 1/30 |
| WO | WO 81/00778 | 3/1981 | |
| WO | WO9520204 | 7/1995 | ............ G07F 17/24 |
| WO | WO9611453 | 4/1996 | ............... G07C 1/30 |
| WO | WO97/12345 | 4/1997 | ............ G07F 17/24 |
| WO | WO9737328 | 10/1997 | ............ G07B 15/02 |
| WO | WO98/04080 | 1/1998 | ............ H04M 15/00 |
| WO | WO0059201 | 10/2000 | ............ H04M 15/00 |
| WO | WO01/69541 | 9/2001 | ............ G07F 17/24 |
| WO | WO0180157 | 10/2001 | ............ G06F 19/00 |
| WO | WO02063570 | 8/2002 | |
| WO | WO03005324 | 1/2003 | ............ G08G 1/14 |
| WO | WO03009238 | 1/2003 | ............ G07C 1/30 |
| WO | WO2004012352 | 2/2004 | ............ H04B 1/38 |
| WO | WO2005031494 | 4/2005 | |
| WO | WO2006076773 | 7/2006 | ............ G08G 1/14 |
| WO | WO2006095352 | 9/2006 | ............... H02J 9/06 |
| WO | WO2007063530 | 6/2007 | ............ G06Q 10/00 |
| WO | WO2009009854 | 1/2009 | ............ G06Q 50/00 |
| WO | WO2009154787 | 12/2009 | ............ G08G 1/14 |
| WO | WO2010008610 | 1/2010 | ............ G08G 1/065 |
| WO | WO2010071974 | 7/2010 | ............... G07C 1/30 |
| WO | WO2011029061 | 3/2011 | ............ G06Q 30/00 |
| WO | WO2011029062 | 3/2011 | ............ G06Q 20/00 |
| WO | WO2012015453 | 2/2012 | ............ G08G 1/042 |
| WO | WO2012092609 | 7/2012 | ............ G08G 1/01 |
| WO | WO2012154902 | 11/2012 | ............ G07F 17/14 |
| WO | WO2012154913 | 11/2012 | ............ G06Q 50/30 |
| WO | WO2013016453 | 1/2013 | ............ G07B 15/02 |
| WO | WO2013049418 | 4/2013 | |
| WO | WO2014014494 | 1/2014 | ............ G07B 15/02 |

OTHER PUBLICATIONS

US 9,640,016, 05/2017, King et al. (withdrawn)
(Cell Net Data Systems) "First Wireless Monitoring of Parking Meters Results in Theft Arrests Using CellNet Data Systems Technology," PRNewswire, May 11, 1999 (2 pgs).
Anonymous, "The Originators of Metered Parking, Series II, APM-E Mechanism, Service Manual," POM Incorporated, May 23, 2006 revision (22 pgs).
Barefoot, D., "There'll be lies, there'll be tears, a jury of your peers," DarrenBarefoot.com: Dec. 2005, pp. 8-9 (39 pages).
Basu et al., "Networked Parking Spaces: Architecture and Applications," MCL Technical Report No. 07-01-2002, Proc. IEEE Vehicular Transportation Conference, Vancouver, Canada, Sep. 2002 (10 pgs).
Bayless et al., "Smart Parking and the Connected Consumer," ITS America Research, Dec. 2012 (39 pgs).
Bernspång, F., "Smart Parking using Magnetometers and Mobile Applications," Master's Thesis, Master of Science in Engineering Technology, Computer Science and Engineering, Luleå University of Technology, Nov. 2010-May 2011 (35 pgs).
Bridge IR Group, Inc., Changing the Way the World Pays for On-Street Parking, Research Report, United States-Technology Processing Systems/Products, Dec. 6, 2006 (23 pgs).
Burden et al., "Near Field Communications (NFC) in Public Transport," Digital Identity Forum, 2006 (18 pgs).
Byrd, Dennis, "City officials plug solar-powered parking meters, Electronic eye ends free parking," Lawrence Journal World, Apr. 30, 1989, p. 11C (1pg).
Byrd, Times, Dennis, Parking Meter Manufacturer Sees Bright Future for New Sun-Powered Devices, Los Angeles Times, May 14, 1989 (2 pgs).
Canadian Office Action issued for related application No. 2,745,365, dated Jul. 4, 2012 (2 pgs).
Canadian Office Action issued for related application No. 2,745,365, dated Jun. 5, 2012 (2 pgs).
Canadian Office Action issued for related application No. 2,745,365, dated Aug. 26, 2011 (4 pgs).
Canadian Office Action issued for related application No. 2,745,365, dated Mar. 1, 2012 (6 pgs).
Canadian Office Action issued for related application No. 2,770,093, dated Jul. 5, 2012 (5 pgs).
Canadian Office Action issued in application 2,870,544, dated Jan. 19, 2015 (5 pgs).
Canadian Office Action issued in application No. 2,745,368, dated Aug. 4, 2011 (2 pgs).
Canadian Office Action issued in application No. 2,745,368, dated Nov. 1, 2011 (3 pgs).
Canadian Office Action issued in application No. 2,770,093, dated Apr. 10, 2013 (2 pgs).
Canadian Office Action issued in application No. 2,770,093 dated Jun. 11, 2014 (2 pgs).
Canadian Office Action issued in application No. 2,770,093, dated Oct. 15, 2014 (3 pgs).
Canadian Office Action issued in application No. 2,770,093, dated Oct. 29, 2012 (2 pgs).

(56) References Cited

OTHER PUBLICATIONS

Canadian Office Action issued in application No. 2,773,250, dated Mar. 26, 2015 (10 pgs).
Canadian Office Action issued in application No. 2,773,250, dated Jun. 20, 2013 (3 pgs).
Canadian Office Action issued in application No. 2,773,250, dated Jun. 30, 2014 (3 pgs).
Canadian Office Action issued in application No. 2,773,250, dated Mar. 12, 2014 (5 pgs).
Canadian Office Action issued in application No. 2,773,250, dated Nov. 12, 2014 (10 pgs).
Canadian Office Action issued in application No. 2,773,250, dated Oct. 7, 2013 (4 pgs).
Canadian Office Action issued in application No. 2,870,544, dated Oct. 15, 2015 (6 pgs).
Canadian Office Action issued in application No. 2,870,544, dated Jan. 19, 2015 (5 pgs).
Cardinal Tracking Inc.—MobileCite brochure, undated (2 pgs).
Cosgrove, D., "SmartPark," Senior Project Report, Jun. 12, 2013 (20 pgs).
DAT Self-Service System Limited, Product Brochure, Version 1.0, Date: May 2005, pp. 1-39 (39 pgs), plus English translation (42 pgs).
Digital Payment Technologies—LUKE brochure, undated (4 pgs).
Digital Payment Technologies—LUKE website, https://web.archive.org/web/20061025094839/http://www.digitalpaytech.com/luke.html, Oct. 25, 2006 (5 pgs).
Digital Payment Technologies, Credit Card Processing with LUKE and SHELBY, Dec. 2007 (15 pgs).
Digital Payment Technologies, Digital Payment Technologies and PXT Payments Forge Partnership to Bring Cities Smart Parking Meters and Merchant Loyalty Debit Cards, www.digitalpaytech.com, Apr. 27, 2010 (2 pgs).
Digital Payment Technologies, Request for Proposal #B09030—Parking Pay Stations, City of Dover, New Hampshire, Oct. 22, 2008 (part 1-110 pgs).
Digital Payment Technologies, Request for Proposal #B09030—Parking Pay Stations, City of Dover, New Hampshire, Oct. 22, 2008 (part 2-160 pgs).
Digital. Payment Technologies, Request for Proposal for Multi-Space Parking Meters, City of Fort Lauderdale, Jan. 13, 2010 (89 pgs).
Digital Payment Technologies, Sierra Wireless Case Study, Dec. 7, 2009(2 pgs).
Digital Payment Technologies, Technologies Launches LUKE II Multi-Space Parking Pay Station, May 16, 2011 (3 pgs).
*Duncan Parking Technologies, Inc.* v. *IPS Group Inc.*, Case IPR2016-00068, Decision, Mar. 30, 2016 (13 pgs).
*Duncan Parking Technologies, Inc.* v. *IPS Group Inc.*, Case IPR2016-00070, Decision, Apr. 1, 2016 (17 pgs).
*Duncan Parking Technologies, Inc.* v. *IPS Group Inc.*, Case IPR2016-00069, Decision, Apr. 1, 2016 (13 pgs).
*Duncan Parking Technologies, Inc.* v. *IPS Group Inc.*, Case IPR2016-00067, Decision, Mar. 30, 2016 (19 pgs).
*Duncan Parking Technologies, Inc.* v. *IPS Group Inc.*, Case IPR2016-00067, Preliminary Response, Jan. 29, 2016 (38 pgs).
*Duncan Parking Technologies, Inc.* v. *IPS Group Inc.*, Case IPR2016-00068, Patent Owner's Preliminary Response, Feb. 1, 2016 (48 pgs).
*Duncan Parking Technologies, Inc.* v. *IPS Group Inc.*, Case IPR2016-00069, Patent Owner's Preliminary Response, Feb. 1, 2016 (48 pgs).
*Duncan Parking Technologies, Inc.* v. *IPS Group Inc.*, Case IPR2016-00070, Preliminary Response, Feb. 1, 2016 (49 pgs).
*Duncan Parking Technologies, Inc.* v. *IPS Group Inc.*, Case IPR2016-00067, Patent Owner's Mandatory Notices, Nov. 6, 2015 (4 pgs).
*Duncan Parking Technologies, Inc.* v. *IPS Group Inc.*, Case IPR2016-00067, Scheduling Order, Mar. 30, 2016 (9 pgs).
*Duncan Parking Technologies, Inc.* v. *IPS Group Inc.*, Petition for Inter Partes Review of U.S. Pat. No. 7,854,310, IPR2016-00067, Oct. 22, 2015 (66 pgs).
*Duncan Parking Technologies, Inc.* v. *IPS Group Inc.*, Petition for Inter Partes Review of U.S. Pat. No. 7,854,310, IPR2016-00068, Oct. 22, 2015 (64 pgs).
*Duncan Parking Technologies, Inc.* v. *IPS Group Inc.*, Petition for Inter Partes Review of U.S. Pat. No. 8,595,054, IPR2016-00069, Oct. 22, 2015 (67 pgs).
*Duncan Parking Technologies, Inc.* v. *IPS Group Inc.*, Petition for Inter Partes Review of U.S. Pat. No. 8,595,054, IPR2016-00070, Oct. 22, 2015 (61 pgs).
Duncan Solutions—AutoCITE brochure, 2013 (2 pgs).
Duncan Solutions—Eagle 2100 brochure, 2013 (2 pgs).
Duncan Solutions—Eagle CK brochure, 2013 (2 pgs).
Duncan Solutions—Intermec CN50 webpage, Mar. 8, 2011 (2 pgs).
Duncan Solutions—Motorola MC75 webpage, Mar. 8, 2011 (2 pgs).
Duncan Solutions—VM Pay-by-Space Multi-Space Meter brochure, 2013 (2 pgs).
Duncan Solutions "Single-Space Meters" brochure (2 pgs); Rev. Apr. 2006, 2006 Duncan Solutions, Inc.
Duncan Solutions, AutoCITE™ X3 Handheld Computer, 2013 (2 pgs).
Duncan Solutions, Duncan VS, 2006 (2 pgs).
Duncan Solutions, Pay-by-Space Parking Meters, Customer Support Manual, Jul. 2006 (part 1-113 pgs).
Duncan Solutions, Pay-by-Space Parking Meters, Customer Support Manual, Jul. 2006 (part 2-103 pgs).
Duncan Solutions/Reino, RSV3 Digital Parking Meter, Jul. 5, 2011 (2 pgs).
Duncan, Duncan VM-Solar Power meter photograph, pre-Mar. 2011 (1 pg).
Exhibit 1003—Declaration of Todd Magness in Support of Petition for Inter Partes Review of U.S. Pat. No, 7,854,310, dated Oct. 21, 2015 (70 pgs).
Exhibit 1004—Declaration of Anderson Moore in Support of Petition for Inter Partes Review of U.S. Pat. No. 8,595,054, dated Oct. 21, 2015 (19 pgs).
Exhibit 1005—U.S. Appl. No. 60/741,920, filed Dec. 2, 2005 (20 pgs).
Exhibit 1009—Tung, Y., "Design of an Advanced On-street Parking Meter," Thesis, Rochester Institute of Technology, 2001 (75 pgs).
Exhibit 1010—Christian, S.E., "Parking Meter Winding Up for Computer Age," Chicago Tribune, May 19, 1995 (6 pgs).
Exhibit 1011—Associated Press, "New parking meters based on computer," The San Diego Union, Feb. 1, 1987 (1 pg).
Exhibit 1012—Lunden, J., Good Morning America transcript, Nov. 6, 1986 (3 pgs).
Exhibit 1013—LUKE Parking Station ad (p. 28), Parking Today, vol. 10, No. 4, Apr. 2005 (64 pgs).
Exhibit 1014—Blass, E., "Changing times," Lansing State Journal, Feb. 19, 1987 (1 pg).
Exhibit 1015—Gabriele, M.C., "Electronic Parking Meters Rival Mechanical Units," American Metal Market/Metalworking News, Sep. 29, 1986 (1 pg).
Exhibit 1016—Sandler, L., "Lovely VISA, meter maid: Use credit card to park," Milwaukee Journal Sentinel, Jun. 13, 2005 (1 pg).
Exhibit 1017—Item for Finance Committee, "Capital Works Reserve Fund, Head 708—Capital Subventions and Major Systems and Equipment," FCR(Mar. 2002)18, May 24, 2002 (15 pgs).
Exhibit 1018—Anonymous, "Happy %#@! Anniversary, First Parking Meter Installed Jul. 16, 1935," The Expired Meter News, Views, Information on Driving in Chicago, Jul. 16, 2009 (10 pgs).
Exhibit 1019—Anonymous, Parking Meter Patented 72 Years Ago Today, The Expired Meter News, Views, Information on Driving in Chicago, May 24, 2010 (6 pgs).
Exhibit 1020—U.S. Pat. No. 2,118,318 to Magee, May 24, 1938 (11 pgs).
Exhibit 1032—U.S. Pat. No. 5,570,771 to Jacobs, Nov. 5, 1996 (29 pgs).
Exhibit 1034—Anonymous, "Smart Cards and Parking," TC-06001, Smart Card Alliance Transportation Council White Paper, Jan. 2006 (52 pgs).

(56) References Cited

OTHER PUBLICATIONS

Exhibit 1037—Catalog Entry for Exhibit 1009, Tung, Y., "Design of an advanced on-street parking meter," Oct. 18, 2015 (2 pgs).
Exhibit 1038—POM Parking Meters website, Oct. 20, 2015 (4 pgs).
Fidelman, C., "Time's running out for parking meters at present locations: $270,000 cited as replacement cost. City employees who ticket motorists find electronic meters unsuitable," The Gazette, Final Edition, Montreal, Quebec, Canada, Nov. 12, 2002, p. A7 (2 pgs).
Flatley, J., "In San Francisco, hackers park for free," posted Jul. 31, 2009, www.engadget.com (1 pg).
Howland, S., "How M2M Maximizes Denver's Revenue," FieldTechnologiesOnline.com, Oct. 2011, pp. 9-12 (4 pgs).
Information Disclosure Statement by Applicant filed for U.S. Appl. No. 12/355,734 on May 23, 2012 (22 pgs).
Information Disclosure Statement by Applicant filed for U.S. Appl. No. 12/355,740 on May 23, 2012 (25 pgs).
Information Disclosure Statement by Applicant filed for U.S. Appl. No. 12/875,959 on May 24, 2012 (22 pgs).
Information Disclosure Statement by Applicant filed for U.S. Appl. No. 12/875,975 on May 24, 2012 (22 pgs).
Information Disclosure Statement by Applicant filed Oct. 23, 2012 for U.S. Appl. No. 12/355,734 (4 pgs).
International Preliminary Report on Patentability issued in related application No. PCT/CA2012/000191, dated Sep. 12, 2013 (7 pgs).
International Preliminary Report on Patentability, issued for application No. PCT/US2010/047907, dated Mar. 15, 2012 (6 pgs).
International Preliminary Report on Patentability, issued for application No. PCT/US2010/047906, dated Mar. 6, 2012 (5 pgs).
International Preliminary Report on Patentability, issued for application No. PCT/IB2006/054574, dated Mar. 10, 2009 (5 pgs).
International Search Report & Written Opinion, PCT/CA12/000191, dated Jun. 20, 2012 (8 pgs).
International Search Report issued for PCT/US2012/048190, dated Jan. 22, 2013 (4 pgs).
International Search Report issued in application No. PCT/US2012/037229, dated Jan. 28, 2013 (6 pgs).
International Search Report issued in application No. PCT/US2012/037205, dated Oct. 4, 2012 (3 pgs).
International Search Report issued in application No. PCT/US2013/021201, dated Apr. 30, 2013 (3 pgs).
International Search Report issued in related application No. PCT/CA2007/001266, dated Apr. 21, 2008 (3 pgs).
International Search Report, PCT/CA2009/001058, dated Nov. 12, 2009 (4 pgs).
International Search Report, PCT/CA2009/001657, dated Feb. 17, 2010 (2 pgs).
International Search Report, PCT/IB06/054574, dated Oct. 27, 2008 (2 pgs).
International Search Report, PCT/US2010/047906, dated Mar. 30, 2011 (3 pgs).
International Search Report, PCT/US2010/047907, dated Apr. 26, 2011 (3 pgs).
Intrinsync Software International, Inc., Intrinsyc and Digital Pioneer Partner on Development of New Leading Edge Parking Teiminal Solution, Aug. 14, 2003 (2 pgs).
IPS Group Inc., Exhibit 2001, Design of an advanced on-street parking meter, Jan. 12, 2016 (2 pgs).
IPS Group Inc., Exhibit 2002, About RIT Digital Media Library, Jan. 12, 2016 (1 pg).
IPS Group Inc., Exhibit 2003, The U.S. Conference of Mayors Presents 'Best-Practice' Awards, Jan. 20, 2012 (2 pgs).
IPS Group Inc., Exhibit 2004, City of Los Angeles, Card & Coin Parking Meter Lease, Nov. 29, 2010 (4 pgs).
IPS Group Inc., Exhibit 2005, City of Culver City, California, Approval of a Contract with IPS Group Inc., for the Sole-Source Purchase of 1,000 Parking Meters, Dec. 12, 2011 (3 pgs).
IPS Group Inc., Exhibit 2006, City of San Luis Obispo City Manager Report, Award of Credit Card Meters and Service Contract, RFP Specification No. 91137, Jan. 20, 2012 (5 pgs).
IPS Group Inc., Exhibit 2007, Walnut Creek, Alternate Downtown Parking Pay Technology, Oct. 20, 2011 (4 pgs).
IPS Group Inc., Exhibit 2008, How M2M Maximizes Denver's Revenue, Oct. 2011 (4 pgs).
IPS Group Inc., Exhibit 2009, Somerville, MA, T&P Introduces User-Friendly Parking Meters & Service Upgrades with Electronic Meter Pilot, Apr. 19, 2011 (2 pgs).
IPS Multi Bay Parking Meter product description, http://www.design-industry.com.au/work/multi-bay-parking-meter/, Oct. 6, 2015 (6 pgs).
IPS Single Bay Parking Meter product description, http://www.design-industry.com.au/work/ips-single-parking-meter/, Oct. 6, 2015 (6 pgs).
Kienzle, meter photograph, pre-Mar. 2011 (1 pg).
McCullagh, D., "Hackers: We can bypass San Francisco e-parking meters," Jul. 30, 2009, http://news.cnet.com (2 pgs).
Meter Solutions, Single-Space Meters brochure, downloaded from www.duncansolutions.com website, revised Apr. 2006 (2 pgs).
Micrel, Application Note 51 Frequency Hopping Techniques, Jun. 2006, Rev. 1.0 (8 pgs).
Notice of Allowance issued in U.S. Appl. No. 13/546,918, dated Feb. 26, 2015 (24 pgs).
Notice of Allowance issued in U.S. Appl. No. 13/546,918, dated Jun. 19, 2015 (13 pg).
Notice of Allowance issued in U.S. Appl. No. 13/546,918, dated Mar. 28, 2016 (29 pgs).
Notice of Allowance issued in U.S. Appl. No. 13/546,918, dated Nov. 20, 2015 (12 pgs).
Notice of Allowance issued in U.S. Appl. No. 14/325,134, dated Apr. 28, 2016 (19 pgs).
Notice of Allowance issued in U.S. Appl. No. 14/325,134, dated Feb. 3, 2016 (14 pgs).
Notice of Allowance issued in U.S. Appl. No. 14/743,691, dated May 13, 2016 (62 pgs).
Notice of Allowance issued in U.S. Appl. No. 29/477,339, dated Apr. 1, 2015 (3 pgs).
Notice of Allowance issued in U.S. Appl. No. 29/477,402, dated Aug. 3, 2015 (3 pgs).
Notice of Allowance issued in U.S. Appl. No. 29/477,405, dated Apr. 1, 2015 (10 pgs).
Notice of Allowance issued in U.S. Appl. No. 13/545,871, dated May 28, 2013 (10 pgs).
Notice of Allowance issued in related U.S. Appl. No. 13/410,831, dated Oct. 11, 2013 (33 pgs).
Notice of Allowance issued in related U.S. Appl. No. 13/545,871, dated Dec. 16, 2013 (22 pgs).
Notice of Allowance issued in related U.S. Appl. No. 29/433,549, dated Feb. 27, 2014 (60 pgs).
Notice of Allowance issued in related U.S. Appl. No. 29/489,572 dated Jun. 11, 2014 (10 pgs).
Office Action issued for related U.S. Appl. No. 13/410,831, dated Nov. 6, 2012 (46 pgs).
Office Action issued for related U.S. Appl. No. 13/546,918, dated Sep. 26, 2012 (26 pgs).
Office Action issued for U.S. Appl. No. 12/355,734, dated Apr. 6, 2012 (36 pgs).
Office Action issued for U.S. Appl. No. 12/973,109, dated Apr. 30, 2012 (24 pgs).
Office Action issued in U.S. Appl. No. 13/468,881, dated Sep. 4, 2013 (13 pgs).
Office Action issued in U.S. Appl. No. 14/094,382, dated Mar. 24, 2015 (16 pgs).
Office Action issued in U.S. Appl. No. 14/325,134, dated Apr. 1, 2015 (46 pgs).
Office Action issued in U.S. Appl. No. 14/325,134, dated Jul. 21, 2015 (28 pgs).
Office Action issued in U.S. Appl. No. 14/325,134, dated Nov. 24, 2015 (22 pgs).
Office Action issued in U.S. Appl. No. 14/698,806, dated Dec. 14, 2015 (9 pgs).
Office Action issued in U.S. Appl. No. 29/455,221, dated Jan. 13 2014 (10 pgs).

(56) References Cited

OTHER PUBLICATIONS

Office Action issued in U.S. Appl. No. 29/477,176, dated May 4, 2015 (16 pgs).
Office Action issued in U.S. Appl. No. 29/477,200, dated Apr. 9, 2015 (13 pgs).
Office Action issued in U.S. Appl. No. 29/477,201, dated Apr. 9, 2015 (13 pgs).
Office Action issued in U.S. Appl. No. 29/477,204, dated Apr. 9, 2015 (13 pgs).
Office Action issued in U.S. Appl. No. 29/477,321, dated May 15, 2015 (9 pgs).
Office Action issued in U.S. Appl. No. 29/477,324, dated Apr. 23, 2015 (9 pgs).
Office Action issued in U.S. Appl. No. 29/477,329, dated May 22, 2015 (11 pgs).
Office Action issued in U.S. Appl. No. 29/477,402, dated Apr. 9, 2015 (19 pgs).
Office Action issued in related U.S. Appl. No. 08/418,018, dated Jul. 25, 1997 (6 pgs).
Office Action issued in related U.S. Appl. No. 08/418,018, dated Jan. 17, 1997 (11 pgs).
Office Action issued in related U.S. Appl. No. 08/959,109, dated May 25, 2012 (4 pgs).
Office Action issued in related U.S. Appl. No. 08/959,109, dated Aug. 5, 2011 (7 pgs).
Office Action issued in related U.S. Appl. No. 08/959,109, dated Apr. 1, 2011 (8 pgs).
Office Action issued in related U.S. Appl. No. 08/959,109, dated Jan. 26, 1998 (9 pgs).
Office Action issued in related U.S. Appl. No. 13/141,977, dated Aug. 1, 2013 (37 pgs).
Office Action issued in related U.S. Appl. No. 13/141,977, dated Oct. 11, 2012 (35 pgs).
Office Action issued in related U.S. Appl. No. 13/141,983, dated Oct. 22, 2013 (47 pgs).
Office Action issued in related U.S. Appl. No. 13/410,831, dated Jul. 12, 2013 (7 pgs).
Office Action issued in related U.S. Appl. No. 13/529,914, dated Sep. 27, 2013 (18 pgs).
Office Action issued in related U.S. Appl. No. 13/545,871, dated Aug. 6, 2013 (39 pgs).
Office Action issued in related U.S. Appl. No. 13/546,918, dated May 8, 2014 (22 pgs).
Office Action issued in related U.S. Appl. No. 13/546,918, dated Dec. 5, 2013 (23 pgs).
Office Action issued in related U.S. Appl. No. 14/094,382, dated Aug. 5, 2014 (47 pgs).
Office Action issued in related U.S. Appl. No. 14/094,382, dated Dec. 26, 2014 (25 pgs).
Office Action issued in related U.S. Appl. No. 08/959,109, dated Nov. 21, 2012 (24 pgs).
Office Action issued in related U.S. Appl. No. 08/959,109, dated Apr. 23, 2013 (10 pgs).
Office Action issued in related U.S. Appl. No. 12/973,109, dated Jan. 28, 2013 (19 pgs).
Office Action issued in related U.S. Appl. No. 13/141,977, dated May 8, 2013 (34 pgs).
Office Action issued in related U.S. Appl. No. 13/141,977, dated May 28, 2015 (88 pgs).
Office Action issued in related U.S. Appl. No. 13/141,983, dated Jun. 14, 2013 (68 pgs).
Office Action issued in related U.S. Appl. No. 13/410,831 dated Feb. 12, 2013 (20 pgs).
Office Action issued in related U.S. Appl. No. 13/410,831, dated May 28, 2013 (15 pgs).
Office Action issued in related U.S. Appl. No. 13/529,914, dated Jun. 21, 2013 (33 pgs).
Office Action issued in related U.S. Appl. No. 13/545,871, dated Nov. 28, 2012 (30 pgs).
Office Action issued in related U.S. Appl. No. 13/545,871, dated Dec. 28, 2012 (7 pgs).
Office Action issued in related U.S. Appl. No. 13/545,871, dated Apr. 12, 2013 (16 pgs).
Office Action issued in related U.S. Appl. No. 13/546,918, dated Apr. 15, 2013 (21 pgs).
Office Action, dated Apr. 11, 2011 in U.S. Appl. No. 12/095,914 (3 pgs).
Office Action, dated Jun. 29, 2011 in U.S. Appl. No. 12/059,909 (21 pgs).
Office Action, dated Jul. 27, 2011 in U.S. Appl. No. 12/059,909 (34 pgs).
Office Action, dated Sep. 14, 2011 in U.S. Appl. No. 12/430,733 (7 pgs).
Office Action, dated Sep. 15, 2011 in U.S. Appl. No. 12/355,740 (6 pgs).
Office Action, dated Dec. 7, 2011 in U.S. Appl. No. 12/355,734 (31 pgs).
Office Action, dated Dec. 13, 2011 in U.S. Appl. No. 12/973,109 (27 pgs).
Office Action, dated Dec. 20, 2011 in U.S. Appl. No. 12/355,740 (12 pgs).
Photo Violation Technologies—Revolutionizing the Industry by Perfecting How People Park, https://web.archive.org/web/20060813094459/http://photoviolation.com/, Aug. 13, 2006 (65 pgs).
Photo Violation Technologies—Revolutionizing the Industry by Perfecting How People Park, https://web.archive.org/web/20060823100739/http://photoviolation.com/, Aug. 23, 2006 (65 pgs).
Photo Violation Technologies—Revolutionizing the Industry by Perfecting How People Park, https://web.archive.org/web/20080222104246/http://photoviolation.com/, Feb. 22, 2008 (47 pgs).
Photo Violation Technologies—Revolutionizing the Industry by Perfecting How People Park, https://web.archive.org/web/20060110041849/http://photoviolation.com/, Jan. 10, 2006 (57 pgs).
Photo Violation Technologies—Revolutionizing the Industry by Perfecting How People Park, https://web.archive.org/web/20060715195511/http://photoviolation.com/, Jul. 15, 2006 (49 pgs).
Photo Violation Technologies—Revolutionizing the Industry by Perfecting How People Park, https://web.archive.org/web/20070628195927/http://www.photoviolation.com/, Jun. 28, 2007 (50 pgs).
Photo Violation Technologies Corp.—Products, Oct. 2, 2015 (3 pgs).
Photo Violation Technologies Corp. Press Releases, Jul. 18, 2005-Jan. 17, 2006 (9 pgs).
Photo Violation Technologies Corp., https://web.archive.org/web/20131118213440/http://photoviolationmeter.com/, Nov. 18, 2013 (8 pgs).
Photo Violation Technologies Corp., https://web.archive.org/web/20040401225217/http://photoviolationmeter.com/, Apr. 1, 2004 (50 pgs).
PhotoViolationMeter pamphlet (undated) 2 pgs).
POM APM photographs (33 pgs).
POM APM Solar Powered Meter advertisements, undated (5 pgs).
Reino International, Recommended Cashbox Handling Guidelines, Version 2.0, Nov. 26, 2003 (7 pgs).
Reino Meter Advertisement, The power of a paystation, Parking Today, Aug. 2003 (1 pg).
Reino Parking Systems: On-Street Service Procedures, Jun. 29, 2004 (19 pgs).
Reino, Operator User Manual, 2003 (106 pgs).
Reino, Parking Systems RSV2 Service Manual, Version 3.1, Dec. 2003 (78 pgs).
Reino, RSV3 brochure, Nov. 10, 2007 (4 pgs).
Remedios et al., "NFC Technologies in Mobile Phones and Emerging Applications," 2006, IFIP International Federation for Information Processing, vol. 220, Information Technology for Balanced Manufacturing Systems, ed. Shen, W., (Boston: Springer, pp. 425-434 (10 pgs).

(56) References Cited

OTHER PUBLICATIONS

Request for Continued Examination (RCE) and Information Disclosure Statement by Applicant filed for U.S. Appl. No. 12/973,109 dated May 31, 2012 (43 pgs).
Request for Continued Examination, dated Mar. 30, 2012 in U.S. Appl. No. 12/355,734 (32 pgs).
Request for Continued Examination, dated Sep. 27, 2011 in U.S. Appl. No. 12/059,909 (18 pgs).
Shaheen, S., "Smart Parking Management Field Test: A Bay Area Rapid Transit (BART) District Parking Demonstration," Institute of Transportation Studies, UC Davis, Jan. 1, 2005 (139 pgs).
Spyker, R.L., "Predicting capacitor run time for a battery/capacitor hybrid source," Power Electronic Drives and Energy Systems for Industrial Growth, 1998, abstract only (2 pgs).
StreetSmart Technology, LLC, "Technical Specifications and System Features for the StreetSmart Solution" Brochure (8 pgs).
Supplementary European Search Report issued in related application No. EP07784953, dated Jul. 1, 2010 (1 pg).
The Patented PhotoViolationMeter Solution book view (undated) (12 pgs).
The PhotoViolationMeter Case Study, Photo Violation Technologies Corp., Dec. 15, 2015 (4 pgs).
The United States Conference of Mayors Press Release, "The U.S. Conference of Mayors Presents 'Best-Practice' Awards," Jan. 20, 2012, (3 pgs).
Transcript & Screenshots of https://web.archive.org/web/20080222104246/http://www.photoviolation.com/videos/PCM.wmv, Photo Violation Technologies Corp.—"ParkCardMeter™ System," undated (6 pgs).
Transcript & Screenshots of https://web.archive.org/web/20080222104246/http://www.photoviolation.com/videos/HHU.wmv, Photo Violation Technologies Corp.—"PhotoViolationHandHeldUnit™," undated (7 pgs).
Transcript & Screenshots of https://web.archive.org/web/20080222104246/http://www.photoviolation.com/videos/PBS.wmv, Photo Violation Technologies Corp.—"The PBS Solution," undated (10 pgs).
Transcript & Screenshots of haps://web.archive.org/web/20080222104246/http://www.photoviolation.com/videos/PVM.wmv, Photo Violation Technologies Corp.—"The PVM Solution," undated (17 pgs).
Video link, "ParkCardMeter™ System," https://web.archive.org/web/20080222104246/http://www.photoviolation.com/videos/PCM.wmv, Photo Violation Technologies Corp., undated.
Video link, "PhotoViolationHandHeldUnit™," https://web.archive.org/web/20080222104246/http://www.photoviolation.com/videos/HHU.wmv, Photo Violation Technologies Corp., undated.
Video link, "The PBS Solution," https://web.archive.org/web/20080222104246/http://www.photoviolation.com/videos/PBS.wmv, Photo Violation Technologies Corp., undated.
Video link, "The PVM Solution," https://web.archive.org/web/20080222104246/http://www.photoviolation.com/videos/PVM.wmv, Photo Violation Technologies Corp., undated.
Written Opinion issued in application No. PCT/US2012/037205, dated Oct. 4, 2012 (5 pgs).
Written Opinion issued in application No. PCT/US2012/037229, dated Jan. 28, 2013 (6 pgs).
YouTube video, "The PhotoViolationMeter TM" https://www.youtube.com/watch?v=YEFuebnwn_Y, Dec. 15, 2006 (2 pgs).
Office Action issued in U.S. Appl. No. 14/743,691,dated May 13, 2016 (62 pgs).
Office Action issued in U.S. Appl. No. 14/864,170, dated Oct. 7, 2016 (65 pgs).
Ambravan, B., "Improved-Clarity Polycarbonate (PC) Resins used in liniLED PU," http://organiclighting.com/tag/polycarbonate-pc-resins/, Sep. 26, 2016 (1 pg).
GE Plastics, "Weatherable PC applications expand," http://www.plasticstoday.com/weatherable-pc-applications-expand/14554616432605, Sep. 26, 2016 (2 pgs).

International Search Report and Written Opinion issued in application No. PCT/CA2016/050928, dated Oct. 12, 2016 (12 pgs).
International Search Report and Written Opinion issued in application No. PCT/CA2016/050927, dated Nov. 25, 2016 (14 pgs).
MacKay Custodian™ Multi-Space Machine Configuration Guide, 2003-2005 (184 pgs).
Office Action issued in U.S. Appl. No. 14/811,641, dated Oct. 5, 2016 (49 ps).
Office Action issued in U.S. Appl. No. 14/979,104, dated May 5, 2016 (15 pgs).
*Duncan Parking Technologies, Inc.* vs. *IPS Group Inc.*, Patent Owner's Preliminary Response, Case IPR2016-01144, dated Sep. 8, 2016 (58 pgs).
*Duncan Parking Technologies, Inc.* vs. *IPS Group Inc.*, Patent Owner's Preliminary Response, Case IPR2016-01145, dated Sep. 8, 2016 (52 pgs).
*Duncan Parking Technologies, Inc.* vs. *IPS Group Inc.*, Patent Owner Response, Case IPR2016-00067, dated Jul. 12, 2016 (32 pgs).
*Duncan Parking Technologies, Inc.* vs. *IPS Group Inc.*, Petition for Inter Partes Review, U.S. Pat. No. 8,595,054, dated Jun. 3, 2016 (79 pgs).
*Duncan Parking Technologies, Inc.* vs. *IPS Group Inc.*, Petition for Inter Partes Review, U.S. Pat. No. 7,854,310, dated Jun. 3, 2016 (70 pgs).
Notice of Allowance issued in U.S. Appl. No. 13/141,977, dated Jul. 29, 2016 (62 pgs).
Office Action issued in U.S. Appl. No. 14/743,691, dated Sep. 2, 2016 (26 pgs).
Design U.S. Appl. No. 29/466,268, filed Sep. 5, 2013 (19 pgs).
Design U.S. Appl. No. 29/466,267, filed Sep. 5, 2013 (19 pgs).
Design U.S. Appl. No. 29/466,269, filed Sep. 5, 2013 (19 pgs).
Design U.S. Appl. No. 29/477,176, filed Dec. 19, 2013 (24 pgs).
Design U.S. Appl. No. 29/477,195, filed Dec. 19, 2013 (21 pgs).
Design U.S. Appl. No. 29/477,196, filed Dec. 19, 2013 (21 pgs).
Design U.S. Appl. No. 29/477,339, filed Dec. 20, 2013 (21 pgs).
Design U.S. Appl. No. 29/477,402, filed Dec. 20, 2013 (24 pgs).
Design U.S. Appl. No. 29/477,405, filed Dec. 20, 2013 (24 pgs).
Office Action issued in U.S. Appl. No. 14/864,170, dated Apr. 19, 2017 (22 pgs).
U.S. Appl. No. 08/959,109, filed Oct. 23, 1997.
U.S. Appl. No. 10/317,414, filed Dec. 12, 2002.
U.S. Appl. No. 12/430,733, filed Apr. 27, 2009.
U.S. Appl. No. 12/788,100, filed May 26, 2010.
U.S. Appl. No. 13/141,977, filed Jun. 23, 2011.
U.S. Appl. No. 13/141,983, filed Jun. 23, 2011.
U.S. Appl. No. 13/410,831, filed Mar. 2, 2012.
U.S. Appl. No. 13/454,976, filed Apr. 24, 2012.
U.S. Appl. No. 13/529,914, filed Jun. 21, 2012.
U.S. Appl. No. 13/545,871, filed Jul. 10, 2012.
U.S. Appl. No. 13/546,918, filed Jul. 11, 2012.
U.S. Appl. No. 29/367,429, filed Aug. 6, 2010.
U.S. Appl. No. 29/367,431, filed Aug. 6, 2010.
U.S. Appl. No. 29/391,605, filed May 11, 2011.
U.S. Appl. No. 29/410,857, filed Jan. 12, 2012.
U.S. Appl. No. 29/433,549, filed Oct. 1, 2012.
U.S. Appl. No. 61/048,133, filed Apr. 25, 2008.
U.S. Appl. No. 61/140,543, filed Dec. 23, 2008.
U.S. Appl. No. 13/782,818, filed Mar. 1, 2013.
U.S. Appl. No. 14/094,382, filed Dec. 2, 2013.
U.S. Appl. No. 29/489,572, filed Apr. 30, 2014.
U.S. Appl. No. 14/325,134, filed Jul. 7, 2014.
U.S. Appl. No. 14/743,691, filed Jun. 18, 2015.
U.S. Appl. No. 14/864,170, filed Sep. 24, 2015.
U.S. Appl. No. 13/141,977, filed Jun. 23, 2011, MacKay et al.
U.S. Appl. No. 13/546,918, filed Jul. 11, 2012, MacKay et al.
U.S. Appl. No. 14/325,134, filed Jul. 7, 2014, MacKay et al.
U.S. Appl. No. 14/743,691, filed Jun. 18, 2015, MacKay et al.
U.S. Appl. No. 14/864,170, filed Sep. 24, 2015, MacKay et al.
Notice of Allowance issued in application No. 14/864,1708, dated Aug. 3, 2017 (25 pgs).
Cardinal Tracking Inc.—MobileCite brochure, dated prior to Jun. 15, 2015 (2 pgs).

(56) References Cited

OTHER PUBLICATIONS

Digital Payment Technologies—LUKE brochure, dated prior to Jun. 15, 2015 (4 pgs).

PhotoViolationMeter pamphlet, dated Jan. 18, 2006 (2 pgs).

The Patented PhotoViolationMeter Solution view dated Mar. 28, 2006 (12 pgs).

POM APM photographs, dated Apr. 29, 2010 (33 pgs).

POM APM Solar Powered Meter advertisements, dated Apr. 28, 2010 (5 pgs).

Transcript & Screenshots of https://web.archive.org/web/20080222104246/http://www.photoviolation.com/videos/PCM.wmv, Photo Violation Technologies Corp.—"ParkCardMeter™ System," dated prior to Jun. 15, 2015 (6 pgs).

Transcript & Screenshots ofm https://web.archive.org/web/20080222104246/http://www.photoviolation.com/videos/HHU.wmv, Photo Violation Technologies Corp.—"PhotoViolationHandHeldUnit™," dated prior to Jun. 15, 2015 (7 pgs).

Transcript & Screenshots of https://web.archive.org/web/20080222104246/http://www.photoviolation.com/videos/PBS.wmv, Photo Violation Technologies Corp.—"The PBS Solution," dated prior to Jun. 15, 2015 (10 pgs).

Transcript & Screenshots of https://web.archive.org/web/20080222104246/http://www.photoviolation.com/videos/PVM.wmv, Photo Violation Technologies Corp.—"The PVM Solution," dated prior to Jun. 15, 2015 (17 pgs).

Video link, "ParkCardMeter™ System," http://web.archive.org/web/20080222104246/http://www.photoviolation.com/videos/PCM.wmv, Photo Violation Technologies Corp., dated prior to Jun. 15, 2015.

Video link, "PhotoViolationHandHeldUnit™," https://web.archive.org/web/20080222104246/http://www.photoviolation.com/videos/HHU.wmv, Photo Violation Technologies Corp., dated prior to Jun. 15, 2015.

Video link, "The PBS Solution," https://web.archive.org/web/20080222104246/http://www.photoviolation.com/videos/PBS.wmv, Photo Violation Technologies Corp., dated prior to Jun. 15, 2015.

Video link, "The PVM Solution," http://web.archive.org/web20080222104246/http://www.photoviolation.com/videos/PVM.wmv, Photo Violation Technologies Corp., dated prior to Jun. 15, 2015.

\* cited by examiner

SINGLE SPACE PARKING METER AND REMOVABLE SINGLE SPACE PARKING METER MECHANISM

CROSS REFERENCE TO RELATED APPLICATION

This application is a continuation of U.S. patent application Ser. No. 14/325,134, filed Jul. 7, 2014, now U.S. Pat. No. 9,443,236, which application is a continuation of U.S. patent application Ser. No. 13/410,831, filed Mar. 2, 2012, now U.S. Pat. No. 8,770,371, which application in turn claims priority from Canadian Patent Application Serial No. 2733110, filed Mar. 3, 2011, and Canadian Patent Application Serial No. 2756489, filed Oct. 28, 2011, the disclosures of which are hereby incorporated by reference.

TECHNICAL FIELD

The present disclosure relates to single space parking meters and removable single space parking meter mechanisms.

BACKGROUND

Parking meters come in many shapes and sizes but are generally divided into two main types or classes: multi-space parking meters which are typically larger devices capable of managing the parking payment and control for typically between six or more, or possibly even hundreds of parking spaces; and, single-space parking meters which are typically small devices capable of managing the parking payment and control of a single parking space, but also sometimes additional spaces, such as two, four, or six spaces which are located in close proximity to the parking meter.

FIG. 19 depicts a single space parking meter 700 installed on a pole 701. Single space parking meter mechanisms are typically installed in a protective housing on a pole 701 near a parking space. The protective housing components, which are directly exposed to the elements and the public, are traditionally separate from the actual parking meter mechanism (not shown). The protective housing components of previous single space parking meters 700 typically comprise a lower housing 702 that receives a removable parking meter mechanism. A cover cap 705 is placed over the parking meter mechanism and secured to the lower housing 702. The cover cap 705 typically comprises a semi-circular opening 709, covered by a transparent material, through which a display 742 is visible through a display opening 740 of the parking meter mechanism. The lower housing 702 is typically secured to a coin vault 708 for storing coins received during operation of the parking meter 700. The coin vault 708 may be secured to the pole 701. The parking meter 700 is operated by inserting payment, either in the form of coins or payment cards such as chip cards or electronic purse cards, into the parking meter 700 which then displays and counts down the purchased amount of parking time.

Single space parking meters are often located in unattended areas, and as such vandalism, tampering and theft are of concern. The protective housing, which typically comprises the lower housing 702 and the cover cap 705, provides protection for the components of the parking meter mechanism from vandalism, tampering and theft, as well as protection from the environment.

Single space parking meters may comprise a parking meter mechanism that provides communication, either wired or wireless, with a remote location. The communication means can enable the single space parking meter to accept credit card payments or other types of payments requiring authorization from a remote computer system.

Although previous parking meters may provide sufficient or acceptable operation, an improved parking meter and parking meter mechanism is desired that provides one or more of a more secure parking meter, a more convenient to use parking meter, an easier to manufacture and assemble parking meter, an easier to remove, replace or service parking meter mechanism, and a more power efficient parking meter mechanism.

SUMMARY

There is disclosed a removable single space parking meter mechanism comprising an internal structure to be at least partially and removably received within a lower housing of a single space parking meter, and a front housing, to be exposed to an external environment, coupled to the internal structure and comprising a display opening.

There is further disclosed a single space parking meter comprising a lower housing; a removable single space parking meter mechanism and a back housing secured to the lower housing and the removable single space parking meter mechanism. The removable single space parking meter mechanism comprises an internal structure to be at least partially and removably received within the lower housing; and a front housing, exposed to an external environment, coupled to the internal structure and comprising a display opening.

There is still further disclosed a method of assembling a single space parking meter comprising placing a removable parking meter mechanism having a pivotally attached front housing at least partially in a lower housing having a back housing secured to the lower housing; pivoting the front housing towards the back housing; and securing the front housing to the back housing to provide a protective housing of the parking meter.

There is further still disclosed a single space parking meter comprising: a lower housing; a removable single space parking meter mechanism comprising an internal structure at least partially and removably received within a lower housing of a single space parking meter; a housing coupled to the lower housing and the removable single space parking meter mechanism; and a solar panel arranged on an exterior surface of the housing of the single space parking meter.

There is yet further disclosed a single space parking meter comprising: a lower housing; a removable single space parking meter mechanism, and a housing coupled to the lower housing and the removable single space parking meter mechanism. The removable single space parking meter mechanism comprises an internal structure at least partially and removably received within a lower housing of a single space parking meter; and a plurality of parking meter mechanism components coupled to the internal structure, the plurality of parking meter mechanism components comprising a display for displaying parking information; and a contactless payment reader located behind the display.

BRIEF DESCRIPTION OF THE DRAWINGS

Further features and advantages will become apparent from the following detailed description, taken in combination with the appended drawings, in which.

DETAILED DESCRIPTION

Figure 1:
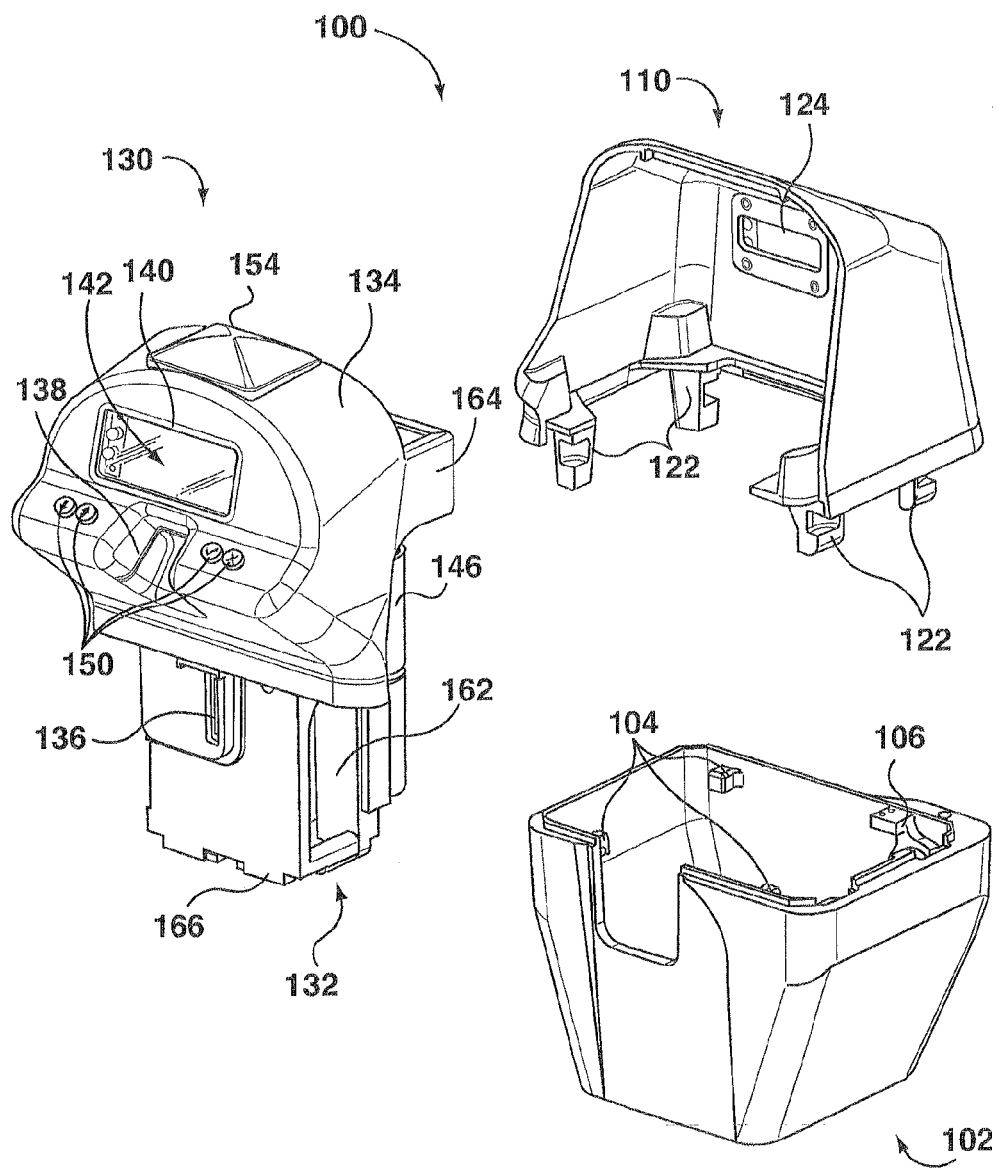
FIG. 1 is an upper front perspective of components of a parking meter.
Figure 2:
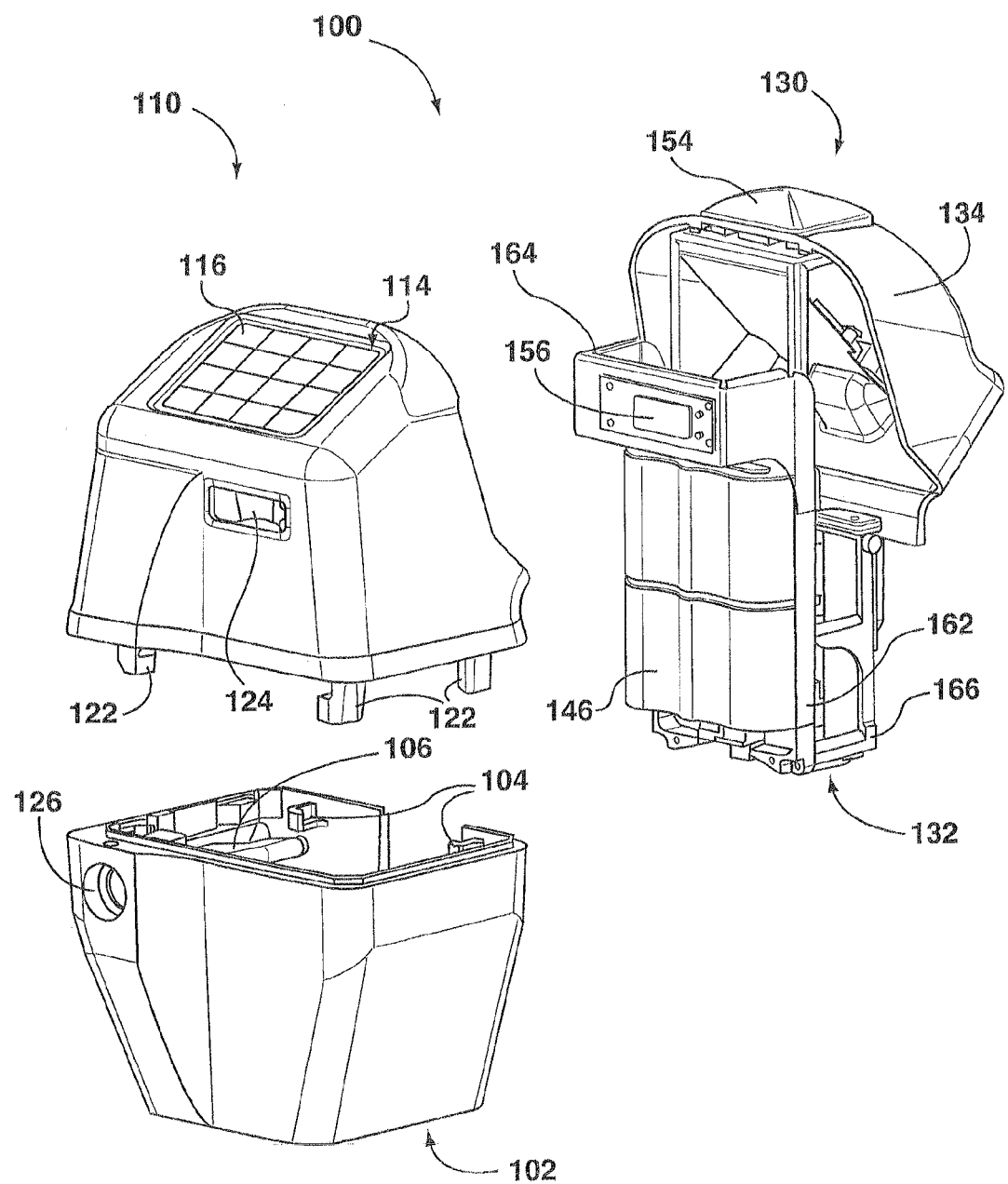
FIG. 2 is an upper rear perspective of components of the parking meter of FIG. 1.
Figure 3:
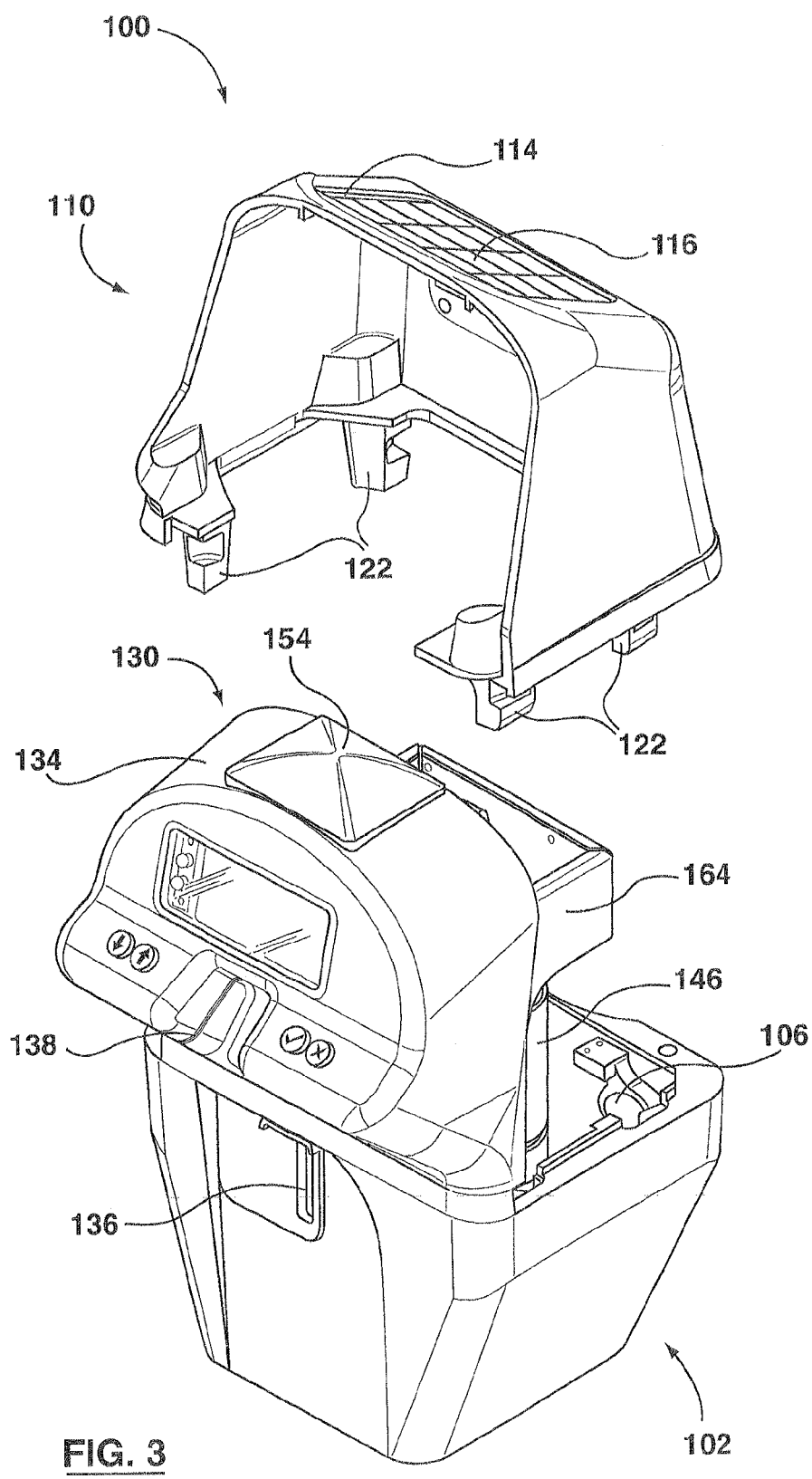
FIG. 3 is an upper front perspective of the parking meter of FIG. 1 partially assembled.
Figure 4:
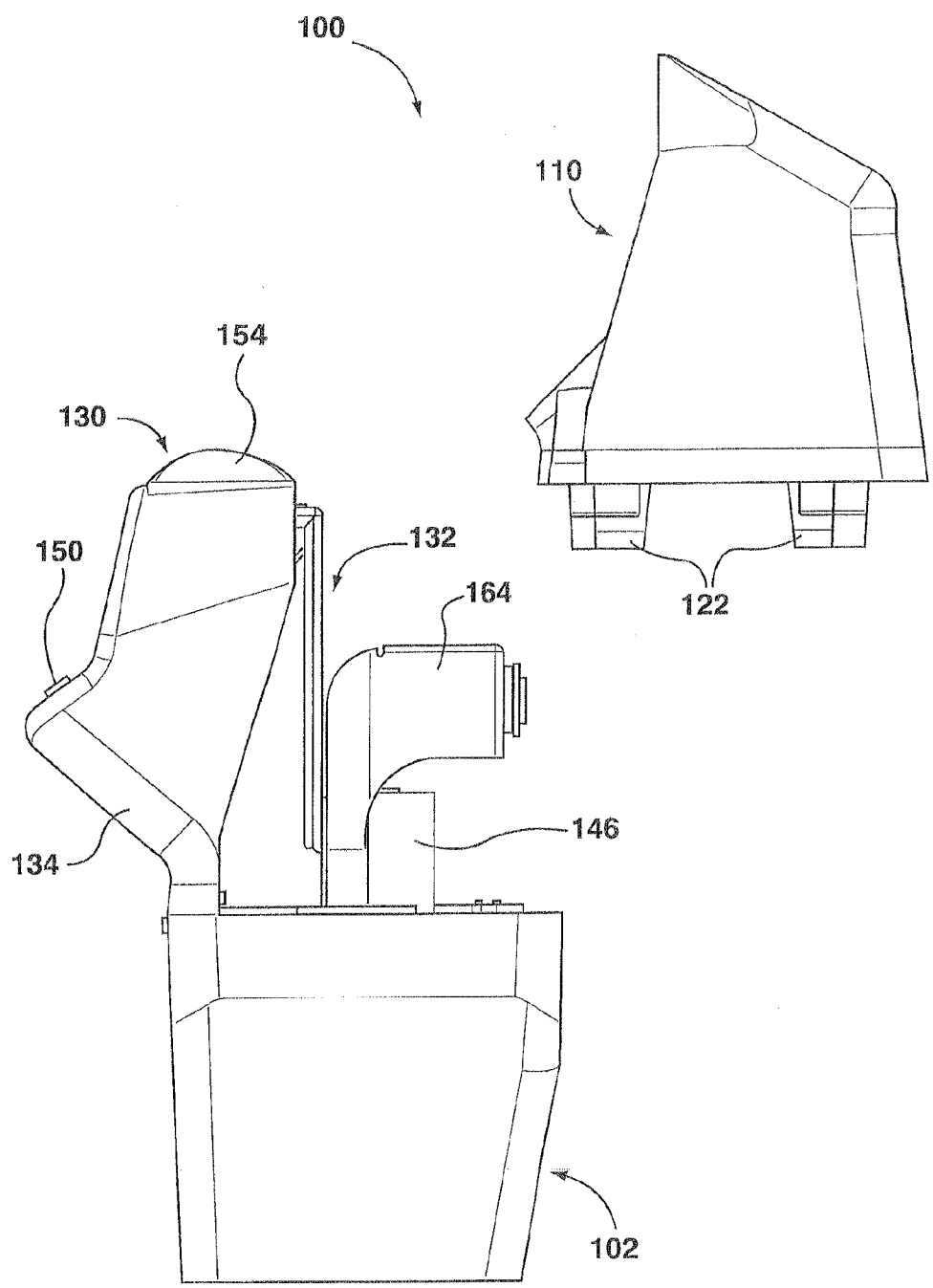
FIG. 4 is a side view of the parking meter of FIG. 1 partially assembled.
Figure 5:
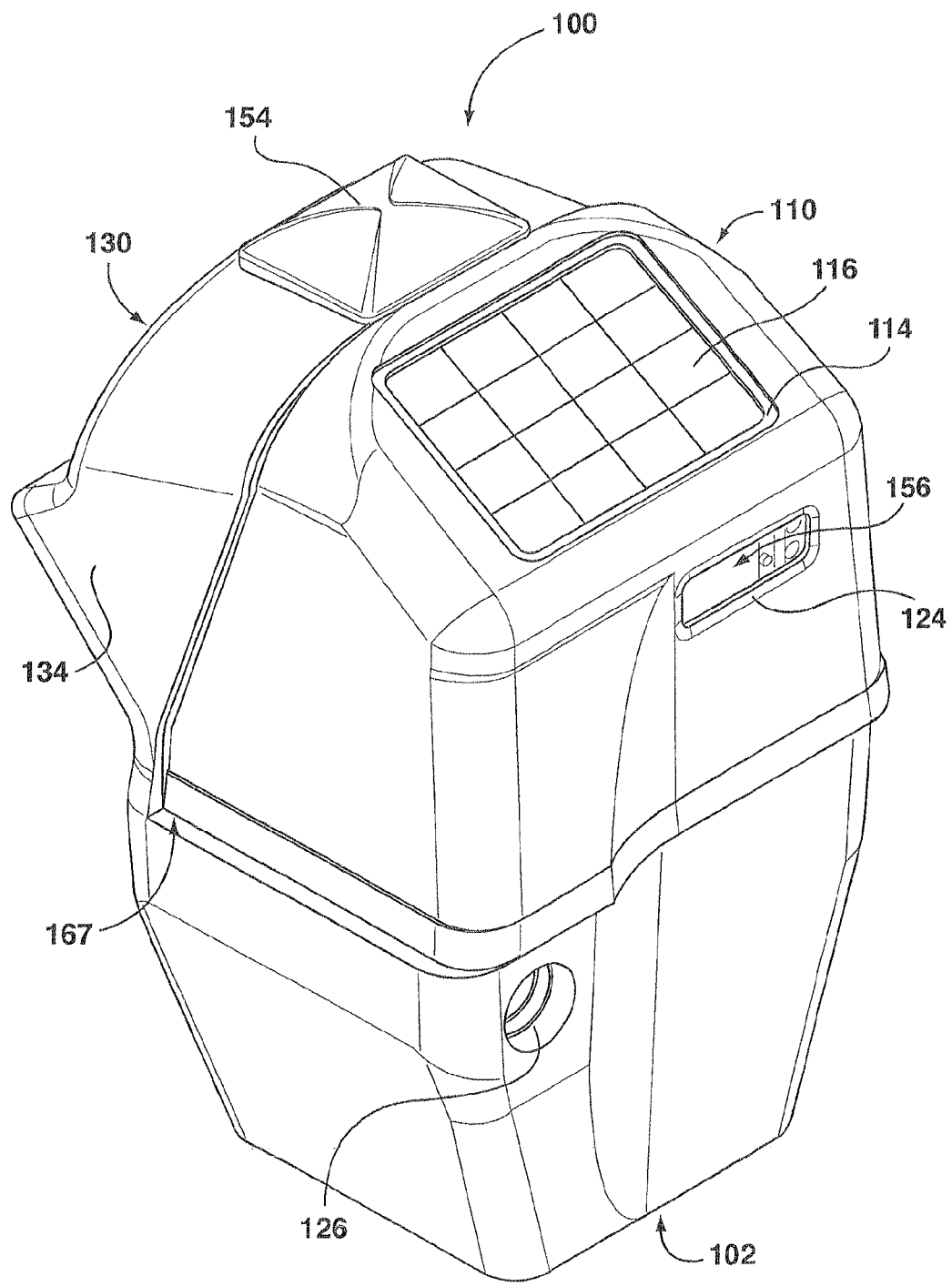
FIG. 5 is an upper rear perspective of the parking meter of FIG. 1 assembled.

FIGS. 1-7 depict various views of an embodiment of a single space parking meter 100. Although described herein as a single space parking meter, the parking meter may manage the parking payment and control of more than a single parking space, for example one parking space to the left of the parking meter and one to the right. Although single space parking meters may be associated with a single parking space or multiple spaces, the term is used to differentiate the parking meter type from multi-space 'pay and display' or 'pay by space' type meters. The single space parking meters may be associated with multiple adjacent parking spaces and manage the parking payment and control of, and display the parking time remaining for, the parking spaces.

The single space parking meter 100 comprises a lower housing 102, a back housing 110 and a removable parking meter mechanism 130. The parking meter mechanism 130 may be partially received within the lower housing 102, which is typically secured to a coin vault (not shown) that is mounted on a pole (not shown) when in use. The back housing 110, the parking meter mechanism 130 and the lower housing 102 are generally locked or secured together to form a protective housing that provides protection from the environment, theft and vandalism. The back housing 110 can be locked to the lower housing 102, thereby securing the parking meter mechanism 130 in the lower housing 102.

When the parking meter 100 is assembled, that is the parking meter mechanism 130 is, at least partially, placed in the lower housing 102 and the back housing 110 is secured to the lower housing 102, the components of the parking meter mechanism 130 are protected from the environment, vandalism, tampering, theft or other unauthorized access. As described further herein, the parking meter mechanism 130 may include a front housing 134 with a display opening 140 through which the display 142 is visible. The parking meter mechanism 130 may include a contactless payment reader (not shown) located behind the display 142. The back housing 110 of the parking meter 100 may comprise a solar panel 116 arranged on the back housing 110. The solar panel 116 may be enclosed within a solar panel compartment 114 of the back housing 110. The solar panel compartment 114 may have a substantially intact bottom surface (not shown), so that the protection provided by the back housing 110 is not reduced or compromised by a large opening for the solar panel 116.

With respect to the parking meter mechanism 130, it will be appreciated that the parking meter mechanism 130 may be partially received within a lower housing 102 of various sizes, shapes and configurations. Regardless of the lower housing 102 the parking meter mechanism 130 can be placed in, it is desirable for the parking meter mechanism 130 to be easily removed from the lower housing 102 to allow replacement or servicing of the parking meter mechanism 130. This easy removal allows for a non-functioning parking meter mechanism to be repaired or replaced with a different and functioning parking meter mechanism. The non-functioning parking meter mechanism may then be repaired or replaced without leaving a parking meter unusable and a parking space not managed nor controlled.

The parking meter mechanism 130 is provided with an internal structure 132 that provides a mounting point for other components of the parking meter mechanism 130. The internal structure 132 may comprise one or more components such as frames or sub-frames, and provides a structure to which the front housing 134 is mounted as well as other components of the parking meter mechanism 130 such as the display 142, main control board (not shown), power source 146 and payment means (not shown). Furthermore, the internal structure 132 provides a structure that is at least partially, and removably, received within the lower housing 102. The internal structure 132 may be provided in various ways. As depicted, the internal structure 132 includes at least a main support frame 162 to which additional components of the internal structure 132 as well as components of the parking meter mechanism 130 may be mounted. The internal structure 132 may comprise additional mounting components such as, for example sub-frame 164 to which an auxiliary display 156 is mounted. The internal structure 132 may also comprise, for example, a mechanism cover plate 166 that is secured over one or more components, such as a coin chute (not shown), and includes a coin slot 136 for receiving coins into the coin chute. Further still, the internal structure 132 may include surfaces of components of the parking meter mechanism 130 mounted to the internal structure 132. For example, although the front housing 134 is connected to the internal structure 132, an interior surface of the front housing 134 may form part of the internal structure 132 and be used to mount components of the parking meter mechanism 130. Thus, actual components of the parking meter mechanism 130 may act as mounting surfaces for other components of the parking meter mechanism 130 such that those actual components of the parking meter mechanism 130 form part of internal structure 132.

The parking meter mechanism 130 may comprise various components depending on the desired functionality of the parking meter 100. The components of the parking meter mechanism 130 will typically comprise a display 142 adjacent the display opening 140 of the parking meter mechanism 130 to display parking meter related information, such as the amount of parking time purchased or remaining, the current time of day, the parking rate, days/hours of operation and other information. The components of the parking meter mechanism 130 may further comprise a main control board (not shown) for controlling the overall operation of the parking meter mechanism 130, as well as a power source 146, such as a battery pack and/or a rechargeable battery pack coupled to at least the main control board (not shown) to provide power during operation.

The parking meter mechanism 130 will further typically include a coin chute (not shown) for receiving coins through a coin slot 136 in the front housing 134 of the parking meter mechanism 130. The components of the parking meter mechanism 130 may further comprise a card payment component (not shown) for receiving payment by a payment card inserted into a card slot 138 of the front housing 134. Depending on the communication abilities of the parking meter 100, the payment card may be a credit card, debit card, chip card or other type of payment card such as an electronic purse card. Payment cards requiring a personal identification number (PIN) to be entered are not considered in detail; however, such payment cards requiring a PIN to be entered may be accepted by the parking meter 100 where, for example, the display 142 comprises touchscreen technology for displaying touchscreen buttons (not shown) associated with at least digits 0-9. Such a display 142 may also be able to present a user with a choice of touchscreen buttons associated with a combination of alpha and/or numeric characters. For example, such a touchscreen display 142 may allow the parking meter 100 to prompt the user to input a PIN, a vehicle license plate number, or a parking space identifier that contains alpha characters, numeric characters, and/or a combination of both alpha and numeric characters, as the case may be. Although the parking meter 100 includes both a coin chute and a card payment component, it is not required to have both. The parking meter 100 may accept payment by way of a number of means. The means could be the coin chute, card payment component or other means such as a communication message received wirelessly indicating that a payment has been made for the parking meter 100. Such other payment means may allow payment to be made in various alternative ways such as using a cell phone.

The payment means may further comprise a contactless type payment method, such as a radio frequency identification (RFID) type card, near-field communications (NFC) devices, or other cards adhering to the international standard for contactless cards ISO14443.

Previous single space parking meters have included a contactless type payment method using a contactless payment reader. However, there were disadvantages associated with the placement of contactless payment readers within previous single space parking meters, including the difficulty in providing adequate space to place a contactless payment reader and instructions to a user, while still offering other payment means. The parking meter mechanism 130 includes a contactless payment reader (not shown) located directly behind the display 142, which allows for payment by way of a contactless payment device (not shown). The display 142 is located close enough to the exterior of the parking meter 100 such that the contactless payment reader is able to read contactless payment devices placed over the display 142. The maximum read distance between the contactless payment device and the contactless payment reader is typically a function of the size of the antenna (not shown) of the contactless payment reader, the presence of any material, and its nature if present, between the contactless payment reader and the contactless payment device, and other operating conditions of the parking meter 100. A high percentage success rate for reading of contactless payment devices by the contactless payment reader through the display 142 can be accomplished even with a double layer of a clear protective cover placed over the display 142. Since the contactless payment reader is placed behind the display 142, which is significantly more transparent to the wireless signals used by the contactless payment reader than housing components of the parking meter 100, which are typically made of metal, no additional openings or apertures need to be included in the housing components to provide adequate operation of the contactless payment reader. Thus, by placing the contactless payment reader behind the display 142, it is possible to provide housing components that provide greater security and environmental protection. When making payment using the contactless payment reader, the display 142 may be used to display a logo, graphic and/or directions such as "tap here".

By placing the contactless payment reader (not shown) behind the display 142, the amount of space required to offer this method of payment is reduced, as the need of an additional opening or aperture in the housing components is eliminated. In addition, the display 142 and possible protective covering of the display 142 provide protection and ruggedness so as to allow the contactless payment reader to be deployed in unattended single space parking meters without the need for additional protection. Additionally, by placing the contactless payment reader behind the display 142, the physical packaging of the parking meter mechanism 130 may be reduced to provide more freedom in the design of the parking meter 100, possibly allowing a smaller more appealing single space parking meter, which may be desirable given the large number of single space parking meters that may be present on a single street or block.

Figure 6:
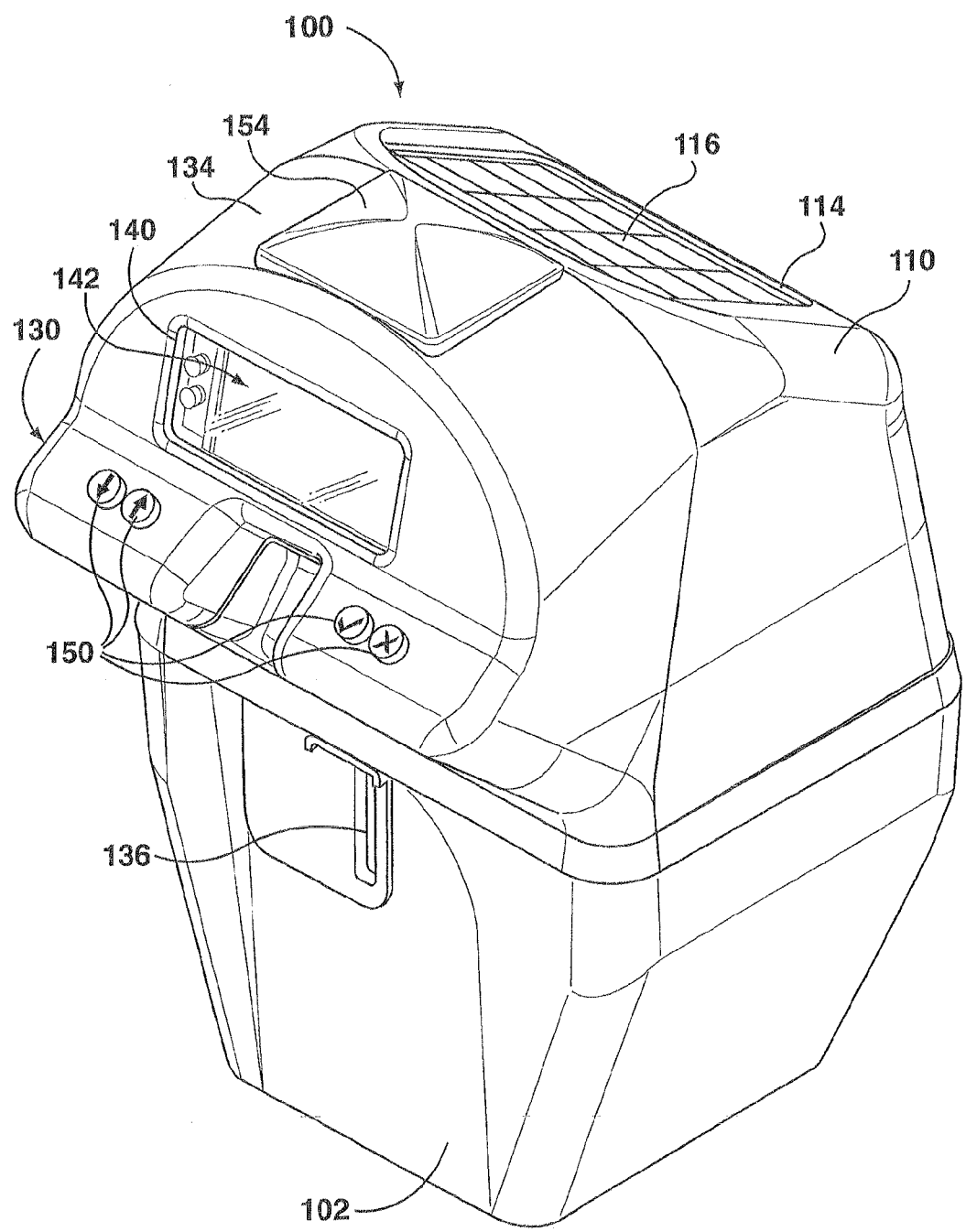
FIG. 6 is an upper front perspective of the parking meter of FIG. 1 assembled.
Figure 7:
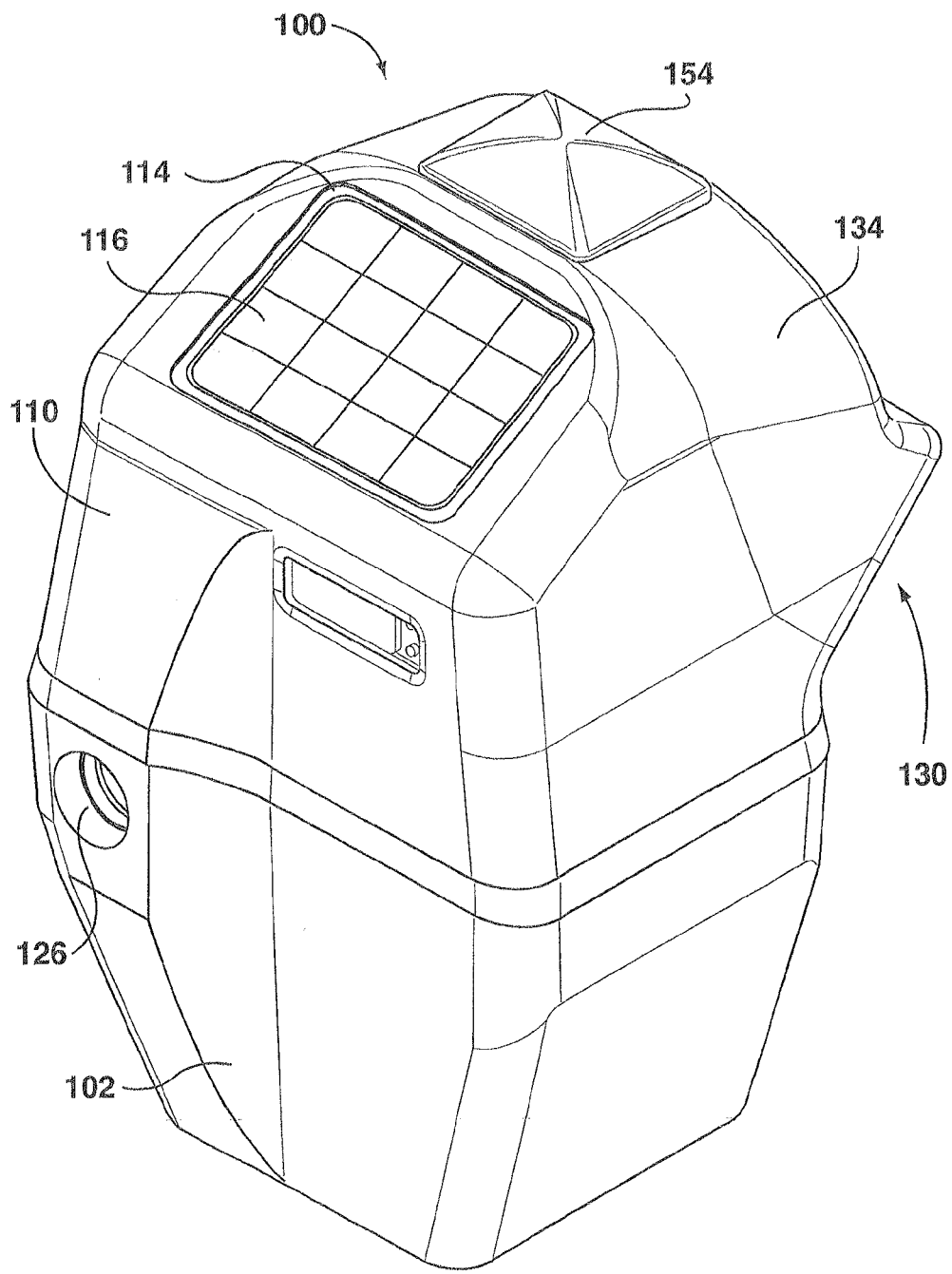
FIG. 7 is an upper rear perspective of the parking meter of FIG. 1 assembled.
Figure 8:
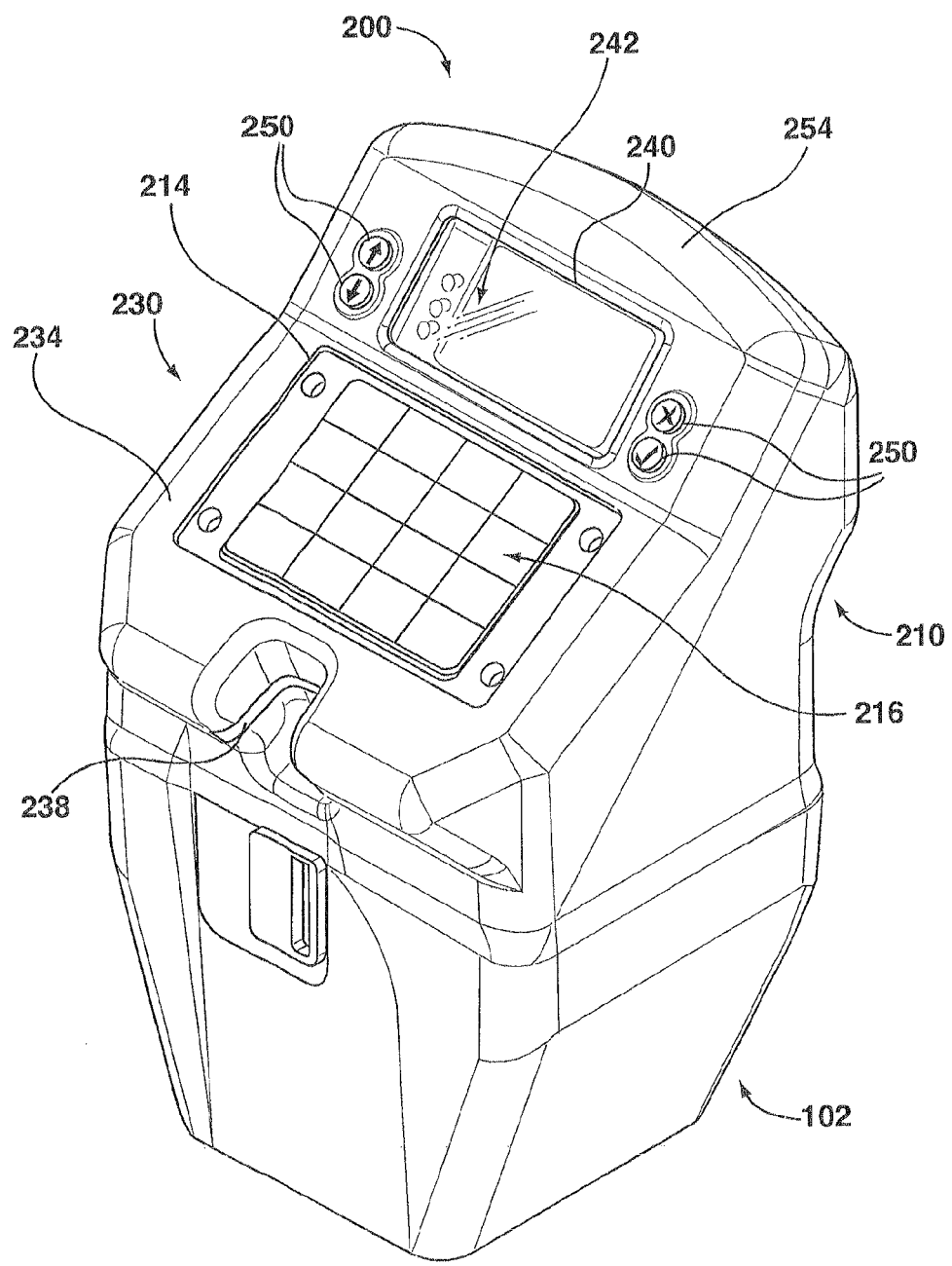
FIG. 8 is an upper front perspective of an assembled further parking meter.
Figure 9:
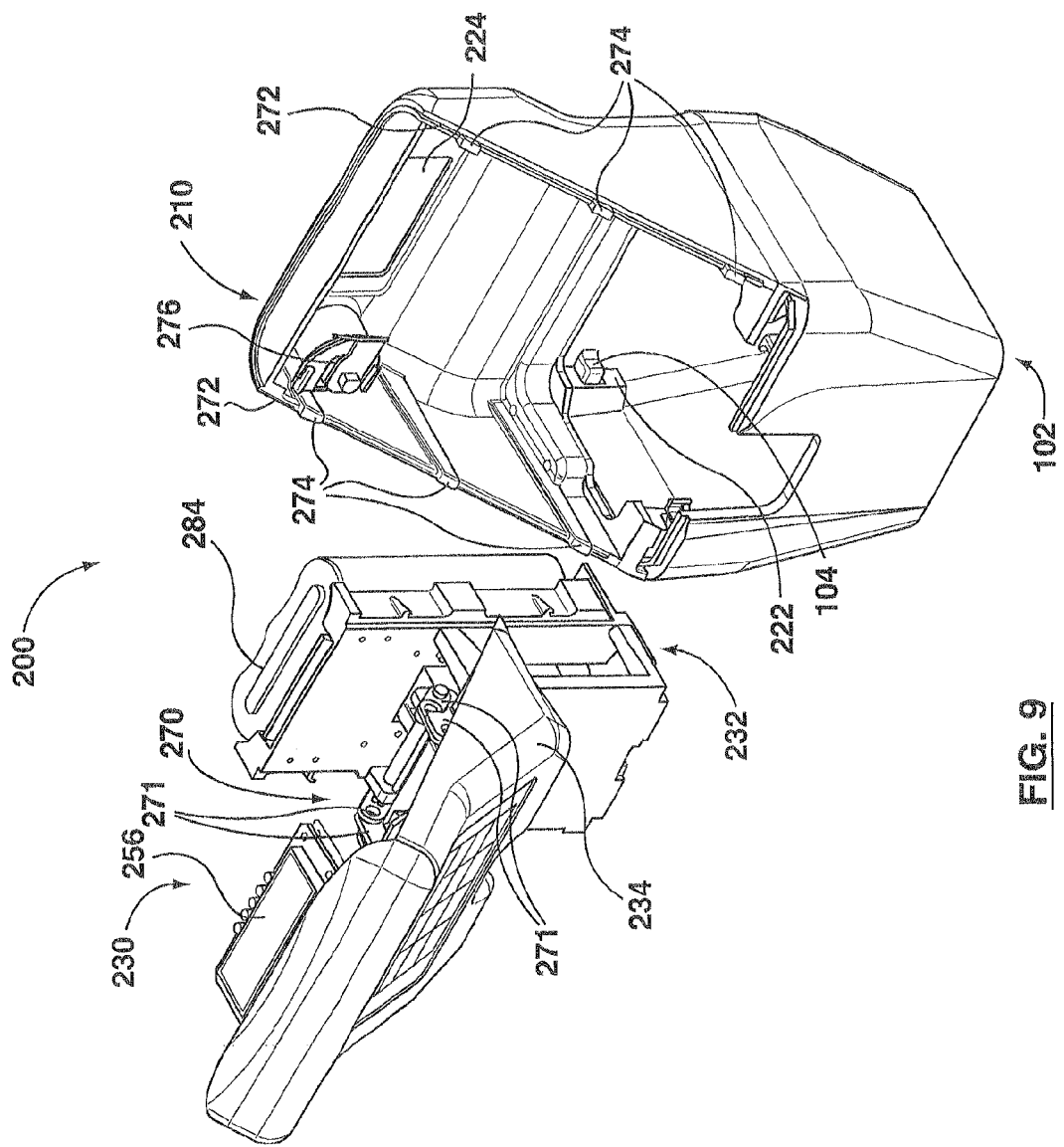
FIG. 9 is an upper front perspective of components of the parking meter of FIG. 8.
Figure 10:
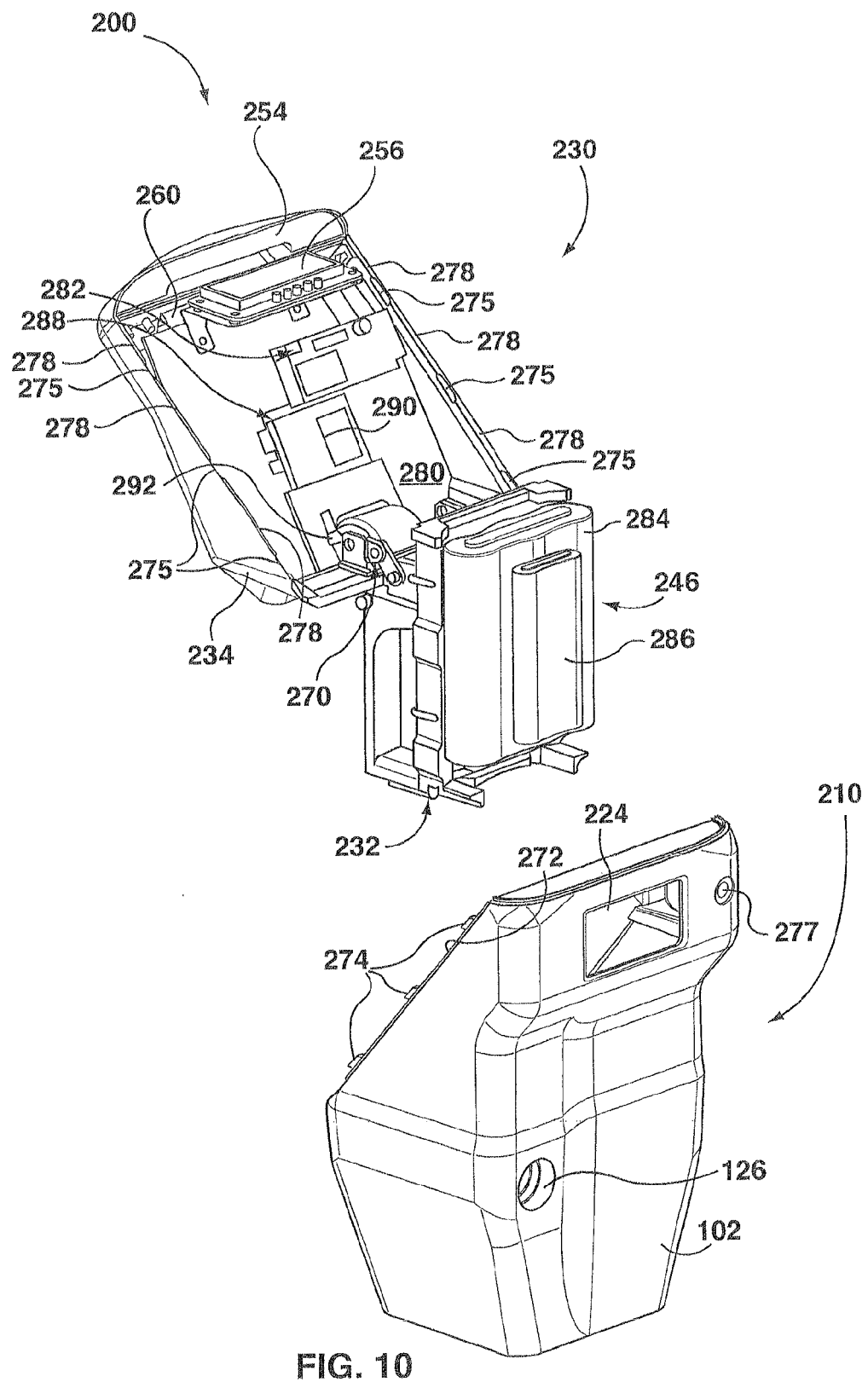
FIG. 10 is an upper rear perspective of components of the parking meter of FIG. 8.
Figure 11:
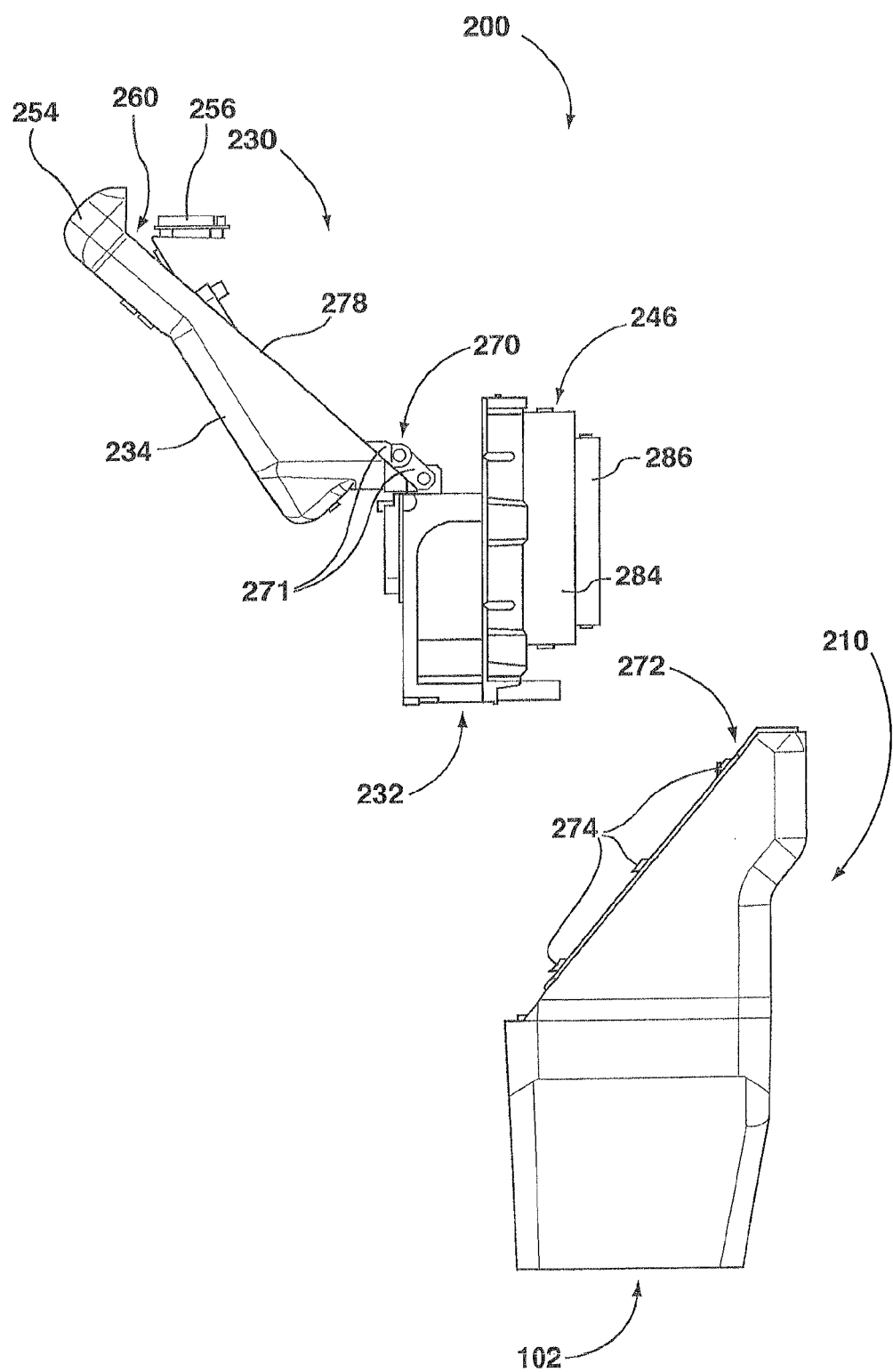
FIG. 11 is a side view of components of the parking meter of FIG. 8.

The protective external surface of the front housing 134, which will be exposed to the environment and the public, may be connected to the internal structure 132 in various ways. For example, the front housing 134 may be bolted, screwed or welded to the internal structure 132. If the front housing 134 is bolted or screwed to the internal structure 132, it is desirable to have the bolts or screws accessible only when the parking meter mechanism 130 is not in the fully assembled position as is shown in FIGS. 6 and 7. If the bolts or screws connecting the front housing 134 to the internal structure 132 are accessible from the exterior of the parking meter 100, it is desirable to make the driver pattern an uncommon pattern so that they cannot readily be loosened by an unauthorized person. The front housing 134 may be connected to the internal structure 132 in additional or alternative ways, such as welding, gluing, cementing, riveting, or other connecting techniques. Alternatively, the front housing 134 may be connected to the internal structure 132 during the fabrication stage of the components, such as by casting a single component.

The front housing 134 that is connected to the internal structure 132 includes a display opening 140 that is arranged to allow a user to view the display 142 when the parking meter 100 is in use, and make payment using contactless payment devices. The display opening 140 may be provided with a transparent, or semi transparent, protective display covering (not shown) such as Lexan™ or similar material. If the display 142 itself provides sufficient strength to resist vandalism, the protective display covering may not be required.

By connecting the front housing 134 to the internal structure 132 so that they are removable as a single parking meter mechanism 130, less constraints may be placed on the size and shape of the front housing 134. The tolerances required between components of the parking meter mechanism 130 and the front housing 134 can be reduced. No clearance needs to be provided between the components of the parking meter mechanism 130 and the front housing 134, since there may be no relative movement between the front housing 134 and the components of the parking meter mechanism 130.

If the parking meter mechanism 130 includes a card payment component (not shown), the front housing 134 may include a card slot 138 to receive the payment card, such as a credit card, debit card, chip card or other type of payment card such as an electronic purse card, and allow the payment card to come into contact with a card payment component.

Depending on the type of interface provided by the parking meter mechanism 130, it may be necessary to provide one or more input controls 150. The input controls 150 are depicted as mechanical buttons for increasing or decreasing the amount of time purchased as well as authorizing or canceling the transaction, such as authorizing or canceling a credit card payment. It will be appreciated that the input controls 150 may be used for additional functions, such as selecting options during configuration of the parking meter mechanism 130, or selecting which parking space payment is being made for. It will be appreciated that the input controls 150 may comprise a variety of switch types such as simple electromechanical switches, piezoelectric switches or capacitive touch switches that have no moving parts.

If the parking meter mechanism 130 includes the ability to communicate wirelessly, an antenna (not shown) located under an antenna cover 154 is required to transmit and receive information. The size and type of antenna will depend on the intended use, the required communication distance, the frequency and/or the wireless network chosen, for example using either licensed cellular radio modems or unlicensed radio modems operating in the industrial scientific medical (ISM) bands. Regardless of the wireless network chosen, it is desirable, from a transmission/reception point of view, to have the antenna located above the front housing 134, as well as any other housing components such as the back housing 110 or lower housing 102. The housing components 102, 110, 134 are typically made of metal and attenuate the radio signals transmitted or received by the antenna. Additionally, by locating the antenna above the front housing, the housing components may shield the components of the parking meter mechanism 130 from the transmitted radio signals, which may reduce the amount of electromagnetic shielding required for components of the parking meter mechanism 130 such as a radio module. By placing the antenna external to the housing components, which provides electromagnetic shielding, spurious emissions may be reduced. In previous parking meters 700, which used a cover cap 705 that included a semi-circular opening 709, the placement of the antenna (not shown) on a top surface of the exterior of the parking meter 700 was not ideal since it was subject to vandalism. Furthermore, if the antenna was attached to the cover cap 705, the antenna would then need to be detached from the parking meter mechanism when removing the cover cap 705, or alternatively, the antenna would need to be detached from the cover cap 705, when removing the parking meter mechanism.

The parking meter mechanism 130 has a front housing 134 that is connected to an internal structure 132 of the parking meter mechanism 130. As such, it is not necessary to detach the front housing 134 in order to remove the parking meter mechanism 130 from the lower housing 102. As a result, it is possible to place the antenna (not shown) in a desirable location, from a transmission/reception point of view, on a top surface of the parking meter 100, without making removal or replacement of the parking meter mechanism 130 more difficult. By placing the antenna above the housing components 102, 110, 134 of the parking meter 100, the antenna may transmit and/or receive radio signals equally well from all directions. Furthermore, since the antenna does not need to transmit radio signals through the housing components 102, 110, 134 of the parking meter, it may be possible to transmit and receive radio signals the same distance using less power, or alternatively transmit and receive radio signals a greater distance using the same power.

The antenna (not shown) may be mounted on the exterior of the front housing 134 and may only require a small opening in the front housing 134 to pass a wire through for coupling the antenna to the radio module (not shown). The antenna and any opening in the front housing 134 for the antenna, or connections between the antenna and radio module, may be covered by an antenna cover 154. Mounting the antenna in this manner minimizes or reduces the need for additional protection from vandalism. Even if an antenna cover 154 is compromised, the front housing 134 remains substantially intact. The antenna cover 154 may comprise a hard plastic material that is transparent, or semi transparent to radio signals, so that the radio signals transmitted and received by the antenna are not greatly attenuated. The antenna cover 154 may snap onto the front housing 134 using one or more tabs (not shown) cooperating with corresponding slots (not shown) in the front housing 134. An antenna placed in such a manner will have no metal obstacles, allowing it to send or receive radio signals in or from any direction.

The parking meter mechanism 130 is at least partially received within the lower housing 102. The lower housing 102 is typically secured to a coin vault (not shown) secured to a post (not shown). A back housing 110 engages with the lower housing 102 in order to secure the parking meter mechanism 130 at least partially within the lower housing 102.

The back housing 110 may comprise one or more securing points 122 that interact with one or more corresponding securing points 104 and/or moveable securing point 106 located on the lower housing 102. The moveable securing point 106 may move between a locked position and an unlocked position. In the locked position the moveable securing point 106 and the corresponding securing points 104 of the lower housing 102 engage with securing points 122 of the back housing 110 to lock the back housing in position.

In the unlocked position, the moveable securing point 106 does not engage the securing points 122 on the back housing 110. The back housing 110 is able to be moved relative to the lower housing 102 (see gap 167 of FIG. 5) such that the corresponding securing points 104 also do not engage the securing points 122 on the back housing 110, allowing the back housing 110 to be removed from the lower housing 102.

A lock (not shown) can be received within a lock retaining opening 126 in the lower housing 102 so that the moveable securing point 106 may be operated, and locked in position.

In addition to the securing points 122 that interact with the corresponding securing points 104 and moveable securing point 106 of the lower housing 102, the back housing 110 may also comprise one or more engagement points or surfaces (not shown) for engaging with corresponding points or surfaces (not shown) of the parking meter mechanism 130 and further securing the parking meter mechanism 130 within the lower housing 102.

The back housing 110 may have an auxiliary display opening 124 for allowing an auxiliary display 156 to be visible from the exterior of the parking meter 100. The auxiliary display 156 may provide an additional display of information, such as if the parking time purchased has expired, the parking meter 100 is out of service, or if parking is not allowed at that time.

The back housing 110 may include a solar panel compartment 114. The solar panel compartment 114 has a substantially intact bottom surface (not shown) to which a solar panel 116 may be mounted. A clear solar panel cover (not shown) may be provided over the solar panel 116 and solar panel compartment 114 to both secure and to provide further protection to the solar panel 116 if required.

Previous removable parking meter mechanisms have typically been provided with a solar panel on the parking meter mechanism, if at all. An opening in the protective housing of these previous parking meters was required to allow light to contact the solar panel of the parking meter mechanism. Such an arrangement requires a large opening to be provided in the protective housing of the parking meter, which may reduce the protection from the environment, vandalism, tampering or theft provided by the protective housing.

The solar panel compartment 114 of the back housing 110 has a substantially intact bottom surface (not shown), such that even if the solar panel cover (if present) is compromised, as well as the solar panel 116, the back housing 110 is not compromised and can still prevent vandalism or tampering to the parking meter mechanism 130.

An opening may be provided in the substantially intact bottom surface of the solar panel compartment 114 to allow an electrical connection to be made between the solar panel 116 and the parking meter mechanism 130. The electrical connection may be made by, for example, a wire connected to the solar panel 116, passing through the opening in the solar panel compartment 114 that can be connected to, or disconnected from, the parking meter mechanism 130 as required. Alternatively, electrical contacts, such as spring loaded contacts, may be provided on the interior side of the back housing 110 that are electrically connected to the solar panel 116. The electrical contacts may make an electrical connection with corresponding electrical contacts of the parking meter mechanism 130 when the back housing 110 is engaged with the parking meter mechanism 130 and the lower housing 102.

With the solar panel 116 in the solar panel compartment 114 of the back housing 110, it is possible to quickly and easily replace the solar panel 116 of a parking meter 100 by simply substituting a new back housing 110. As such, a solar panel 116 that is not performing satisfactorily, whether due to age of the solar panel 116, or vandalism, such as spray paint on the solar panel 116 or solar panel cover (not shown), can be quickly replaced without the need to remove and/or replace the parking meter mechanism 130.

Various features of a removable parking meter mechanism 130 and an external protective housing provided by housing components 102, 110, 134 have been described above. It will be appreciated that the description has been made with regards to specific embodiments. The described features may be readily adapted from the specific embodiments described to a plurality of other parking meters. Furthermore, individual features of the parking meter 100 described above may be incorporated into different parking meters, either individually or in combination with other features.

The above has described the parking meter 100 as having a back housing 110 that slides laterally to engage securing points 122 with corresponding securing points 104 and moveable securing point 106 in order to secure the parking meter mechanism 130 within the parking meter 100. It is possible to secure the parking meter mechanism 130, at least partially within the lower housing 102, using other approaches.

FIGS. 8-14 depict a further embodiment of a single space parking meter. The parking meter 200 includes a front housing 234 that is hingedly connected to an internal structure 232 of the removable parking meter mechanism 230 via a linkage, or plurality of linkages, 270. Each linkage 270 may comprise two linkage arms 271 pivotally connected together, with each linkage arm 271 pivotally connected to a respective one of the front housing 234 and the internal structure 232. The hinged connection of the front housing 234 allows the front housing 234 to be swung forward relative to the back housing 210. The linkage 270 further allows the front housing 234 to slide up and down sloped side surfaces 272 of the back housing 210. This embodiment may allow components of the parking meter mechanism 230 to be mounted to or affixed to the interior of the front housing 234, which makes electrical connections between components of the parking meter mechanism 230 easier and less prone to wear and tear since there is no relative movement between components of the parking meter mechanism 230 mounted to the interior surface of the front housing 234. Further the servicing of components of the parking meter mechanism 230 may be easier, as they are accessible when the front housing 234 is hinged forward.

The components of the removable parking meter mechanism 230 may include, in addition to the internal structure 232, a display 242 mounted to an interior surface of the front housing 234. By mounting the display 242 directly to the front housing 234, it is possible to have a smaller display opening 240 in the front housing 234. Since the display 242 is not set back from the display opening 240, as may be the case when a protective housing must move over a display as in previous parking meters where a display is attached directly to a parking meter mechanism, it is not necessary to enlarge the display opening 240 in order to provide adequate visibility from different angles. A contactless card reader or simply a contactless payment antenna 260 for the contactless card reader may be mounted behind the display 242. The contactless payment antenna 260 may comprise a copper trace formed on a printed circuit board that can be mounted on the back side of the display 242. The contactless payment antenna 260 may be connected to a contactless payment reader module (not shown). A main control board 280 may be mounted to the internal surface of the front housing 234, which forms part of the internal structure 232 of the parking meter mechanism 230. The main control board 280 may include a control component, or control components (not shown), for controlling overall operation of the parking meter 200. For example, the control components may include a processor and memory, as well as additional circuitry required for operating the processor and memory, such as a timing clock.

Mounted to the back side, that is the side away from the front housing 234, of the main control board 280 is a card payment component 288 which may include a chip card reader 290 and/or a magnetic stripe card reader 292. The card payment component 288 is mounted so that a payment card placed into the card slot 238 will make the appropriate connection for reading the payment card. An auxiliary display 256, which may be visible through an auxiliary display opening 224 in the back housing 210, may be mounted to the main control board 280 or the front housing 234.

In order to allow movement of the front housing 234 required for engaging the front housing 234 to the back housing 210 the mounting of the auxiliary display 256 may be biased by a spring or resilient member so that it may be compressed towards the front housing 234 while closing the front housing 234, and may be biased forward to fit snugly against the auxiliary display opening 224 when the front housing 234 is secured to the back housing 210. An antenna (not shown) may be mounted within an antenna cover 254 that is mounted on a top side of the front housing 234. The antenna may be connected via a wire to a radio module 282. The antenna mounted in the antenna cover 254 is located above a substantially intact surface of the protective housing which is created when the front housing 234 is secured to the back housing 210. Locating the antenna above this substantially intact surface has advantages for transmission and reception of radio signals, as previously described. Furthermore, the substantially intact surface provides electromagnetic shielding for the components of the parking meter mechanism 230, which can reduce the amount of radiated spurious emissions introduced into the radio module 282, improving quality and strength of the transmitting and receiving of radio signals. A power source 246 such as a main battery pack 284 and/or a rechargeable battery pack 286 may be mounted to the internal structure 232 where it is partially received inside the lower housing 102.

By allowing the front housing 234 to hinge forward with at least some of the attached components of the parking meter mechanism 230, the service and maintenance of the parking meter 200 may be greatly simplified as access to the components of the parking meter mechanism 230 is simplified. For example, when the front housing 234 is hinged forward along with at least some of the attached components of the parking meter mechanism 230, easy access to the coin chute may be provided for inspecting for coins jammed in the coin chute. Similarly, with the parking meter mechanism 230 partially received within the lower housing 102 and the front housing 234 pivoted forward relative to the back housing 210, it is possible to have unobstructed access to most common components of the parking meter mechanism 230 requiring servicing or replacement, including for example, replacement of the power source 246, and/or servicing or replacement of the chip card reader 290 or a magnetic stripe card reader 292.

Furthermore, by allowing the front housing 234 to hinge forward thus exposing the components of the parking meter mechanism 230, service and maintenance of the parking meter mechanism 230 is possible without necessarily removing the parking meter mechanism 230 from the lower housing 102. Previous removable parking meter mechanisms typically had to be completely removed from a lower housing to perform any servicing, which was made more difficult due to having to hold the parking meter mechanism. In some cases the removed parking meter mechanism had to be placed on a hanger or other surface. Such removal of the parking meter mechanism is more time consuming and increases the risk of damaging the parking meter mechanism. For example, someone servicing and handling a previous parking meter mechanism could damage it by dropping it or otherwise mishandling it. Furthermore, handling of previous parking meter mechanisms could damage delicate display or solar panels located on the parking meter mechanism. Typically, in previous parking meter mechanisms, these delicate components had no protection further than the protective housing, which had to be removed to access the parking meter mechanism. As such, any careless or improper handling of previous parking meter mechanisms could damage these components. In contrast, the removable parking meter mechanism 230 may reduce the likelihood of damage by reducing the need to remove the parking meter mechanism 230 from the lower housing 102. Further, the removable parking meter mechanism 230 includes the front housing 234, which provides protection to other components of the parking meter mechanism 230 from damage even when the parking meter mechanism 230 is removed from the lower housing 102.

The parking meter 200 further comprises a solar panel 216 on the front housing 234. The solar panel 216 may be mounted in a solar panel compartment 214 on an external surface of the front housing 234. As depicted, the solar panel compartment 214 may be located below the display 242. Although not visible in the figures, the solar panel compartment 214 has a substantially intact bottom surface that provides additional strength and protection against vandalism. The solar panel compartment 214 may have a small cutout (not shown) provided in the substantially intact bottom surface in order to allow an electrical connection to be made between the solar panel compartment 214 and other components of the parking meter mechanism 230, such as a solar harvesting control module (not shown) responsible for recharging the rechargeable battery pack 286. Additionally the cutout may be sized to allow small circuitry associated with the solar panel 216, such as temperature compensation diodes, to be located on the back of the solar panel 216 while still allowing the solar panel 216 to lie flat in the solar panel compartment 214.

Locating the solar panel compartment 214 below the display 242 may provide some advantage with respect to orienting the solar panel 216 in a location that is likely to be in sunlight. Parking meters may be placed against other objects such as building walls, post boxes, or utility and light poles. If a solar panel is located on the back of the parking meter in such an installation it is less likely to receive any light. Since the display of the parking meter will always be accessible because a user must be able to interact with the parking meter, locating the solar panel 216 on the front side of the parking meter 200 may increase the likelihood that the solar panel 216 will receive light. Furthermore, with previous 'symmetric' designs, that is parking meters having a side profile that is somewhat symmetric, it is often difficult for a user to quickly identify the front, that is, the side of the parking meter with the display and input controls, of the parking meter. By including the solar panel 216 on the front of the parking meter 200 along with the display 242 and input controls 250, a more asymmetric profile may be provided making use of the parking meter 200 easier and more intuitive. In addition, by including the solar panel 216 on the front housing 234, the parking meter mechanism 230 may be easier to manufacture, assemble and service, since a majority of the components of the parking meter may be located together on the interior surface of the front housing 234 as opposed to in remote and separate locations. Furthermore, having the solar panel compartment 214 and solar panel 216 located on the front housing 234 may make it readily apparent that the parking meter 200 includes a 'green' power source which may be desirable to cities or parking authorities with respect to public relations.

The parking meter 200 further includes an antenna (not shown) that is mounted above the front housing 234 and within a protective antenna cover 254. The protective antenna cover 254 is elongated to substantially the same width as the top of the front housing 234 of the parking meter 200.

In contrast to the embodiment described with reference to FIGS. 1-7, the back housing 210 is first placed in the lower housing 102 and then the parking meter mechanism 230 is placed in the parking meter 200. The front housing 234 of the parking meter mechanism 230 is hingedly attached to the internal structure 232 by the linkage 270. The linkage 270 allows the front housing 234 to pivot towards the back housing 210 when the parking meter mechanism 230 is placed in the lower housing 102. The linkage 270 also allows the front housing 234 to slide against the back housing 210 when the front housing is pivoted to a closed position relative to the back housing 210.

The back housing 210 may have two sloping side surfaces 272 against which the front housing 234 can slide. Each of the sloping side surfaces 272 comprises one or more finger protrusions 274 that engage and capture corresponding rails or grooves 278 machined into corresponding mating surfaces of the front housing 234 when the front housing 234 slides to the bottom of the back housing 210. In order for the finger protrusions 274 to engage the corresponding rails or grooves 278, matching and machined openings 275 are provided in the corresponding rails or grooves 278 to allow the finger protrusions 274 to slide into the corresponding rails or grooves 278. Once the front housing 234 is pivoted to the top of the back housing 210 and slid down the sloping side surfaces 272 of the back housing 210, an upper lock secured in an upper lock opening 277 can actuate an upper locking mechanism, which may be in the form of a locking cam 276 on the back housing 210 can be engaged to secure the front housing 234 to the back housing 210. The finger protrusions 274, which are engaged to the corresponding rails or grooves 278, prevent the front housing 234 from pivoting away from the back housing 210, while a locking cam 276 prevents upward movement of the front housing 234, which also prevents disengagement of the protruding fingers 274 from the corresponding rails or grooves 278.

When assembling the parking meter 200, first the back housing 210 is engaged to the lower housing 102. The back housing 210 may be locked to the lower housing 102. After the back housing 210 is engaged to the lower housing 102, the parking meter mechanism 230 is partially received into the lower housing 102 and the front housing 234 which is hinged to the internal structure 232, is pivoted towards the back housing 210 and against the sloping side surfaces 272 of the back housing 210. In order to engage the front housing 234 and the back housing 210 together, the front housing 234 is positioned along the sloping side surfaces 272 of the back housing 210 such that the finger protrusions 274, placed equidistant along the sloping side surfaces 272 of the back housing 210, can be received within the openings 275 located on the corresponding rails or grooves 278 of the front housing 234. Once the finger protrusions 274 are sitting in the openings 275, the sloping side surfaces 272 of the back housing 210 and the corresponding mating surfaces of the front housing 234 are in line and sitting tight against each other. The front housing 234 is then positioned on, for example by sliding down, the sloping side surfaces 272 of the back housing 210 so that the finger protrusions 274 move out of the openings 275 to capture the corresponding rails or grooves 278 machined into the corresponding mating surfaces of the front housing 234. When the front housing 234 has been moved down the sloping side surfaces 272 as far as the front housing 234 will travel, the finger protrusions 274 of the back housing 210 will tightly mate with the corresponding rails or grooves 278 machined into the corresponding mating surfaces of the front housing 234 and will not allow any appreciable separation of the front housing 234 from the back housing 210. Further up or down movement of the front housing 234 relative to the back housing 210 is stopped by engaging the locking cam 276 on the back housing 210.

Although relative movement between the front housing 234 and the back housing 210 is described as being prevented by the cooperation between the finger protrusions 274 on the back housing 210 and the corresponding rails or grooves 278 machined into the corresponding mating surfaces of the front housing 234, other means may be employed to prevent relative movement between the front housing 234 and the back housing 210 in the parking meter 200 when assembled. For example, the locking cam 276 alone may be sufficient to prevent any significant amount of relative movement between the front housing 234 and the back housing 210 in order to provide a parking meter 200 that is secure from the elements, tampering, vandalism and/or theft.

Figure 12A:
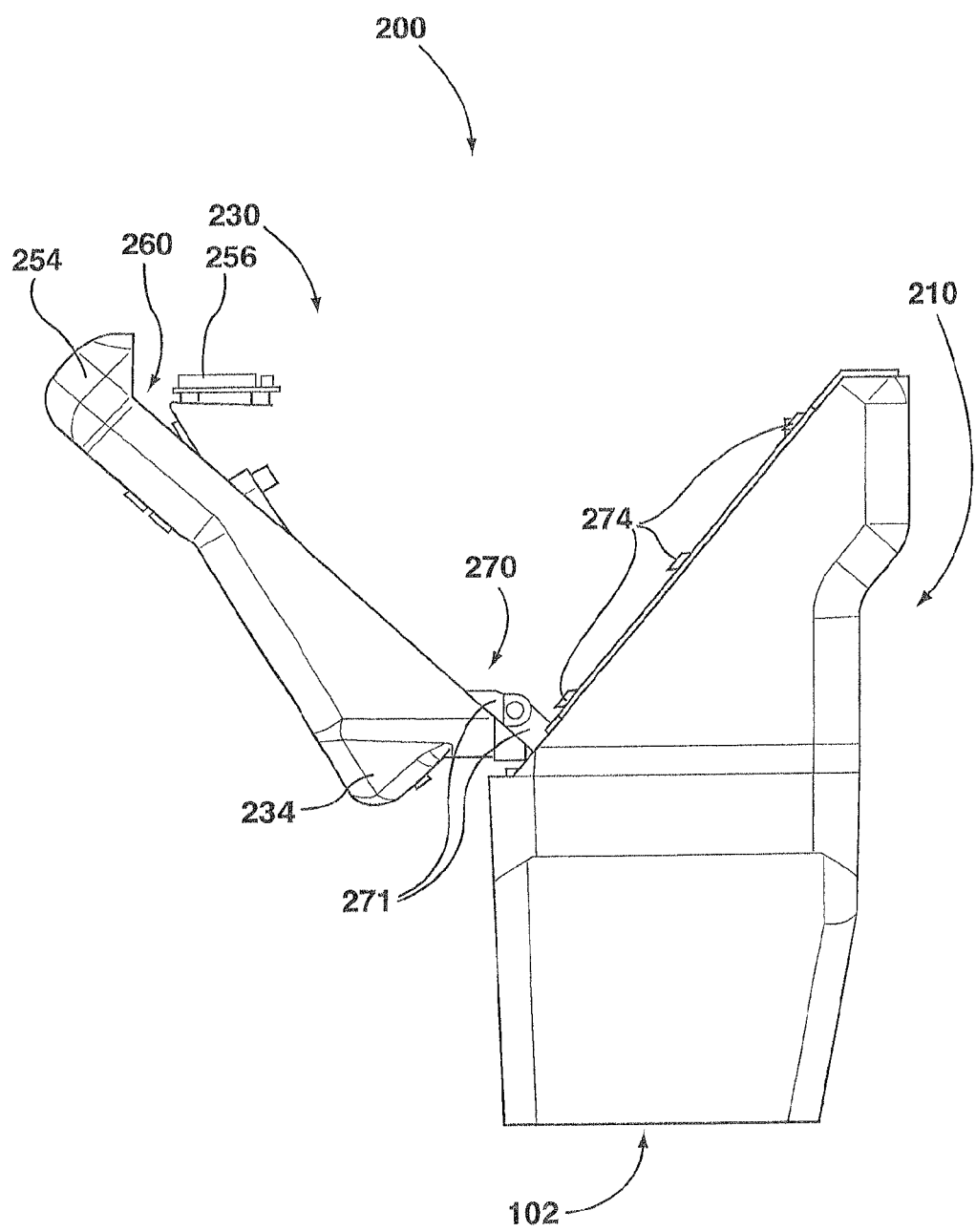
FIG. 12A is a side view of components of the parking meter of FIG. 8 partially assembled.
Figure 12B:
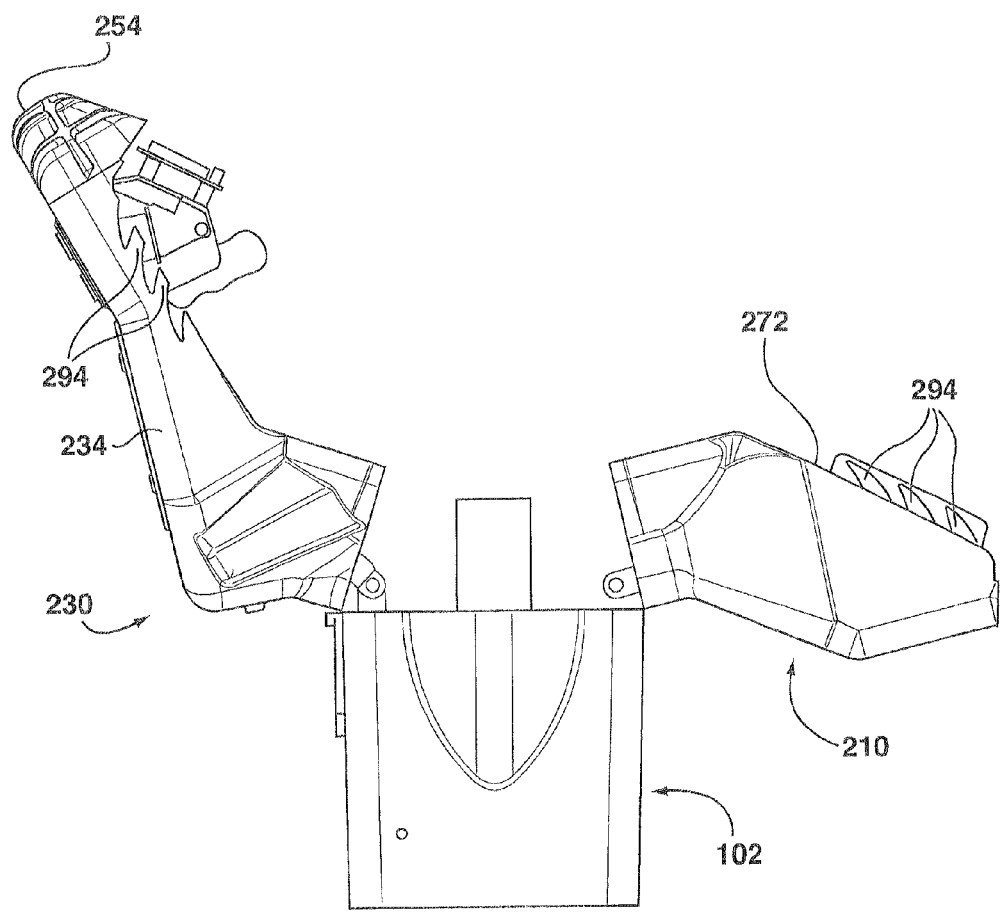
FIG. 12B is a side view of components of a further parking meter partially assembled.
Figure 13:
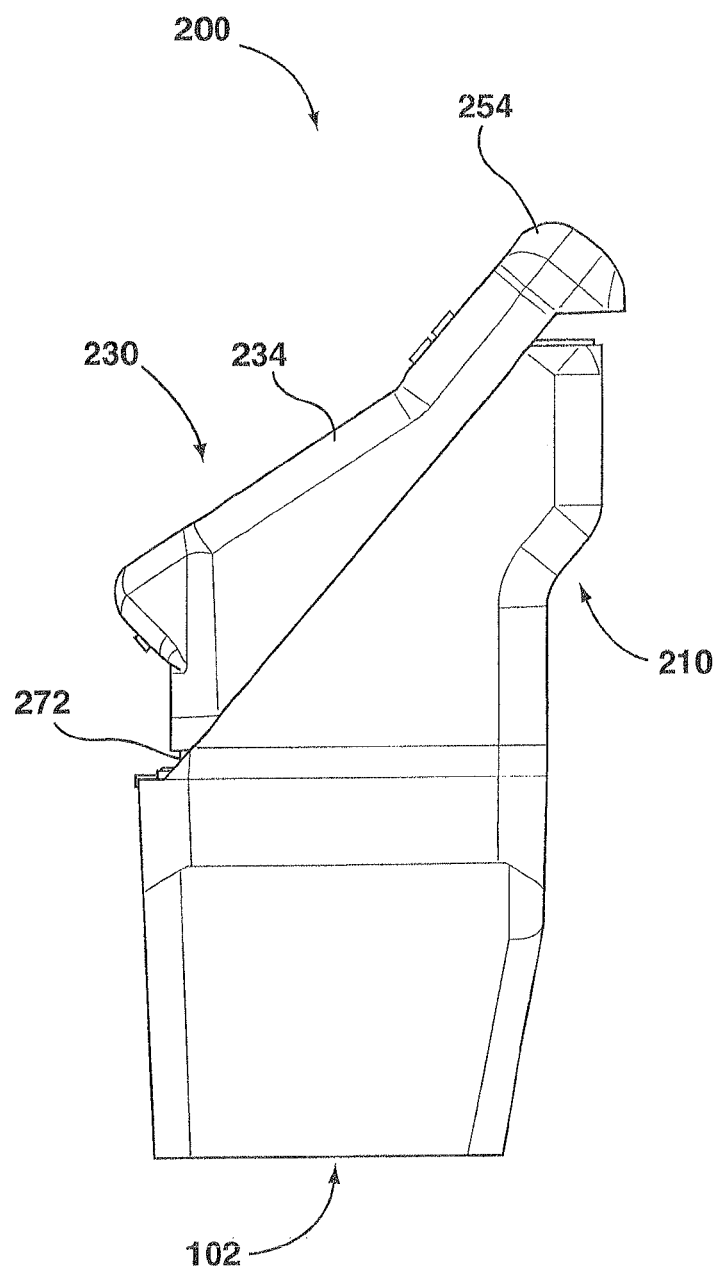
FIG. 13 is a side view of components of the parking meter of FIG. 8 partially assembled.
Figure 14A:
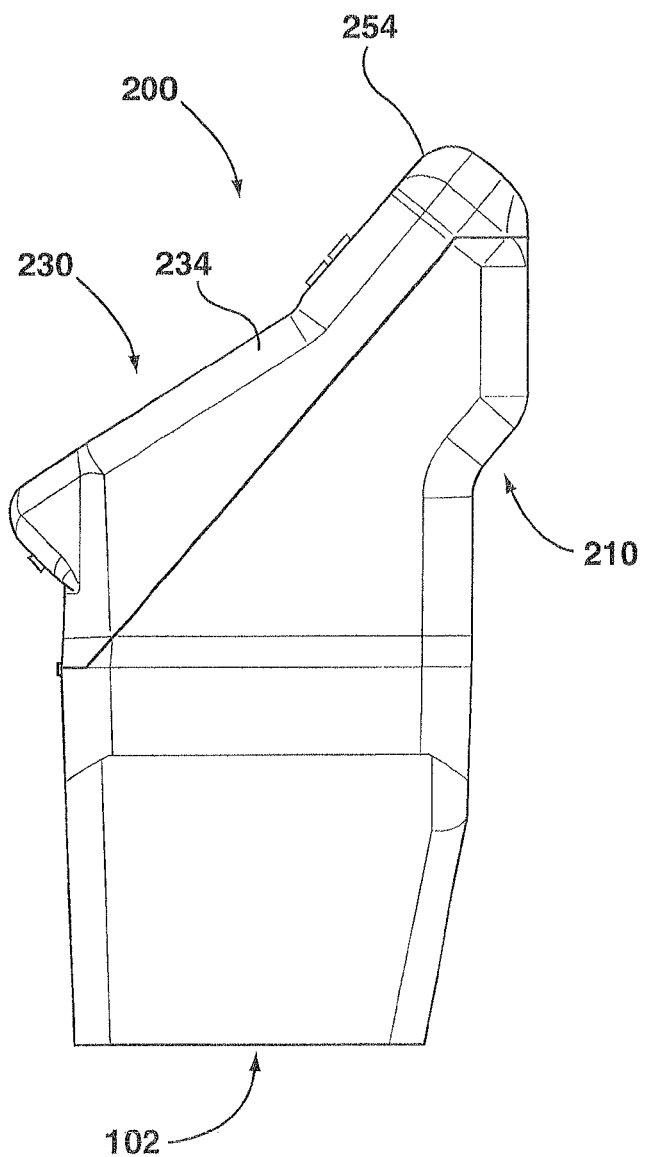
FIG. 14A is a side view of the parking meter of FIG. 8 assembled.
Figure 14B:
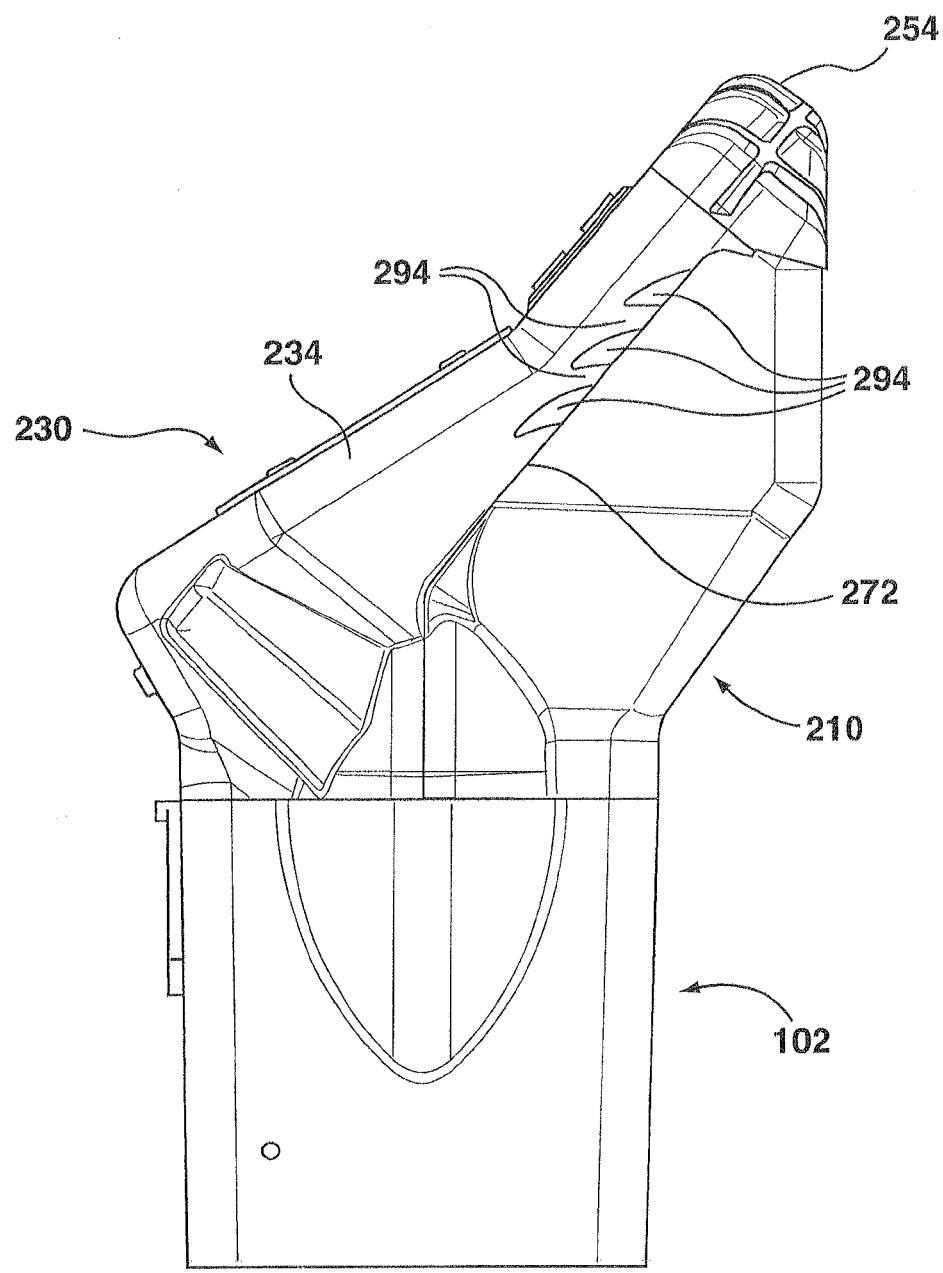
FIG. 14B is a side view of the parking meter of FIG. 12B assembled.

In addition, and with reference to FIGS. 12B and 14B, another example of an alternate means to prevent relative movement between the front housing 234 and the back housing 210 in the parking meter 200 when assembled is the incorporation of interlocking fingers 294 along the sloping side surfaces 272 of the back housing 210 and the corresponding mating surfaces of the front housing 234. The use of interlocking fingers 294 may be advantageous where the above-described approach of using finger protrusions 274 on the sloping side surfaces 272 of the back housing 210, and corresponding rails or grooves 278 machined into corresponding mating surfaces of the front housing 234, is either not possible or not desirable. Examples of where the above approach may not be possible or desirable include where an upper locking mechanism is not available or practical such that only a lower locking mechanism that engages with the back housing 210 is available, where sliding the front housing 234 along or against the sloping side surfaces 272 of the back housing 210 is not available or desirable, and/or where it is preferable for both the front housing 234 and the back housing 210 to each pivot outwards to an open/ unlocked position and inwards to a closed/lockable position. In those examples, the front housing 234, the back housing 210 and the lower housing 102 may be secured to one another first by hingedly or pivotally securing to the lower housing 102 each of the front housing 234 and back housing 210, second by inwardly pivoting the front housing 234 and back housing 210 to a closed position such that when in the closed position their respective interlocking fingers 294 are engaged, and third by engaging the lower locking mechanism, which secures the back housing 210 to the lower housing 102. Because the back housing 210 is locked and secured to the lower housing 102, and the front housing 234 is secured to the back housing 210 as a result of the interlocking fingers 294 when in the closed position, neither the front housing 234 nor the back housing 210 can pivot outwardly, unless the lower locking mechanism is disengaged. When the lower locking mechanism is disengaged, the back housing 210 is released such that the back housing 210 may pivot outwardly to an open position, which disengages the interlocking fingers 294 and allows for the front housing 234 to pivot outwardly. While the above describes placement of the interlocking fingers 294 along the sloping side surfaces 272 of the back housing 210 and the corresponding mating surfaces of the front housing 234, it is alternatively or additionally possible to secure the front housing 234 and the back housing 210 together by placing the interlocking fingers 294 along a top edge or portion of the front housing 234 and a top edge or portion of the back housing 210.

With reference again to the embodiment disclosed in FIGS. 8-12A and 13-14A, the finger protrusions 274 of the back housing 210 and the corresponding rails or grooves 278 in the front housing 234 have been described as being machined or formed into the respective housings. The same cooperation between the finger protrusions 274 and the corresponding rails or grooves 278 can be accomplished with similar finger protrusions being instead located on the front housing 234 and the corresponding rails or grooves instead being machined into the back housing 210. Furthermore, the same cooperation between the finger protrusions 274 and corresponding rails or grooves 278 can be accomplished with similar finger protrusion and corresponding rails or grooves instead being discrete metal parts that have been stamped, formed or machined and which are rigidly attached to the front housing 234 and the back housing 210, precluding the requirement for precision machining to be carried out on the front housing and the back housing. Likewise, the above-described interlocking fingers 294 of FIGS. 12B and 14B may also be discrete metal parts.

Although the front housing 234 has been described as being secured to the back housing 210 through the finger protrusions 274 and/or the locking cam 276, the front housing 234 may be secured to the back housing 210 with a different locking mechanism. For example a pin or protrusion on either the front housing 234 or back housing 210 may be moved into a corresponding opening or securing point in the other housing to prevent the front housing 234 from sliding up or down the back housing 210.

The back housing 210 may be secured to the lower housing 102 using a lower locking mechanism that prevents lateral movement of the back housing 210 relative to the lower housing 102. For example, the lower locking mechanism may comprise a rotatable cam that is rotated upwards and interferes with one or more of the securing points 222 preventing lateral movement of the back housing 210 relative to the lower housing 102.

The parking meter 200 may comprise two separate locking mechanism, an upper locking mechanism in the back housing 210 for securing the front housing 234 and the parking meter mechanism 230 to the back housing 210 and a lower locking mechanism in the lower housing 102 for securing the back housing 210 to the lower housing 102. The two locking mechanisms may be actuated by respective upper and lower locks. Alternatively, a single lock may be used, for example in the lower housing 102, to simultaneously actuate both the upper locking mechanism and the lower locking mechanism. For example, rotating a cam of the lower locking mechanism may cause a locking pin of the upper locking mechanism to protrude up from the back housing 210 and into a corresponding hole in the front housing 234.

As described herein, a front housing, which comprises an external surface, will be exposed to the environment and to the public, is coupled to an internal structure making it an integral part of the removable parking meter mechanism while forming a component of the protective housing. As such, rigid and secure mounting of components of the parking meter mechanism within the removable parking meter mechanism, including mounting of components of the parking meter mechanism to an inside surface of the front housing, is possible.

Figure 15:
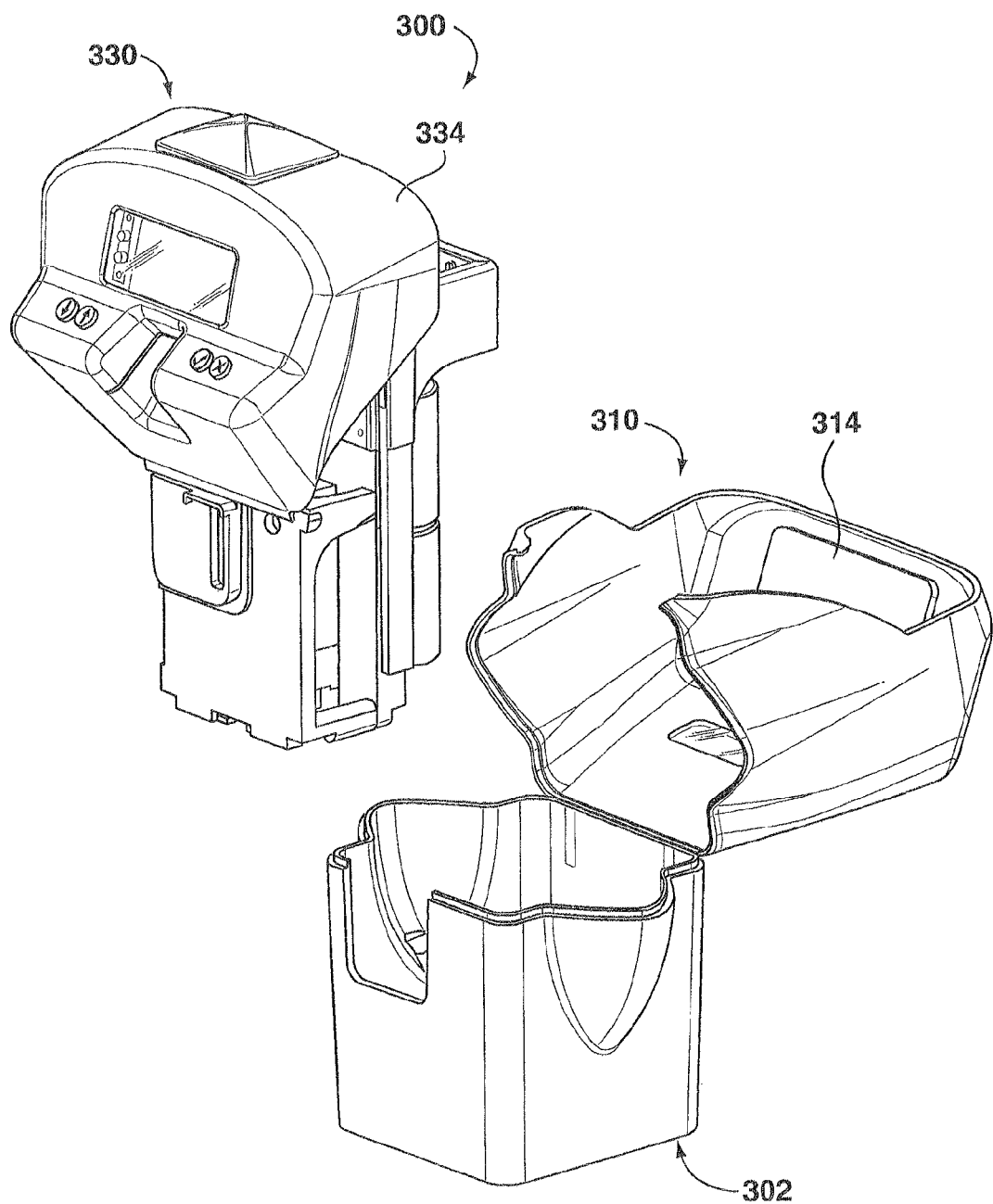
FIG. 15 is an upper front perspective of components of a further parking meter.

FIG. 15 provides an embodiment of a parking meter 300 that comprises a removable parking meter mechanism 330 that can be received into a lower housing 302. The parking meter mechanism 330 is similar to the parking meter mechanism 130 described above with reference to FIGS. 1-7. A lower housing 302, as well as the front housing 334 of the parking meter mechanism 330, may be adapted to allow the back housing 310 to be hingedly connected to the lower housing 302. The back housing 310 may still comprise a solar panel compartment 314; however the securing points 122 on the back housing 110, and the corresponding securing points 104 and the movable securing point 106 on the lower housing 102 as described above with reference to FIGS. 1 to 7 may not be required.

Figure 16:
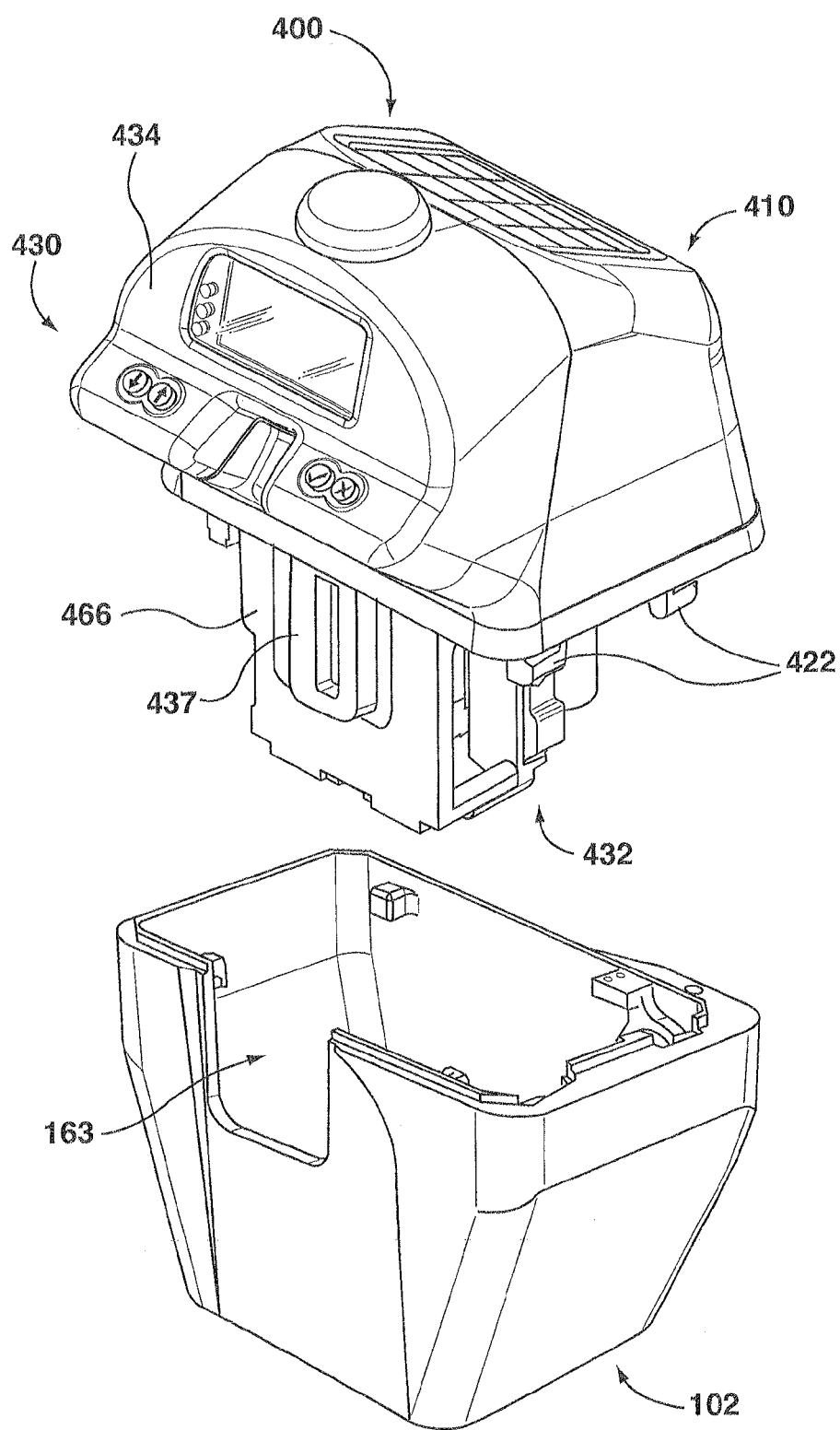
FIG. 16 is an upper front perspective of components of a further parking meter.

As described above with reference to FIGS. 1 to 7, the parking meter mechanism 130 is first placed in the lower housing 102 and then a back housing 110 is locked in place, securing the parking meter mechanism 130 in the lower housing 102. In contrast, FIG. 16 depicts an embodiment of a parking meter 400 having a removable parking meter mechanism 430 with a front housing 434 that is slidably attached to an internal structure 432. In contrast to the parking meter mechanism 130 described above, when placing the parking meter mechanism 430 in the lower housing 102, the back housing 410 is first connected to front housing 434 as depicted. Connecting the back housing 410 to the front housing 434 may provide additional strength to the protective housing of the parking meter 400 since any lateral movement between the front housing 434 and the back housing 410, which is required to secure the back housing 110 in the lower housing 102 in the embodiment described above with reference to FIGS. 1 to 7, is substantially prevented. However, in order to place the parking meter mechanism 430 into the lower housing 102, the front housing 434 and connected back housing 410 must be able to move laterally with respect to a coin slot protrusion 437 forming part of the mechanism cover plate 466 of the internal structure 432. The coin slot protrusion 437 is received in a corresponding opening 163 in the lower housing 102. The coin slot protrusion 437 is sized so that it fits tightly within the corresponding opening 163 in the lower housing 102, and as such lateral movement of the coin slot protrusion 437 is substantially prevented. In order to place the parking meter mechanism 430 in the lower housing 102 and engage the corresponding securing points 104 and the moveable securing point 106 of the lower housing 102, securing points 422 are located on the bottom of the back housing 410. Although securing points 422 could be located on the bottom portion of the front housing 434, or on a combination of the bottoms of the front housing 434 and back housing 410, securing points 422 must be able to move laterally with respect to the corresponding securing points 104 and the moveable securing point 106 of the lower housing 102. By attaching the front housing 434 to internal structure 432 in a manner that allows lateral movement of the front housing 434 relative to the internal structure 432, and in particular to the coin slot protrusion 437, the lateral movement of the securing points 422 is possible, since the back housing 410 is first attached to the front housing 434 that can move laterally.

Various means of attachment of the front housing 434 to the internal structure 432 are possible. For example, a pin or rod may be attached to the internal structure 432, and the front housing 434 may be slidably supported on the pin or rod, through a journaled connection attached to the front housing 434, to thereby allow lateral movement of the front housing 434 on the pin or rod.

Figure 17:
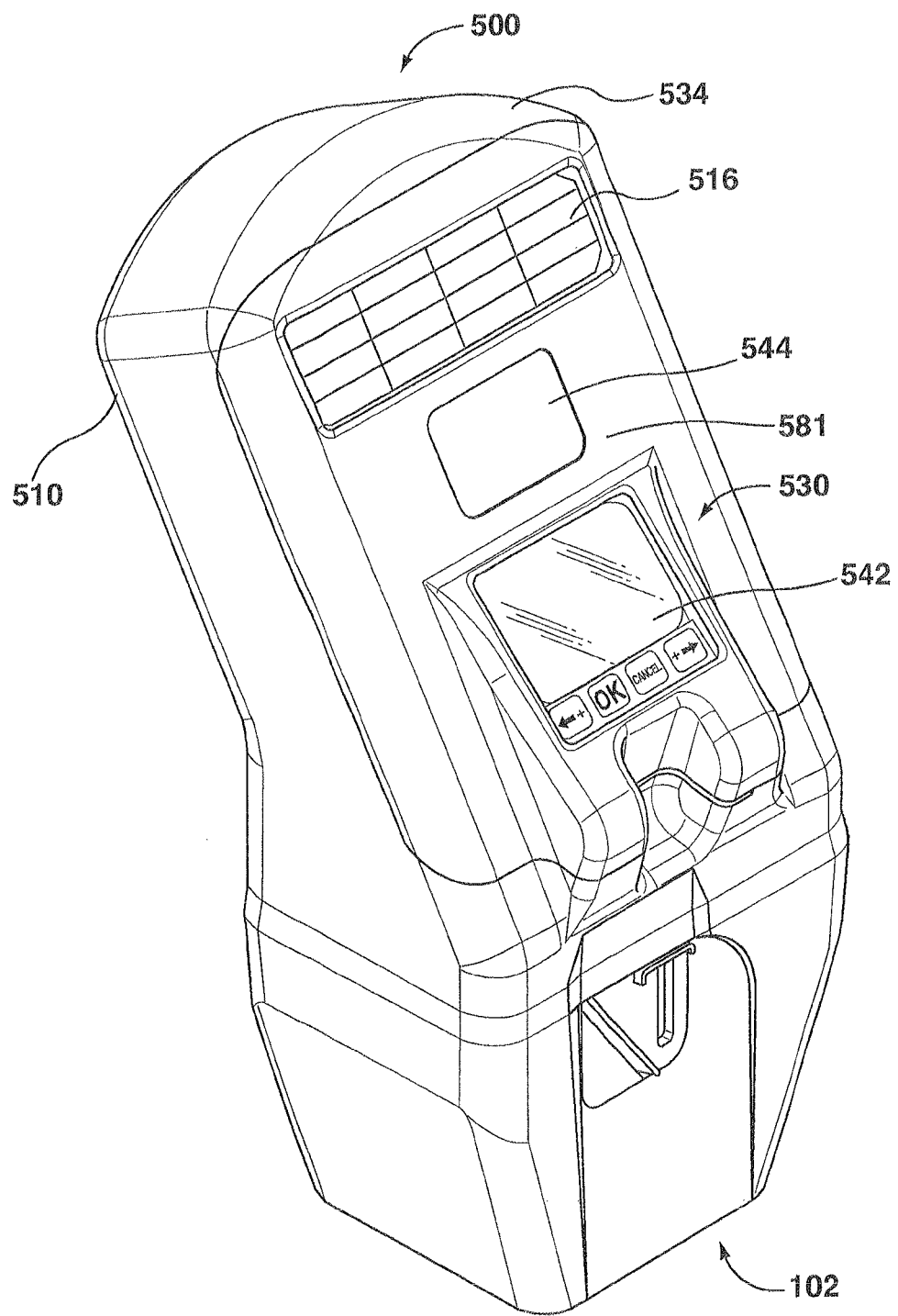
FIG. 17 is an upper front perspective of a further parking meter.

The above has described, with reference to FIGS. 8-14, a parking meter 200 with a solar panel 216 located in a solar compartment 214 on a front housing 234 below a display 242 and a contactless payment reader located behind the display 242. FIG. 17 provides an embodiment of a parking meter 500 with the solar panel 516 located on the front housing 534 and an exterior surface of the contactless payment reader 544 located above the display 542 of the removable parking meter mechanism 530. The front housing 534 is elongated to provide sufficient space for the solar panel 516 and the contactless payment reader 544. The solar panel 516 may be located in a solar panel compartment (not shown) that, similar to the solar panel compartment 114, has a substantially intact bottom surface. In order to provide sufficient operation of the contactless payment reader 544, it may be necessary to provide a large opening in the front housing 534 through which the contactless payment reader can operate. A protective cover may cover the large opening in order to secure the components of the parking meter mechanism 530 from vandalism and the environment. A back housing 510 secures the front housing 534 to the lower housing 102.

Furthermore, although not shown in detail in FIG. 17, the front housing 534 may include a front surface portion 581 that can be hinged to the internal structure (not shown) of the parking meter mechanism 530 in order to allow the front surface portion 581 to hinge forward. The front surface portion 581 may be secured adjacent to the back housing 510 by a locking mechanism (not shown) or other means.

Figure 18:
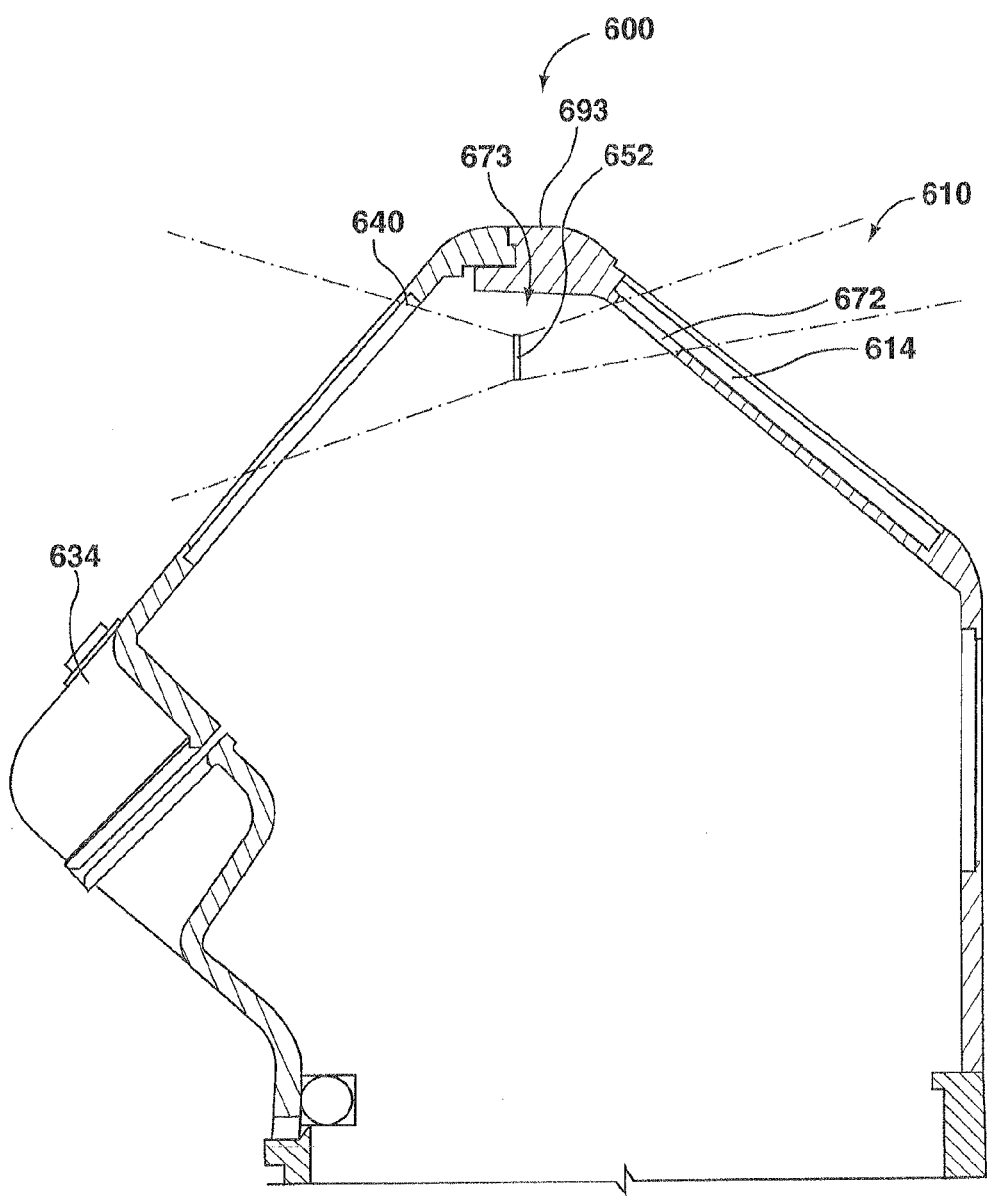
FIG. 18 is a cross section of a further parking meter.
Figure 19:
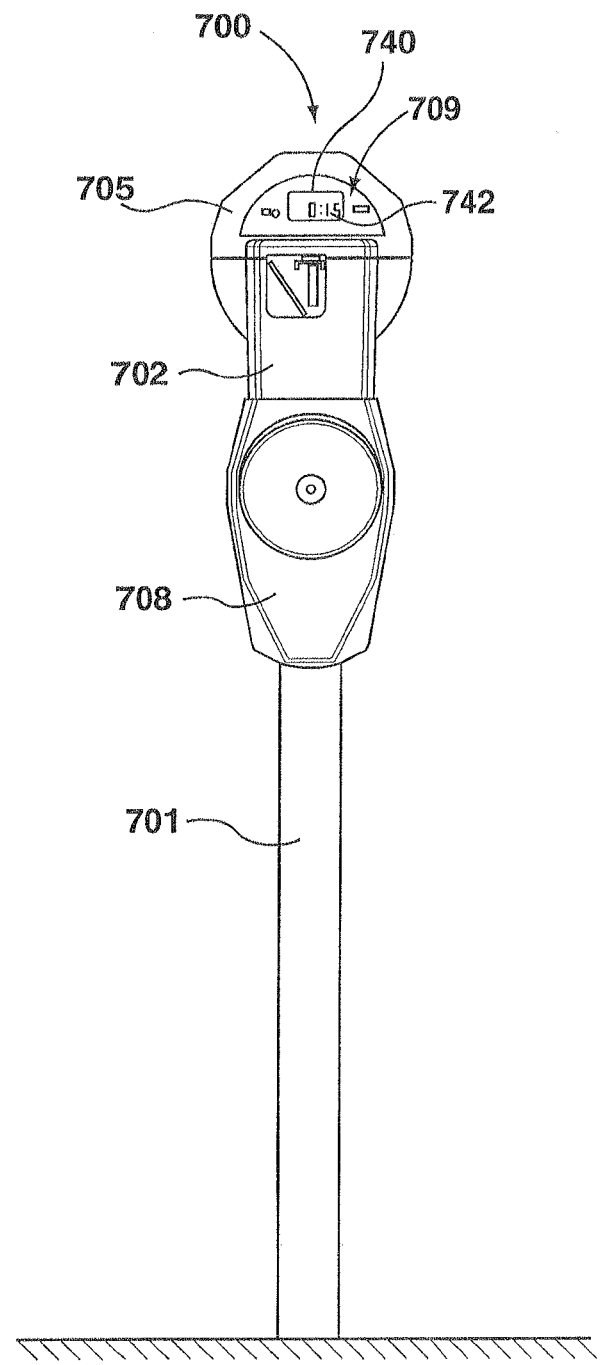
FIG. 19 is a schematic showing an installed previous single space parking meter.

Although the above has described parking meters as having an antenna for communicating mounted above housing component of a parking meter mechanism, it is possible to mount the antenna within the housing components of the parking meter. FIG. 18 provides an embodiment of a parking meter 600 with an internal antenna 652. The front housing 634 and back housing 610 are slopped upwards to form a peaked top 693 that provides an internal hollow space or cavity 673 sufficient in size to allow an internal antenna 652 to be mounted within the cavity 673. The cavity 673 is situated behind and partially above a display opening 640 in the front housing 634, through which a display (not shown) is visible, and is also situated behind and partially above the solar panel compartment 614 of the back housing 610. In order to improve the transmission and reception characteristics of the internal antenna 652, the solar panel compartment 614 is elongated and provided with a transmission opening 672 along the top to provide a passage for radio signals through the back housing 610 and into the cavity 673. The combination of the display opening 640 in the front housing 634 as well as the transmission opening 672 in the solar panel compartment 614 of the back housing 610 allow for the reception and transmission of radio signals to and from the internal antenna 652.

Various embodiments of parking meters and removable parking meter mechanisms have been described that provide various features. The different features and components of the various embodiments may be individually incorporated into parking meters or parking meter mechanisms that do not include all of the described features. For example, the advantages described herein of arranging a solar panel on a front side of the parking meter may be realized without mounting the solar panel in a solar panel compartment having a substantially intact bottom surface. Similarly, the advantages of having a contactless payment reader located behind a display may be realized in a parking meter mechanism having a front housing, or more generally an exterior housing that is not coupled to the parking meter mechanism.

What is claimed is:

1. A single space parking meter comprising:
   a removable single space parking meter mechanism that is at least partially and removably receivable within an existing lower housing, the single space parking meter mechanism comprising:
   a display for displaying parking information;
   a front housing to be exposed to an external environment;
   a contactless payment reader;
   a card slot at or in the front housing for receiving a payment card;
   a coin slot at or in the front housing for receiving coins;
   input controls comprising one or more buttons for interacting with the single space parking meter;
   a rechargeable battery for providing power for operation of the single space parking meter;
   a solar panel for charging the rechargeable battery; and
   a radio for transmitting radio signals from the single space parking meter and receiving radio signals at the single space parking meter wherein the radio signals comprise parking meter payment information;
   a radio antenna for the radio wherein the radio antenna is connected to the radio; and
   a meter housing securable to the lower housing for securing the removable single space parking meter mechanism at least partially within the lower housing.

2. The single space parking meter of claim 1 further comprising an antenna for the contactless payment reader wherein the antenna for the contactless payment reader: comprises copper; is connected to the contactless payment reader; and, is arranged at the display.

3. The single space parking meter of claim 1 further comprising an antenna for the contactless payment reader, wherein the antenna for the contactless payment reader: comprises copper; is connected to the contactless payment reader; and, is arranged directly behind the display.

4. The single space parking meter of claim 1, wherein a logo, graphic or direction for making payment using the contactless payment reader is displayable on the display.

5. The single space parking meter of claim 1, wherein the contactless payment reader is able to read a contactless payment device when the contactless payment device is placed over the display.

6. The single space parking meter of claim 1, wherein the contactless payment reader is at least one of:
   a Near-Field Communications (NFC) reader;
   a Radio Frequency Identification (RFID) reader; and
   an International Organization for Standardization (ISO) 14443 reader.

7. The single space parking meter of claim 1, wherein the input controls comprise touchscreen buttons, and wherein the touchscreen buttons display at least one of the following: a numeric character; an alpha character; a checkmark; an 'X' or cancel symbol; and, an arrow.

8. The single space parking meter of claim 1, wherein the input controls are located at or protruding through the front housing.

9. The single space parking meter of claim 1, wherein the one or more buttons of the input controls comprise one or more mechanical buttons, electromechanical switches, piezoelectric switches and capacitive touch switches.

10. The single space parking meter of claim 1, wherein the input controls comprise at least four buttons, wherein:
   at least one button is for increasing an amount of time to be purchased;
   at least one button is for decreasing an amount of time to be purchased;
   at least one button is for authorizing a transaction; and
   at least one button is for canceling a transaction.

11. The single space parking meter of claim 1, wherein the input controls are located above a top of the lower housing when the removable single space parking meter mechanism is at least partially received within the lower housing and the meter housing is secured to the lower housing.

12. The single space parking meter of claim 1, wherein the card slot is sloped in a downward direction relative to an interior of the removable single space parking meter mechanism when the removable single space parking meter mechanism is at least partially received within the lower housing and the meter housing is secured to the lower housing.

13. The single space parking meter of claim 1, wherein the front housing comprises a display opening through which the display is visible.

14. The single space parking meter of claim 1 further comprising a transmission opening for reception or transmission of radio signals to or from the radio antenna, wherein the radio antenna is located internally to the removable single space parking meter mechanism, and wherein the display is visible through the transmission opening.

15. The single space parking meter of claim 1, wherein the existing lower housing is secured to a coin vault.

16. A removable single space parking meter mechanism that is at least partially and removably receivable within an existing lower housing of a single space parking meter, the single space parking meter mechanism comprising:
   a display for displaying parking information;
   a front housing to be exposed to an external environment;
   a contactless payment reader;
   a card slot at or in the front housing for receiving a payment card;
   a coin slot at or in the front housing for receiving coins;
   input controls comprising one or more buttons for interacting with the single space parking meter;
   a rechargeable battery for providing power for operation of the single space parking meter;
   a solar panel for charging the rechargeable battery;
   a radio for transmitting radio signals from the single space parking meter and receiving radio signals at the single space parking meter wherein the radio signals comprise parking meter payment information; and
   a radio antenna for the radio wherein the radio antenna is connected to the radio.

17. The removable single space parking meter mechanism of claim 16 further comprising an antenna for the contactless payment reader, wherein the antenna for the contactless payment reader: comprises copper; is connected to the contactless payment reader; and, is arranged at the display.

18. The removable single space parking meter mechanism of claim 16 further comprising an antenna for the contactless payment reader, wherein the antenna for the contactless payment reader: comprises copper; is connected to the contactless payment reader; and, is arranged directly behind the display.

19. The removable single space parking meter mechanism of claim 16, wherein a logo, graphic or direction for making payment using the contactless payment reader is displayable on the display.

20. The removable single space parking meter mechanism of claim 16, wherein the contactless payment reader is able to read a contactless payment device when the contactless payment device is placed over the display.

21. The removable single space parking meter mechanism of claim 16, wherein the contactless payment reader is at least one of:
   a Near-Field Communications (NFC) reader;
   a Radio Frequency Identification (RFID) reader; and
   an International Organization for Standardization (ISO) 14443 reader.

22. The removable single space parking meter mechanism of claim 16, wherein the input controls comprise touchscreen buttons, and wherein the touchscreen buttons display at least one of the following: a numeric character; an alpha character; a checkmark; an 'X' or cancel symbol; and, an arrow.

23. The removable single space parking meter mechanism of claim 16, wherein the input controls are located at or protruding through the front housing.

24. The removable single space parking meter mechanism of claim 16, wherein the one or more buttons of the input controls comprise one or more mechanical buttons, electromechanical switches, piezoelectric switches and capacitive touch switches.

25. The removable single space parking meter mechanism of claim 16, wherein the input controls comprise at least four buttons, wherein:
   at least one button is for increasing an amount of time to be purchased;
   at least one button is for decreasing an amount of time to be purchased;
   at least one button is for authorizing a transaction; and
   at least one button is for canceling a transaction.

26. The removable single space parking meter mechanism of claim 16, wherein the input controls are configured so as to be located above a top of the lower housing when the removable single space parking meter mechanism is at least partially received within the lower housing.

27. The single space parking meter of claim 16, wherein the card slot is sloped in a downward direction relative to an interior of the removable single space parking meter mechanism when the removable single space parking meter mechanism is at least partially received within the lower housing.

28. The removable single space parking meter mechanism of claim 16, wherein the front housing comprises a display opening through which the display is visible.

29. The removable single space parking meter mechanism of claim 16 further comprising a transmission opening for reception or transmission of radio signals to or from the radio antenna, wherein the radio antenna is located internally to the removable single space parking meter mechanism, and wherein the display is visible through the transmission opening.

* * * * *